US012064975B2

(12) United States Patent
Nakagawa et al.

(10) Patent No.: US 12,064,975 B2
(45) Date of Patent: Aug. 20, 2024

(54) LIQUID DISCHARGE HEAD AND LIQUID DISCHARGE METHOD

(71) Applicant: CANON KABUSHIKI KAISHA, Tokyo (JP)

(72) Inventors: Yoshiyuki Nakagawa, Kawasaki (JP); Shintaro Kasai, Yokohama (JP); Shuzo Iwanaga, Kawasaki (JP); Akiko Hammura, Tokyo (JP); Koichi Ishida, Tokyo (JP); Takatsugu Moriya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/310,454

(22) Filed: May 1, 2023

(65) Prior Publication Data

US 2023/0271425 A1 Aug. 31, 2023

Related U.S. Application Data

(60) Continuation of application No. 17/684,995, filed on Mar. 2, 2022, now Pat. No. 11,667,132, which is a (Continued)

(30) Foreign Application Priority Data

Jan. 8, 2016 (JP) ................................ 2016-002949
Dec. 9, 2016 (JP) ................................ 2016-239417

(51) Int. Cl.

*B41J 2/18* (2006.01)
*B41J 2/14* (2006.01)
*B41J 2/01* (2006.01)

(52) U.S. Cl.

CPC ............ *B41J 2/18* (2013.01); *B41J 2/14024* (2013.01); *B41J 2/1404* (2013.01); *B41J 2/14145* (2013.01); *B41J 2002/012* (2013.01); *B41J 2202/12* (2013.01); *B41J 2202/20* (2013.01); *B41J 2202/21* (2013.01)

(58) Field of Classification Search

CPC ........ B41J 2/18; B41J 2/14024; B41J 2/1404; B41J 2/14145; B41J 2002/012; B41J 2202/12; B41J 2202/20; B41J 2202/21

See application file for complete search history.

(56) References Cited

U.S. PATENT DOCUMENTS 10,336,091 B2 * 7/2019 Nakagawa ............ B41J 2/1404

* cited by examiner

*Primary Examiner* — Geoffrey S Mruk
(74) *Attorney, Agent, or Firm* — Canon U.S.A., Inc., IP Division

(57) ABSTRACT

A liquid discharge head includes: a substrate, where a recording element is disposed; and a discharge orifice forming member, where a discharge orifice, facing the recording element, and configured to discharge the liquid, is formed. The liquid discharge head has a pressure chamber, a first liquid channel configured to supply liquid to the pressure chamber, and a second liquid channel configured to recover liquid from the pressure chamber. The substrate has a liquid supply channel connected to the first liquid channel to supply liquid to the first liquid channel, and a liquid recovery channel connected to the second liquid channel, to recover liquid from the second liquid channel. Pressure at an inlet portion of the liquid supply channel is higher than pressure at an outlet portion of the liquid recovery channel, and a flow velocity of liquid within the pressure chamber is 3 to 140 mm/s.

11 Claims, 40 Drawing Sheets

Related U.S. Application Data continuation of application No. 17/061,332, filed on Oct. 1, 2020, now Pat. No. 11,298,954, which is a division of application No. 16/410,375, filed on May 13, 2019, now Pat. No. 10,828,906, which is a division of application No. 15/394,639, filed on Dec. 29, 2016, now Pat. No. 10,336,091.

LIQUID DISCHARGE HEAD AND LIQUID DISCHARGE METHOD

CROSS REFERENCE TO RELATED APPLICATIONS

The present application is a continuation of U.S. patent application Ser. No. 17/684,995, filed Mar. 2, 2022, now issued as U.S. Pat. No. 11,667,132, issued on Jun. 6, 2023, which is a continuation of U.S. patent application Ser. No. 17/061,332, filed Oct. 1, 2020, now issued as U.S. patent Ser. No. 11/298,954, issued on Apr. 12, 2022, which is a divisional of U.S. patent application Ser. No. 16/410,375, filed May 13, 2019, now issued as U.S. Pat. No. 10,828,906, issued on Nov. 10, 2020, which is a divisional of U.S. patent application Ser. No. 15/394,639, filed Dec. 29, 2016, now issued as U.S. Pat. No. 10,336,091, issued on Jul. 2, 2019, the content of which is expressly incorporated by reference herein in its entirety. Further, the present continuation application claims priority from Japanese Patent Application No. 2016-002949 filed Jan. 8, 2016 and No. 2016-239417 filed Dec. 9, 2016, which are also hereby incorporated by reference herein in their entirety.

BACKGROUND OF THE INVENTION

Field of the Invention

The present invention relates to a liquid discharge head and a liquid discharge method, and more particularly relates to a liquid discharge head liquid circulates before and after discharge orifices.

Description of the Related Art

In liquid discharge heads that discharge liquid such as ink or the like, the liquid may become concentrated and thicken near discharge orifices, due to volatile component in the liquid being discharged from the discharge orifices evaporating. This can change the discharge speed of droplets, and droplet landing accuracy may become poorer. Thickening of the liquid is particularly marked in cases where an intermission period from having discharged a droplet until discharging the next droplet is long, or in cases where the content of solids in the liquid is high. In a worst-case scenario, defective discharge may occur due to the increased flow resistance of the concentrated liquid.

Circulating liquid supplied to the liquid discharge head over a circulation path is known as one measure to deal with this liquid thickening phenomenon. Liquid discharge heads that have recording elements generating thermal energy are disclosed in Japanese Patent Laid-Open No. 2001-205814, and "Carolyn Ellinger and Yonglin Xie in 'Captive Continuous Inkjet', Sep. 2013, 29 International Conference on Digital Printing Technologies" (hereinafter "ELLINGER"), which is non-patent literature (hereinafter, this system for liquid discharge heads may be referred to as "thermal system"). A liquid is circulated through liquid channels formed between a discharge orifice forming member where discharge orifices are formed, and a substrate where the recording elements are formed, to prevent the discharge orifices from becoming clogged from evaporating liquid. Japanese Patent Laid-Open No. 2001-205814 describes the ink being circulated at a flow velocity of 50 to 2000 μm/s, thereby discharging bubbles residing near the heat-generating elements to a downstream region. ELLINGER describes circulating ink at a faster flow velocity.

The Present Inventors have found through studies that regarding the configuration described in ELLINGER relating to continuous inkjet technology, the high speed of the circulation flow velocity affects bubbles generated by driving the recording elements. Specifically, the bubbles may not be formed symmetrically regarding the center of the discharge orifice, and the discharge direction of the droplet may incline as to a direction perpendicular the face of the discharge orifice forming member where the discharge orifices are formed (hereinafter "discharge orifice forming face"). Particularly, the height of a channels communicating with the pressure chambers in the thermal system, where bubbles are generated and droplets are discharged, is low in comparison with piezoelectric systems, and the discharge orifices are arrayed in high density, so the flow resistance is great. Accordingly, the flow resistance before and after the discharge orifices is great, and bubbling readily occurs asymmetrically. Asymmetric bubbling easily causes the discharge direction of the droplet to be inclined as to the direction perpendicular to the discharge orifice forming face.

On the other hand, Japanese Patent Laid-Open No. 2001-205814 describes the liquid being circulated at a flow velocity of 50 to 2000 μm/s, but the flow velocity is slow, so even though residual bubbles can be moved downstream, suppressing thickening of liquid due to evaporation of liquid from the discharge orifices is difficult. Thickened liquid near the discharge orifices can change the discharge speed of droplets, and the landing positions of the droplets may deviate from the intended landing positions. This problem becomes particularly conspicuous in cases where the temperature of the liquid discharge head is high and the rate of evaporation is fast, and in cases where the concentration of solids in the liquid is high.

SUMMARY OF THE INVENTION

It has been found desirable to provide a liquid discharge head and liquid discharge method in which the discharge direction of the droplet is not readily inclined as to the direction perpendicular to the discharge orifice forming face, and also thickening of liquid due to evaporation of liquid from the discharge orifices is suppressed.

A liquid discharge head according to an aspect of the present invention includes: a substrate, where a recording element configured to generate thermal energy used to discharge liquid is disposed; and a discharge orifice forming member, where a discharge orifice, facing the recording element, and configured to discharge the liquid, is formed. The liquid discharge head has a pressure chamber, a first liquid channel configured to supply liquid to the pressure chamber, and a second liquid channel configured to recover liquid from the pressure chamber. The substrate has a liquid supply channel connected to the first liquid channel to supply liquid to the first liquid channel, and a liquid recovery channel connected to the second liquid channel, to recover liquid from the second liquid channel. Pressure at an inlet portion of the liquid supply channel is higher than pressure at an outlet portion of the liquid recovery channel, and a flow velocity of liquid within the pressure chamber is 3 to 140 mm/s.

Further features of the present invention will become apparent from the following description of exemplary embodiments with reference to the attached drawings.

DESCRIPTION OF THE EMBODIMENTS

Several embodiments of the liquid discharge head according to the present invention will be described below with reference to the drawings. Although various conditions that are technically preferable are included in the embodiments described below, the present invention is not restricted to this embodiments and conditions, as long as in accordance with the spirit of the present invention.

Although the embodiments relate to a liquid discharge head used in an inkjet recording apparatus where ink circulates between a tank and the liquid discharge head, the liquid being discharged is not restricted to ink. Differential pressure is generated between upstream and downstream of liquid channels in the present invention, to create a circulatory flow in liquid channels in the liquid discharge head. Although the following embodiments use a pressure adjustment mechanism to generate the differential pressure, the unit generating the differential pressure is not restricted to this. For example, an arrangement may be made where two tanks are provided, at the upstream side and downstream side of the liquid discharge head, and water head pressure is used to cause the liquid to flow from one tank to the other tank, thereby generating the differential pressure between the upstream side and downstream side of the liquid discharge head so that the liquid circulates through the liquid channels.

Although the embodiments relate to a so-called line (page-wide) head that has a length corresponding to the width of the recording medium, the present invention can also be applied to a so-called serial liquid discharge head that performs recording while scanning a carriage, on which the liquid discharge head 3 is mounted, over the recording medium in the width direction. An example of a serial liquid discharge head is one that has one recording element board each for recording black ink and for recording color ink, but this is not restrictive. An example of a serial liquid discharge head may be an arrangement where short line heads that are shorter than the width of the recording medium are formed, with multiple recording element boards arrayed so that discharge orifices overlap in the array direction of the discharge orifices, these being scanned over the recording medium.

First Application Example

A first application example to which the present invention can be suitably applied will be described below.

Description of Inkjet Recording Apparatus

Figure 1:
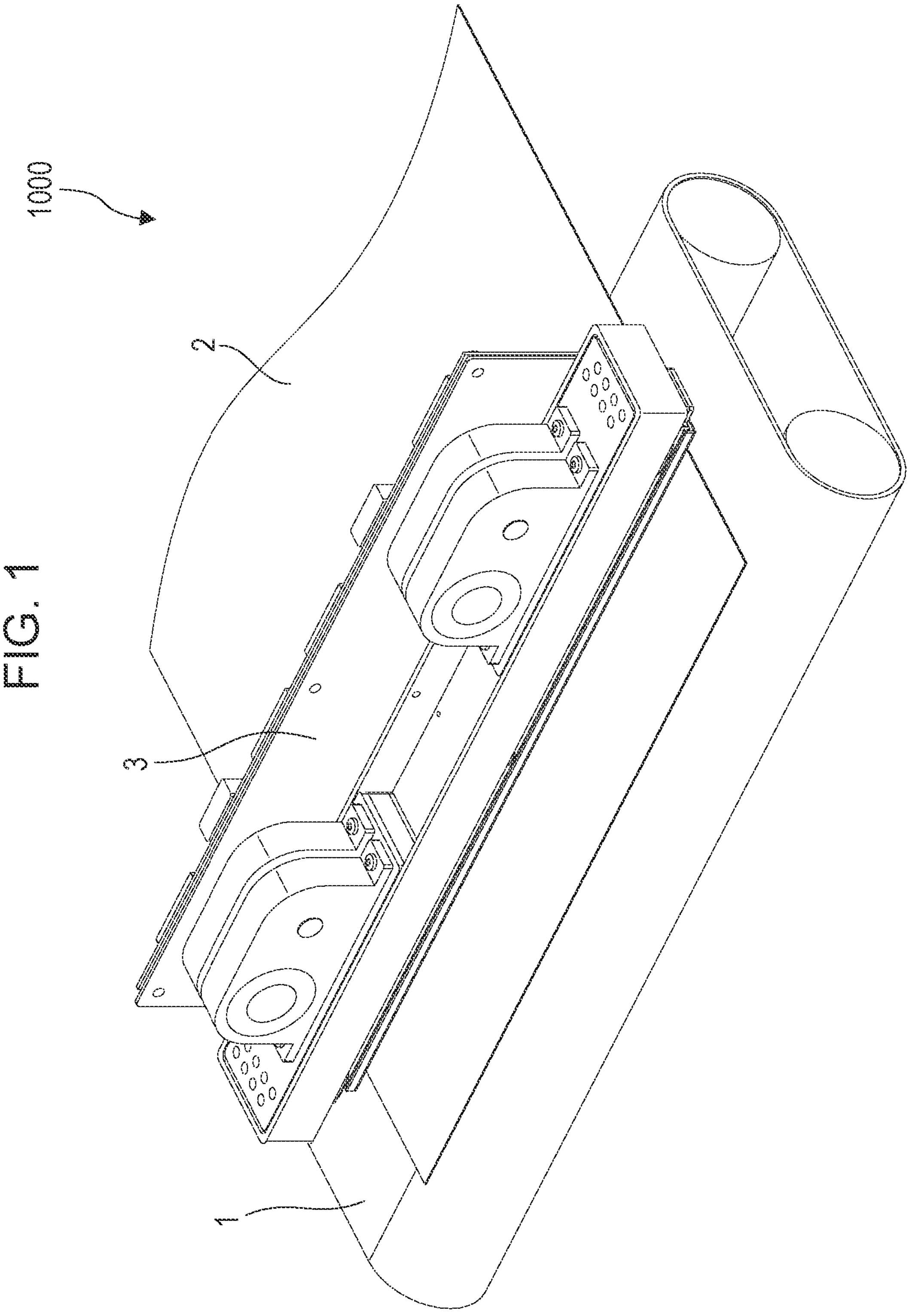
FIG. 1 is a diagram illustrating a schematic configuration of a recording apparatus according to a first application example to which the present invention is applicable.

FIG. 1 illustrates a schematic configuration of a device that discharges liquid, and more particularly an inkjet recording apparatus 1000 (hereinafter also referred to simply as "recording apparatus") that performs recording by discharging ink. The recording apparatus 1000 has a conveyance unit 1 that conveys a recording medium 2, and a line type (page-wide) liquid discharge head 3 disposed generally orthogonal to the conveyance direction of the recording medium 2. The recording apparatus 1000 thus performs single-pass continuous recording while continuously or intermittently conveying multiple recording mediums 2. The recording medium 2 is not restricted to cut sheets, and may be continuous roll sheets. The liquid discharge head 3 is capable of full-color printing by cyan, magenta, yellow, and black (acronym "CMYK") ink. The liquid discharge head 3 has a liquid supply unit serving as a supply path that supplies ink to the liquid discharge head 3, a main tank, and a buffer tank (see FIG. 2) connected by fluid connection, as described later. The liquid discharge head 3 is also electrically connected to an electric control unit that transmits electric power and discharge control signals to the liquid discharge head 3. Liquid paths and electric signal paths within the liquid discharge head 3 will be described later.

Description of First Circulation Path

Figure 2:
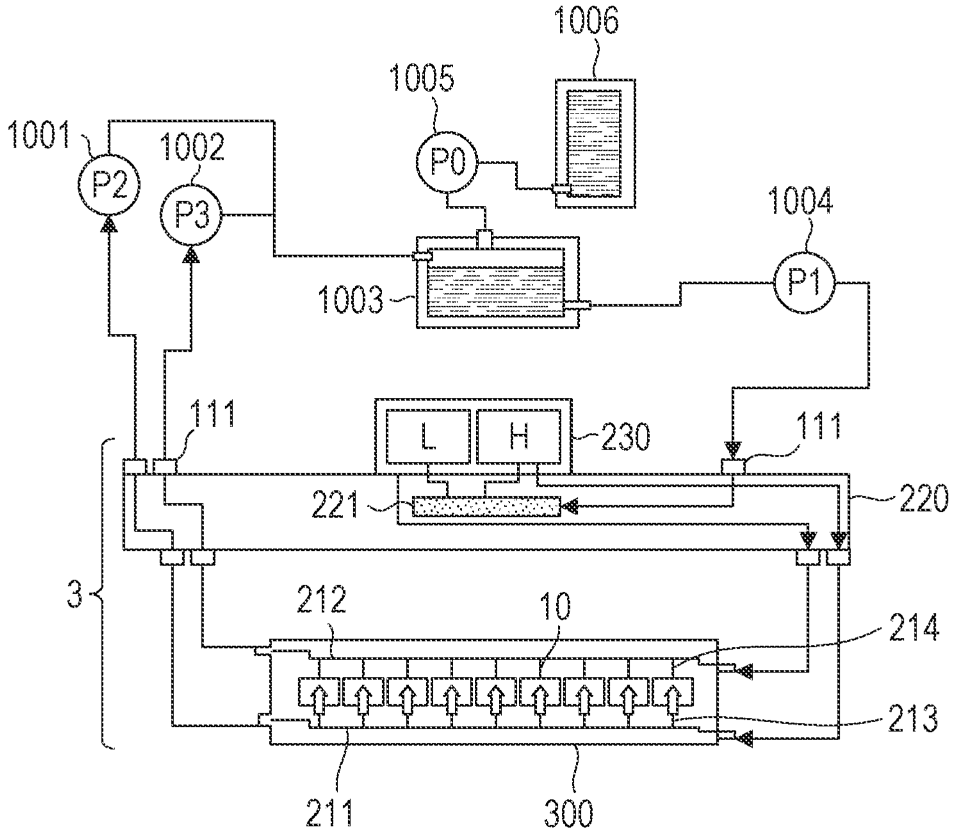
FIG. 2 is a diagram illustrating a first circulation path over which liquid circulates in the recording apparatus.

FIG. 2 is a schematic diagram illustrating a first circulation path that is a first form of a circulation path applied to the recording apparatus of the present application example. FIG. 2 is a diagram illustrating a first circulation pump (high-pressure side) 1001, a first circulation pump (low-pressure side) 1002 and a buffer tank 1003 and the like connected to the liquid discharge head 3 by fluid connection. Although FIG. 2 only illustrates the paths over which one color ink out of the CMYK ink flows, for the sake of brevity of description, in reality there are four colors worth of circulation paths provided to the liquid discharge head 3 and the recording apparatus main unit. The buffer tank 1003, serving as a sub-tank that is connected to a main tank 1006, has an atmosphere communication opening (omitted from illustration) whereby the inside and the outside of the tank communicate, and bubbles within the ink can be discharged externally. The buffer tank 1003 is also connected to a replenishing pump 1005. When ink is consumed at the liquid discharge head 3, when discharging (ejecting) ink from the discharge orifices of the liquid discharge head 3, by discharging ink to perform recording, suction recovery, or the like, for example, the replenishing pump 1005 acts to send ink of an amount the same as that has been consumed from the main tank 1006 to the buffer tank 1003.

The two first circulation pumps 1001 and 1002 act to extract ink from a liquid connection portion 111 of the liquid discharge head 3 and flow the ink to the buffer tank 1003. The first circulation pumps 1001 and 1002 preferably are positive-displacement pumps that have quantitative fluid sending capabilities. Specific examples may include tube pumps, gear pumps, diaphragm pumps, syringe pumps, and so forth. An arrangement may also be used where a constant flow is ensured by disposing a common-use constant-flow value and relief valve at the outlet of the pump, for example. When the liquid discharge head 3 is being driven, the first circulation pump (high-pressure side) 1001 and first circulation pump (low-pressure side) 1002 cause a constant amount of ink to flow through a common supply channel 211 and a common recovery channel 212. The amount of flow is preferably set to a level where temperature difference among recording element boards 10 of the liquid discharge head 3 does not influence recording image quality, or higher. On the other hand, if the flow rate is set excessively high, the effects of pressure drop in the channels within a liquid discharge unit 300 causes excessively large difference in negative pressure among the recording element boards 10, resulting in unevenness in density in the image. Accordingly, the flow rate is preferably set taking into consideration temperature difference and negative pressure difference among the recording element boards 10.

A negative pressure control unit 230 is provided between paths of a second circulation pump 1004 and the liquid discharge unit 300. The negative pressure control unit 230 functions such that the pressure downstream from the negative pressure control unit 230 (i.e., at the liquid discharge unit 300 side) can be maintained at a present constant pressure even in cases where the flow rate of the circulation system fluctuates due to difference in duty when recording. Any mechanism may be used as two pressure adjustment mechanisms making up the negative pressure control unit 230, as long as pressure downstream from itself can be controlled to fluctuation within a constant range or smaller that is centered on a desired set pressure. As one example, a mechanism equivalent to a so-called "pressure-reducing regulator" can be employed. In a case of using a pressure-reducing regulator, the upstream side of the negative pressure control unit 230 is preferably pressurized by the second circulation pump 1004 via a liquid supply unit 220, as illustrated in FIG. 2. This enables the effects of water head pressure as to the liquid discharge head 3 of the buffer tank 1003 to be suppressed, giving broader freedom in the layout of the buffer tank 1003 in the recording apparatus 1000. It is sufficient that the second circulation pump 1004 have a certain lift pressure or greater, within the range of the circulatory flow pressure of ink used when driving the liquid discharge head 3, and turbo pumps, positive-displacement pumps, and the like can be used. Specifically, diaphragm pumps or the like can be used. Alternatively, a water head tank disposed with a certain water head difference as to the negative pressure control unit 230, for example, may be used instead of the second circulation pump 1004.

As illustrated in FIG. 2, the negative pressure control unit 230 has two pressure adjustment mechanisms, with different control pressure from each other having been set. Of the two negative pressure adjustment mechanisms, the relatively high-pressure setting side (denoted by H in FIG. 2) and the relatively low-pressure setting side (denoted by L in FIG. 2) are respectively connected to the common supply channel 211 and the common recovery channel 212 within the liquid discharge unit 300 via the liquid supply unit 220. Provided to the liquid discharge unit 300 are individual supply channels 213 and individual recovery channels 214 communicating between the common supply channel 211, common recovery channel 212, and the recording element boards 10. Due to the individual supply channels 213 and 214 communicating with the common supply channel 211 and common recovery channel 212, flows occur where part of the ink flows from the common supply channel 211 through internal channels in the recording element board 10 and to the common recovery channel 212 (indicated by the arrows in FIG. 2). The reason is that the pressure adjustment mechanism H is connected to the common supply channel 211, and the pressure adjustment mechanism L to the common recovery channel 212, so a pressure difference is generated between the two common channels.

Thus, flows occur within the liquid discharge unit 300 where a part of the ink passes through the recording element boards 10 while ink flows through each of the common supply channel 211 and common recovery channel 212. Accordingly, heat generated at the recording element boards 10 can be externally discharged from the recording element boards 10 by the flows through the common supply channel 211 and common recovery channel 212. This configuration also enables ink flows to be generated at discharge orifices and pressure chambers not being used for recording while recording is being performed by the liquid discharge head 3, so thickening of the ink at such portions can be suppressed. Further, thickened ink and foreign substances in the ink can be discharged to the common recovery channel 212. Accordingly, the liquid discharge head 3 according to the present application example can record at high speed with high image quality.

Description of Second Circulation Path

Figure 3:
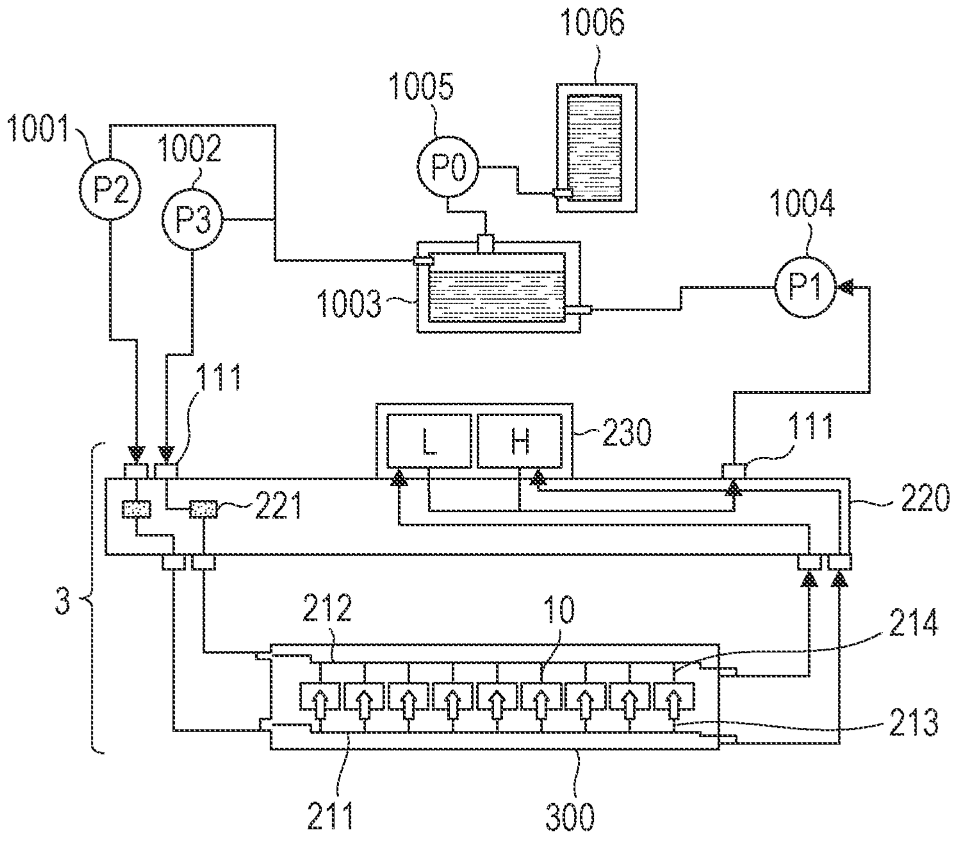
FIG. 3 is a diagram illustrating a second circulation path in the recording apparatus.

FIG. 3 is a schematic diagram that illustrates, of circulation paths applied to the recording apparatus according to the present application example, a second circulation path that is a different circulation form from the above-described first circulation path. The primary points of difference as to the above-described first circulation path are as follows. First, both of the two pressure adjustment mechanisms making up the negative pressure control unit 230 have a mechanism (a mechanism part having operations equivalent to a so-called “backpressure regulator”) to control pressure at the upstream side from the negative pressure control unit 230 to fluctuation within a constant range that is centered on a desired set pressure. Next, the second circulation pump 1004 acts as a negative pressure source to depressurize the downstream side from the negative pressure control unit 230. Further, the first circulation pump (high-pressure side) 1001 and first circulation pump (low-pressure side) 1002 are disposed on the upstream side of the liquid discharge head 3, and the negative pressure control unit 230 is disposed on the downstream side of the liquid discharge head 3.

The negative pressure control unit 230 in FIG. 3 acts to maintain pressure fluctuation on the upstream side of itself (i.e., at the liquid discharge unit 300 side) within a constant range centered on a pressure set beforehand, even in cases where the flow rate fluctuates due to difference in duty when recording with the liquid discharge head 3. Pressure fluctuation is maintained within a constant range centered on a preset pressure, for example. The downstream side of the negative pressure control unit 230 is preferably pressurized by the second circulation pump 1004 via the liquid supply unit 220, as illustrated in FIG. 3. This enables the effects of water head of the buffer tank 1003 as to the liquid discharge head 3 to be suppressed, giving a broader range of selection for the layout of the buffer tank 1003 in the recording apparatus 1000. Alternatively, a water head tank disposed with a certain water head difference as to the negative pressure control unit 230, for example, may be used instead of the second circulation pump 1004.

The negative pressure control unit 230 illustrated in FIG. 3 has two pressure adjustment mechanisms, with different control pressure from each other having been set, in the same way as the arrangement illustrated in FIG. 2. Of the two negative pressure adjustment mechanisms, the relatively high-pressure setting side (denoted by H in FIG. 3) and the relatively low-pressure setting side (denoted by L in FIG. 3) are respectively connected to the common supply channel 211 and the common recovery channel 212 within the liquid discharge unit 300 via the liquid supply unit 220. The pressure of the common supply channel 211 is made to be relatively higher than the pressure of the common recovery channel 212 by the two negative pressure adjustment mechanisms. Accordingly, flows occur where ink flows from the common supply channel 211 through individual channels 213 and 214 and internal channels in the recording element board 10 to the common recovery channel 212 (indicated by the arrows in FIG. 3). The second circulation path thus yields an ink flow state the same as that of the first circulation path within the liquid discharge unit 300, but has two advantages that are different from the case of the first circulation path.

One advantage is that, with the second circulation path, the negative pressure control unit 230 is disposed on the downstream side of the liquid discharge head 3, so there is little danger that dust and foreign substances generated at the negative pressure control unit 230 will flow into the head. A second advantage is that the maximum value of the necessary flow rate supplied from the buffer tank 1003 to the liquid discharge head 3 can be smaller in the second circulation path as compared to the case of the first circulation path. The reason is as follows. The total flow rate within the common supply channel 211 and common recovery channel 212 when circulating during recording standby will be represented by A. The value of A is defined as the smallest flow rate necessary to maintain the temperature difference in the liquid discharge unit 300 within a desired range in a case where temperature adjustment of the liquid discharge head 3 is performed during recording standby. Also, the discharge flow rate in a case of discharging ink from all discharge orifices of the liquid discharge unit 300 (full discharge) is defined as F. Accordingly, in the case of the first circulation path (FIG. 2), the set flow rate of the first circulation pump (high-pressure side) 1001 and the first circulation pump (low-pressure side) 1002 is A, so the maximum value of the liquid supply amount to the liquid discharge head 3 necessary for full discharge is A+F.

On the other hand, in the case of the second circulation path (FIG. 3), the liquid supply amount to the liquid discharge head 3 necessary at the time of recording standby is flow rate A. This means that the supply amount to the liquid discharge head 3 that is necessary for full discharge is flow rate F. Accordingly, in the case of the second circulation path, the total value of the set flow rate of the first circulation pump (high-pressure side) 1001 and the first circulation pump (low-pressure side) 1002, i.e., the maximum value of the necessary supply amount, is the larger value of A and F. Thus, the maximum value of the necessary supply amount in the second circulation path (A or F) is smaller than the maximum value of the necessary flow rate in the first circulation path (A+F), as long as the liquid discharge unit 300 of the same configuration is used. Consequently, the degree of freedom regarding circulatory pumps that can be applied is higher in the case of the second circulation path, and low-cost circulatory pumps having simple structure can be used, the load on a cooler (omitted from illustration) disposed on the main unit side path can be reduced, for example, thereby reducing costs of the recording apparatus main unit. This advantage is more pronounced with line heads where the values of A or F are relatively great, and is more useful the longer the length of the line head is in the longitudinal direction.

However, on the other hand there are points where the first circulation path is more advantageous than the second circulation path. That is to say, with the second circulation path, the flow rate flowing through the liquid discharge unit 300 at the time of recording standby is maximum, so the lower the recording duty of the image is, the greater a negative pressure is applied to the nozzles. Accordingly, in a case where the channel widths of the common supply channel 211 and common recovery channel 212 (the length in a direction orthogonal to the direction of flow of ink) is reduced to reduce the head width (the length of the liquid discharge head in the transverse direction), this may result in more influence of satellite droplets. The reason is that high negative pressure is applied to the nozzles in low-duty images where unevenness is conspicuous. On the other hand, high negative pressure is applied to the discharge orifices when forming high-duty images in the case of the first circulation path, so any generated satellites are less conspicuous, which is advantageous in that influence on the image quality is small. Which of these two circulation paths is more preferable can be selected in light of the specifications of the liquid discharge head and recording apparatus main unit (discharge flow rate F, smallest circulatory flow rate A, and channel resistance within the head).

Description of Third Circulation Path

Figure 28:
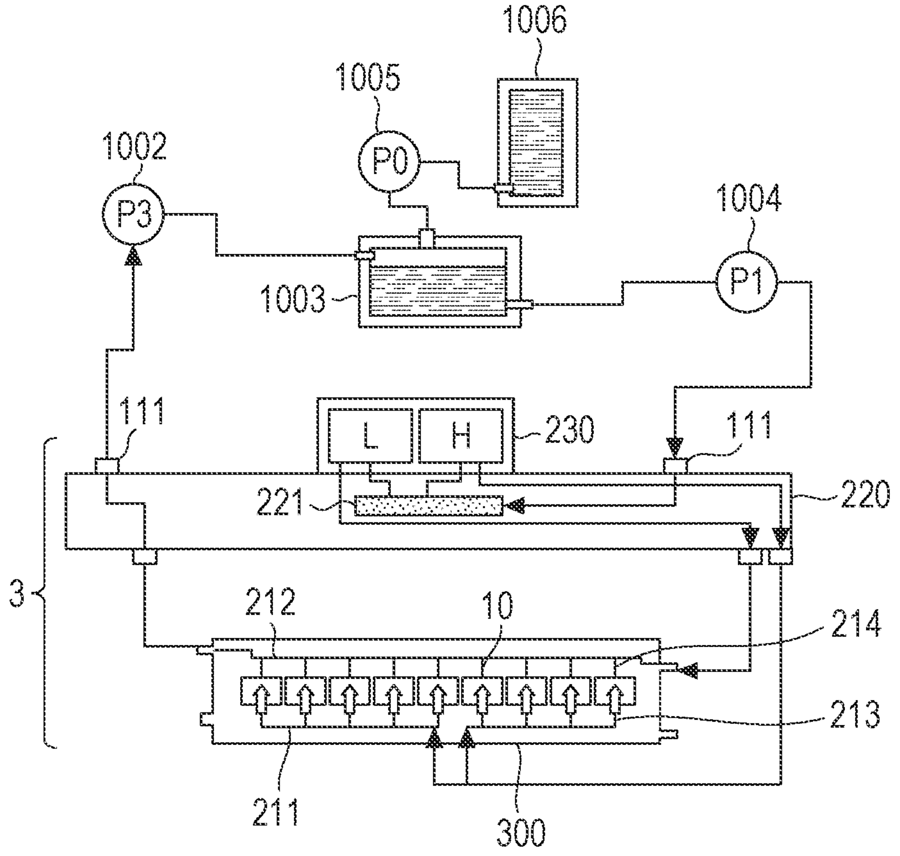
FIG. 28 is a diagram illustrating a third circulation path over which liquid of the recording apparatus circulates.

FIG. 28 is a schematic diagram illustrating a third circulation path that is a first form of a circulation path applied to the recording apparatus according to the present invention. Description of functions and configurations the same as the above-described first and second circulation paths will be omitted, and description is be made primarily regarding points of difference.

Liquid is supplied to inside of the liquid discharge head 3 from two places at the middle of the liquid discharge head 3, and one end side of the liquid discharge head 3, for a total of three places in this circulation path. The liquid passes from the common supply channel 211 through pressure chambers 23 then recovered by the common recovery channel 212, and thereafter is externally recovered from the liquid discharge head 3, from a recovery opening at the other end of the liquid discharge head 3. Multiple individual channels 213 and 214 communicate with the common supply channel 211 and common recovery channel 212, with the recording element boards 10 and the pressure chambers 23 disposed within the recording element boards 10 being provided on the paths of the individual channels 213 and 214. Accordingly, flows occur where part of the liquid which the first circulation pump 1002 pumps flows from the common supply channel 211 through pressure chambers 23 in the recording element boards 10 and to the common recovery channel 212 (indicated by the arrows in FIG. 28). The reason is that pressure difference is formed between the pressure adjustment mechanism H connected to the common supply channel 211, and the pressure adjustment mechanism L to the common recovery channel 212, and the first circulation pump 1002 is connected to just the common recovery channel 212.

Thus, a flow of liquid that passes through the common recovery channel 212, and a flow that passes from the common supply channel 211 through the pressure chambers 23 in the recording element boards 10 and flows to the common recovery channel 212, are formed in the liquid discharge unit 300. Accordingly, heat generated at the recording element boards 10 can be externally discharged from the recording element boards 10 by the flow from the common supply channel 211 to the common recovery channel 212, while suppressing increase of pressure loss. Also, according to the third circulation path, the number of pumps serving as liquid conveyance units can be reduced as compared with the first and second circulation paths described above.

Description of Configuration of Liquid Discharge Head

Figure 4A:
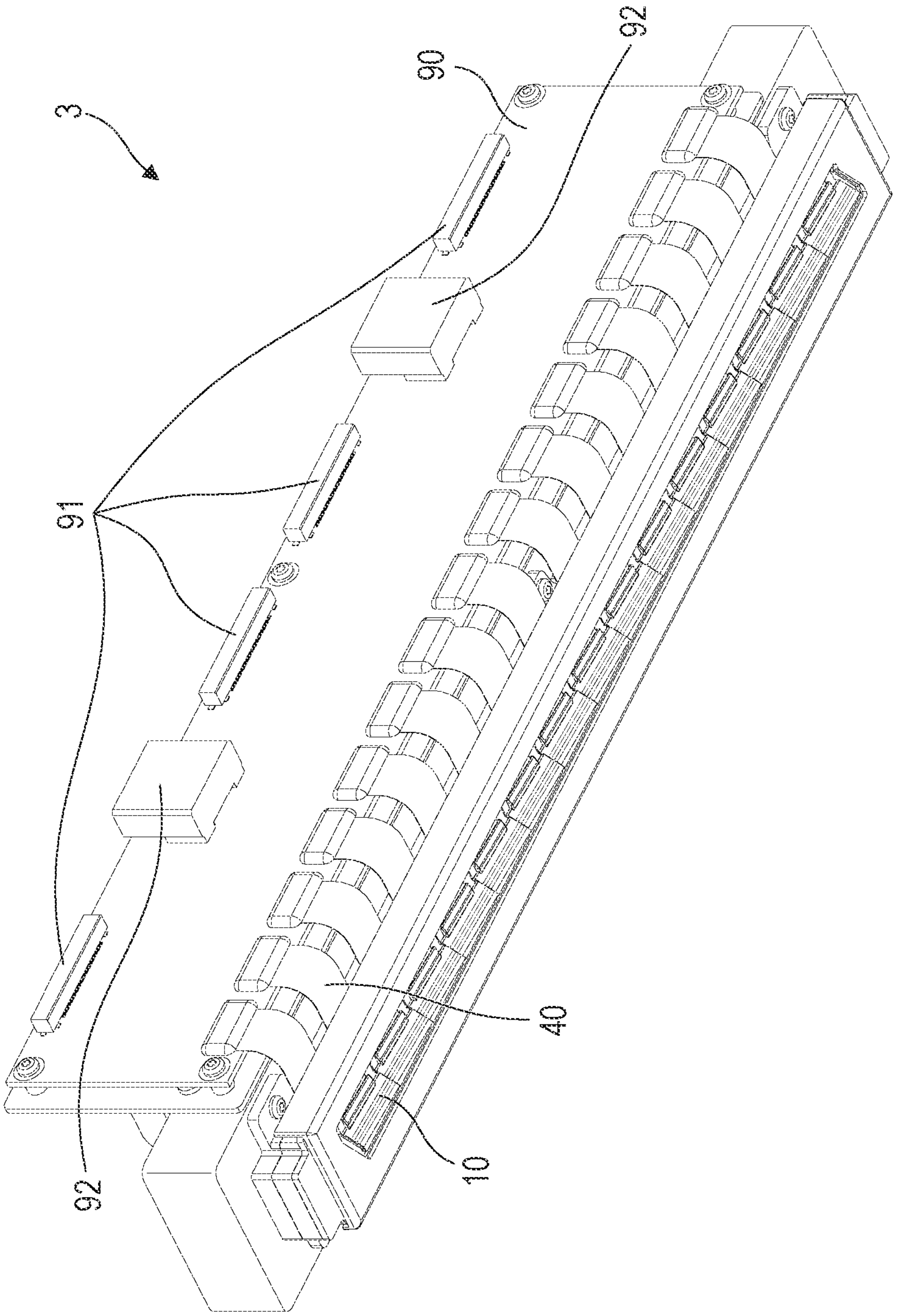
FIGS. 4A and 4B are perspective diagrams of a liquid discharge head according to the first application example.
Figure 4B:
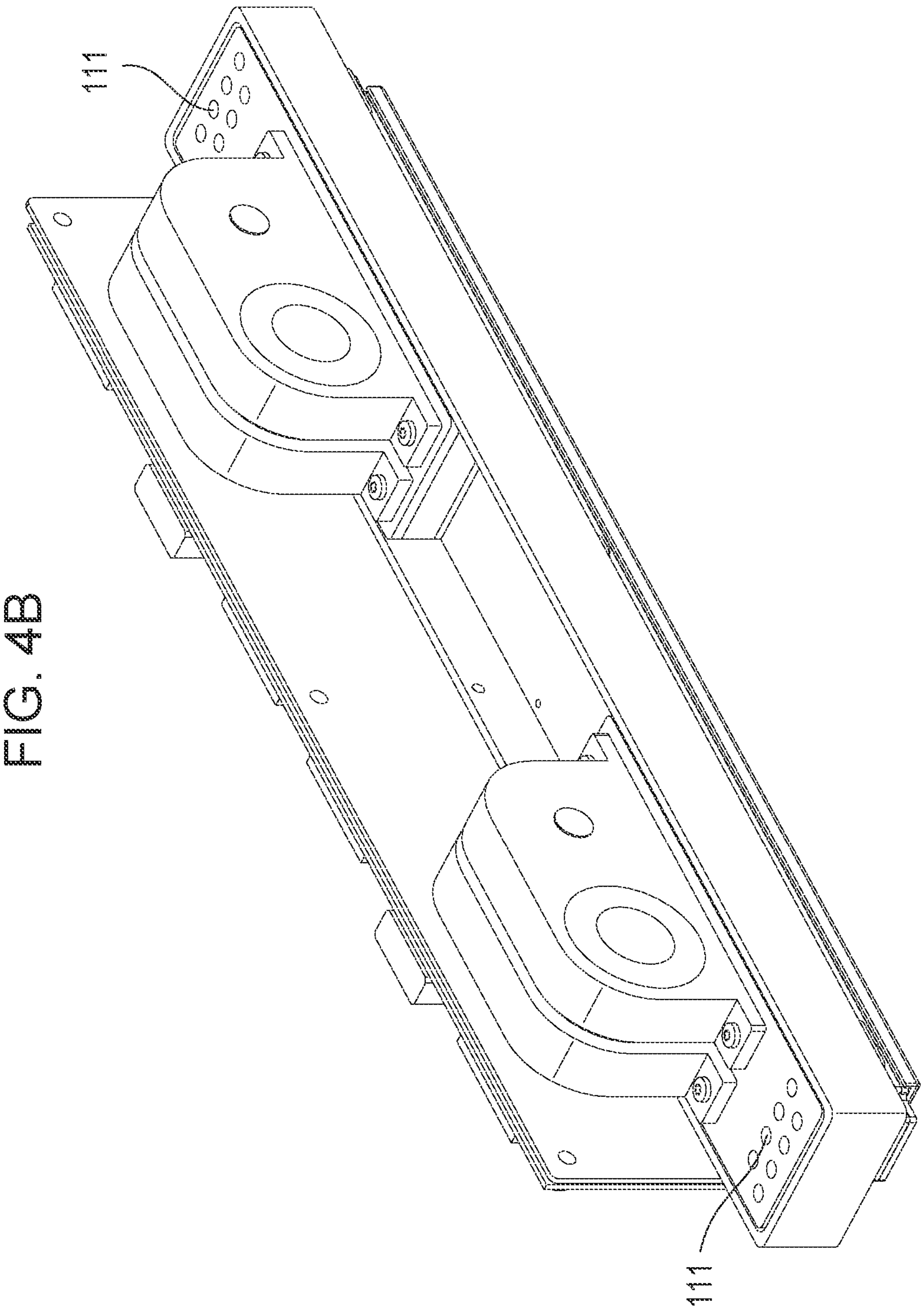

The configuration of the liquid discharge head 3 according to the first application example will be described. FIGS. 4A and 4B are perspective views of the liquid discharge head 3 according to the present application example. The liquid discharge head 3 is a line-type liquid discharge head where fifteen recording element boards 10 capable of discharging ink of the four colors of C, M, Y, and K are arrayed on a straight line (inline layout). The liquid discharge head 3 includes the recording element boards 10, and signal input terminals 91 and power supply terminals 92 that are electrically connected via flexible printed circuit boards 40 and an electric wiring board 90, as illustrated in FIG. 4A. The signal input terminals 91 and power supply terminals 92 are electrically connected to a control unit of the recording apparatus 1000, and each supply the recording element boards 10 with discharge drive signals and electric power necessary for discharge. Consolidating wiring by electric circuits in the electric wiring board 90 enables the number of signal input terminals 91 and power supply terminals 92 to be reduced in comparison with the number of recording element boards 10. This enables the number of electric connection portions that need to be removed when assembling the liquid discharge head 3 to the recording apparatus 1000 or when exchanging the liquid discharge head 3 to be reduced. Liquid connection portions 111 provided to both ends of the liquid discharge head 3 are connected with the liquid supply system of the recording apparatus 1000, as illustrated in FIG. 4B. Thus, ink of the four colors of CMYK is supplied from the supply system of the recording apparatus 1000 to the liquid discharge head 3, and ink that has passed through the liquid discharge head 3 is recovered to the supply system of the recording apparatus 1000. In this way, ink of each color can circulate over the path of the recording apparatus 1000 and the path of the liquid discharge head 3.

Figure 5:
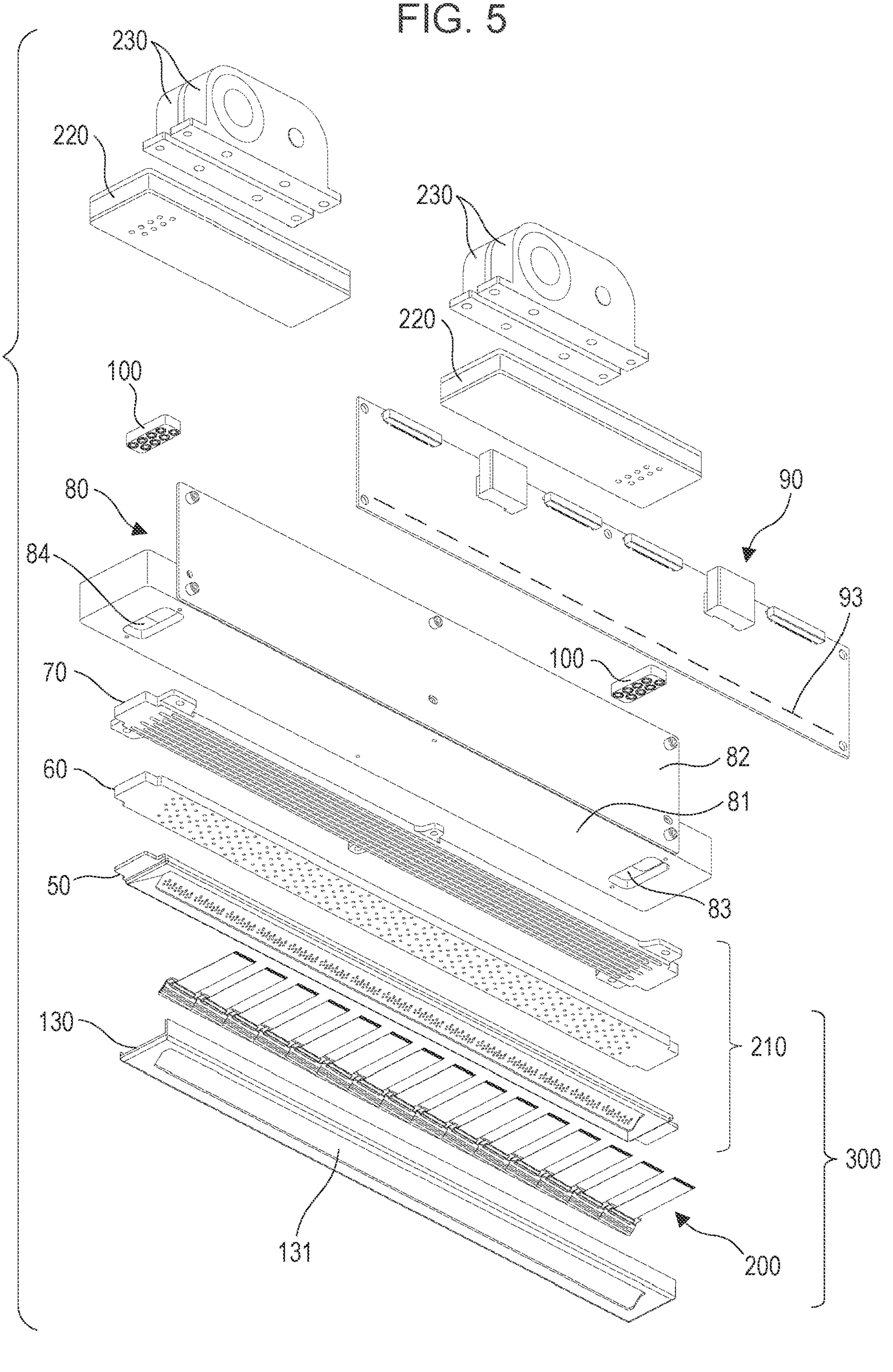
FIG. 5 is a disassembled perspective view of the liquid discharge head in FIGS. 4A and 4B.

FIG. 5 illustrates a disassembled perspective view of parts and units making up the liquid discharge head 3. The liquid discharge unit 300, liquid supply units 220, and electric wiring board 90 are attached to a case 80. The liquid connection portions 111 (FIG. 3) are provided to the liquid supply unit 220, and filters 221 (FIGS. 2 and 3) for each color, that communicate with each opening of the liquid connection portions 111 to remove foreign substances in the supplied ink, are provided inside the liquid supply units 220. Two liquid supply units 220 are each provided with filters 221 for two colors. The inks that have passed through the filters 221 are supplied to the respective negative pressure control units 230 provided on the liquid supply units 220 corresponding to each color. Each negative pressure control unit 230 is a unit made up of a pressure adjustment value for its respective color. The negative pressure control units 230 markedly attenuate change in pressure drop in the supply system of the recording apparatus 1000 (supply system on the upstream side of the liquid discharge head 3) occurring due to fluctuation in the flow rate of ink, by the operations of valve and spring members and the like provided therein. Accordingly, change of negative pressure at the downstream side from the pressure control units (liquid discharge unit 300 side) can be stabilized to within a certain range. Each negative pressure control unit 230 for each color has two pressure adjustment values built in, as described in FIG. 2, and are each set to different control pressures. The two pressure adjustment valves communicate with the liquid supply unit 220 via the common supply channel 211 in the liquid discharge unit 300 in the case of the high-pressure side and via the common recovery channel 212 in the case of the low-pressure side.

The case 80 is configured including a liquid discharge unit support member 81 and electric wiring board support member 82, and supports the liquid discharge unit 300 and electric wiring board 90 as well as securing rigidity of the liquid discharge head 3. The electric wiring board support member 82 is for supporting the electric wiring board 90, and is fixed by being screwed to the liquid discharge unit support member 81. The liquid discharge unit support member 81 serves to correct warping and deformation of the liquid discharge unit 300, and thus secure relative positional accuracy of the multiple recording element boards 10, thereby suppressing unevenness in the recorded article. Accordingly, the liquid discharge unit support member 81 preferably has sufficient rigidity. Examples of suitable materials include metal materials such as stainless steel and aluminum, and ceramics such as alumina. The liquid discharge unit support member 81 has openings 83 and 84 into which joint rubber members 100 are inserted. Ink supplied from a liquid supply unit 220 passes through a joint rubber member 100 and is guided to a third channel member 70 which is a part making up the liquid discharge unit 300.

The liquid discharge unit 300 is made up of multiple discharge modules 200 and a channel member 210, and a cover member 130 is attached to the face of the liquid discharge unit 300 that faces the recording medium. The cover member 130 is a member having a frame-shaped face where a long opening 131 is provided. The recording element boards 10 included in the discharge module 200 and a sealing member 110 (FIG. 9A) are exposed from the opening 131, as illustrated in FIG. 5. The frame portion on the perimeter of the opening 131 functions as a contact surface for a cap member that caps off the liquid discharge head 3 when in recording standby. Accordingly, a closed space is preferably formed when capping, by coating the perimeter of the opening 131 with an adhesive agent, sealant, filling member, or the like, to fill in roughness and gaps on the discharge orifice face of the liquid discharge unit 300.

Next, description will be made regarding the configuration of the channel member 210 included in the liquid discharge unit 300. The channel member 210 is an article formed by laminating a first channel member 50, a second channel member 60, and the third channel member 70, as illustrated in FIG. 5. The channel member 210 is a channel member that distributes the ink supplied from the liquid supply unit 220 to each of the discharge modules 200, and returns ink recirculating from the discharge modules 200 to the liquid supply unit 220. The channel member 210 is fixed to the liquid discharge unit support member 81 by screws, thereby suppressing warping and deformation of the channel member 210.

Figure 6A:
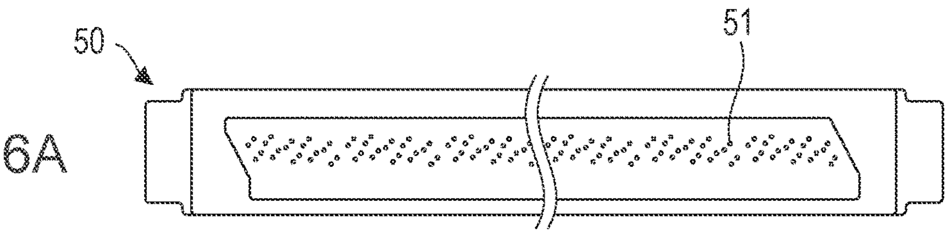
FIGS. 6A through 6F are diagrams illustrating the configuration of first through third channel members making up a channel member that the liquid discharge head in FIGS. 4A and 4B has.
Figure 6B:
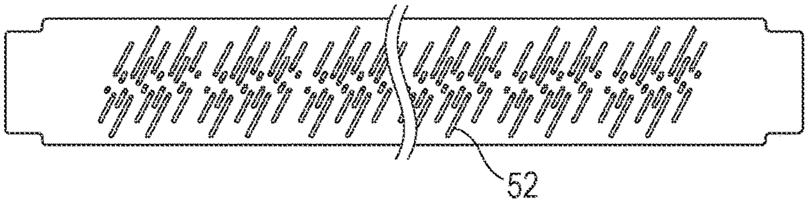
Figure 6C:
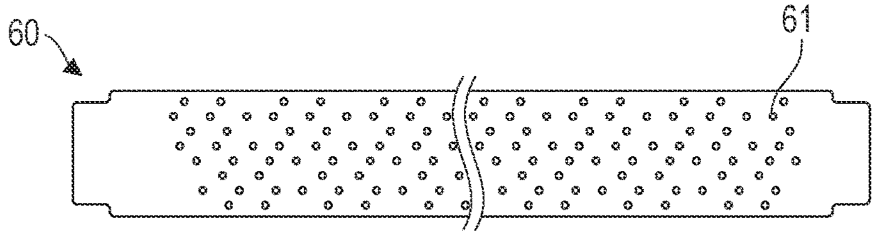
Figure 6D:
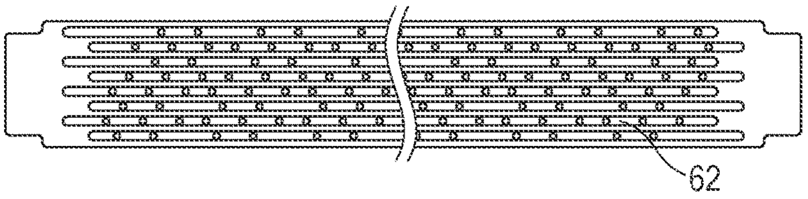
Figure 6E:
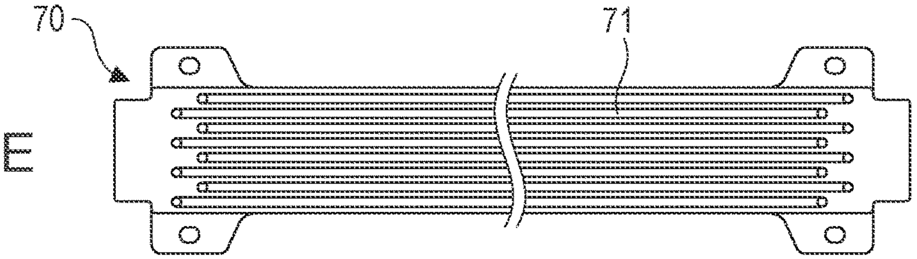
Figure 6F:
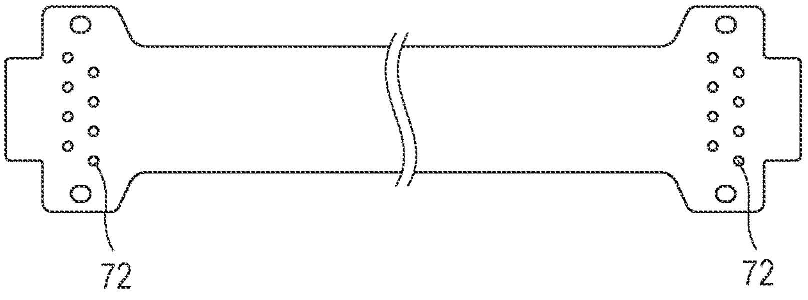
Figure 7:
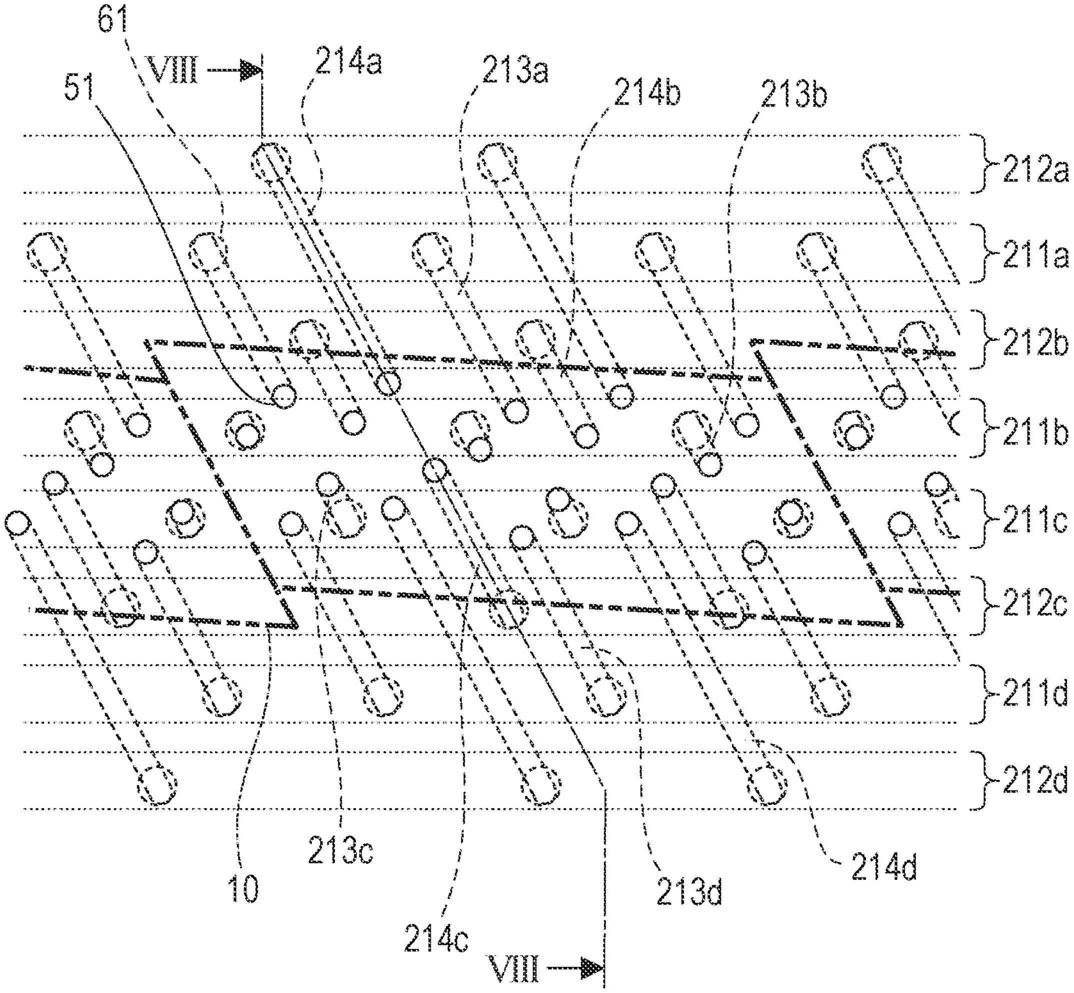
FIG. 7 is a diagram for describing connection relationships between channels within the channel member.

FIGS. 6A through 6F are diagrams illustrating the front and rear sides of the channel members making up the first through third channel members. FIG. 6A illustrates the side of the first channel member 50 on which the discharge modules 200 are mounted, and FIG. 6F illustrates the face of the third channel member 70 that comes in contact with the liquid discharge unit support member 81. The first channel member 50 and second channel member 60 have mutually adjoining channel member contact faces, illustrated in FIGS. 6B and 6C respectively, as do the second channel member 60 and third channel member 70 as illustrated in FIGS. 6D and 6E. The adjoining second channel member 60 and third channel member 70 have formed thereupon common channel grooves 62 and 71 which, when facing each other, form eight common channels extending in the longitudinal direction of the channel members. This forms a set of common supply channels 211 and common recovery channels 212 for each of the colors within the channel member 210 (FIG. 7). Communication ports 72 of the third channel member 70 communicate with the holes in the joint rubber members 100, so as to communicate with the liquid supply unit 220 by fluid connection. Multiple communication ports 61 are formed on the bottom face of the common channel grooves 62 of the second channel member 60, communicating with one end of individual channel grooves 52 of the first channel member 50. Communication ports 51 are formed at the other end of the individual channel grooves 52 of the first channel member 50 so as to communicate with the multiple discharge modules 200 by fluid connection via the communication ports 51. These individual channel grooves 52 allow the channels to be consolidated at the middle of the channel member.

The first through third channel members preferably are corrosion-resistant as to the ink, and formed from a material having a low linear expansion coefficient. Examples suitable materials include alumina, liquid crystal polymer (LCP), and composite materials (resin materials) where inorganic filler such as fine particles of silica or fiber or the like has been added to a base material such as polyphenyl sulfide (PPS), polysulfone (PSF), or denatured polyphenylene ether (PPE). The channel member 210 may be formed by laminating the three channel members and adhering using an adhesive agent, or in a case of selecting a composite resin material for the material, the three channel members may be joined by fusing.

Next, the connection relationship of the channels within the channel member 210 will be described with reference to FIG. 7. FIG. 7 is a partially enlarged transparent view of channels within the channel member 210 formed by joining the first through third channel members, as viewed from the side of the first channel member 50 on which the discharge modules 200 are mounted. The channel member 210 has, for each color, common supply channels 211 (211*a*, 211*b*, 211*c*, and 211*d*) and common recovery channels 212 (212*a*, 212*b*, 212*c*, and 212*d*) extending on the longitudinal direction of the liquid discharge head 3. Multiple individual supply channels 213 (213*a*, 213*b*, 213*c*, and 213*d*) formed of the individual channel grooves 52 are connected to the common supply channels 211 of each color via the communication ports 61. Multiple individual recovery channels 214 (214*a*, 214*b*, 214*c*, and 214*d*) formed of the individual channel grooves 52 are connected to the common recovery channels 212 of each color via the communication ports 61. This channel configuration enables ink to be consolidated at the recording element boards 10 situated at the middle of the channel members, from the common supply channels 211 via the individual supply channels 213. Ink can also be recovered from the recording element boards 10 to the common recovery channels 212 via the individual recovery channels 214.

Figure 8:
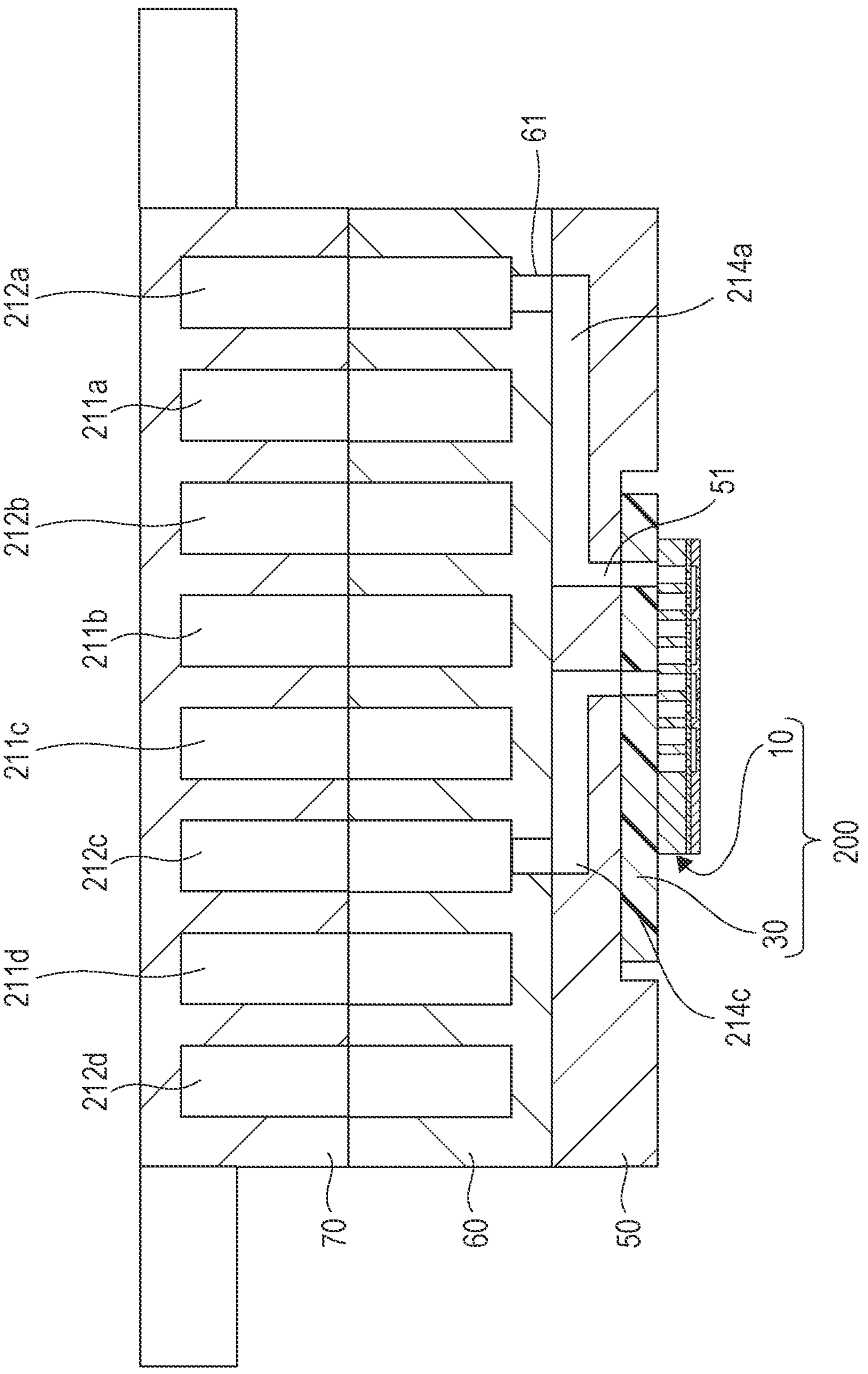
FIG. 8 is a cross-sectional view taken along line VIII-VIII in FIG. 7.

FIG. 8 is a cross-sectional view taken along line VIII-VIII in FIG. 7, illustrating that individual recovery channels (214*a* and 214*c*) communicate with the discharge module 200 via the communication ports 51. Although FIG. 8 only illustrates the individual recovery channels (214*a* and 214*c*), the individual supply channels 213 and the discharge module 200 communicate at a different cross-section, as illustrated in FIG. 7. Channels are formed in the support member 30 and recording element boards 10 included in the discharge module 200. The channels are for supplying ink from the first channel member 50 to the recording elements 15 (FIG. 10B) provided to the recording element board 10, and collecting (recirculating) part or all of the ink supplied to the recording elements 15 to the first channel member 50. The common supply channels 211 of each color is connected to the negative pressure control unit 230 (high-pressure side) of the corresponding color via its liquid supply unit 220, and the common recovery channels 212 are connected to the negative pressure control units 230 (low-pressure side) via the liquid supply units 220. The negative pressure control units 230 generate differential pressure (pressure difference) between the common supply channels 211 and common recovery channels 212. Accordingly, a flow occurs for each color in the liquid discharge head 3 according to the present application example where the channels are connected as illustrated in FIGS. 7 and 8, in the order of common supply channel 211→individual supply channels 213→recording element boards 10→individual recovery channels 214→common recovery channel 212.

Description of Discharge Module

Figure 9A:
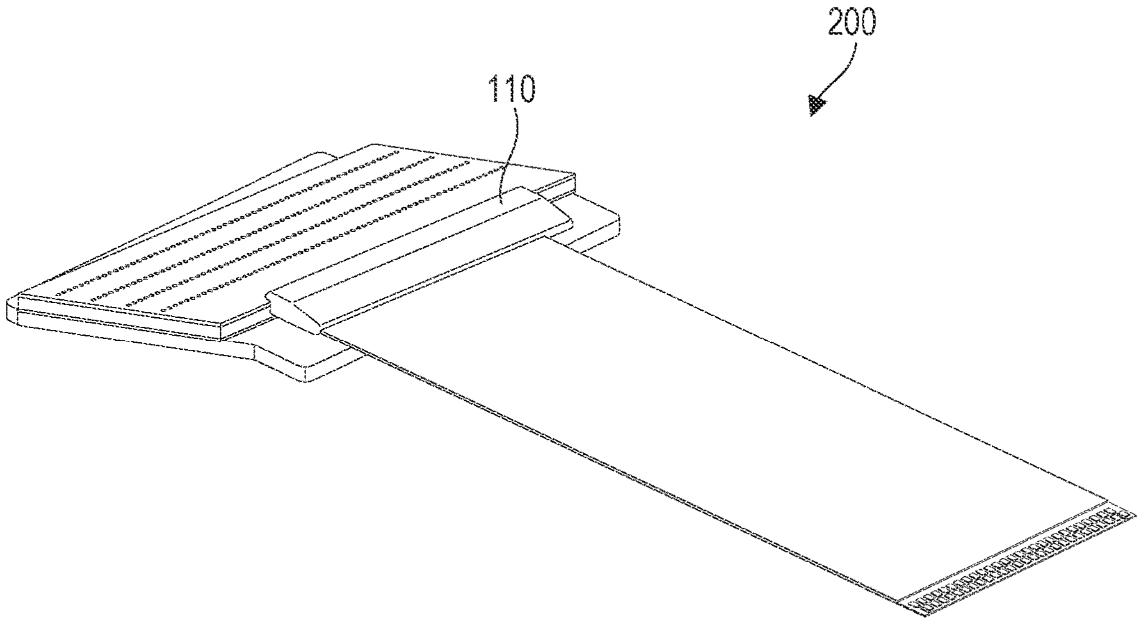
FIGS. 9A and 9B are diagrams illustrating a discharge module, FIG. 9A being a perspective view and FIG. 9B a disassembled view.
Figure 9B:
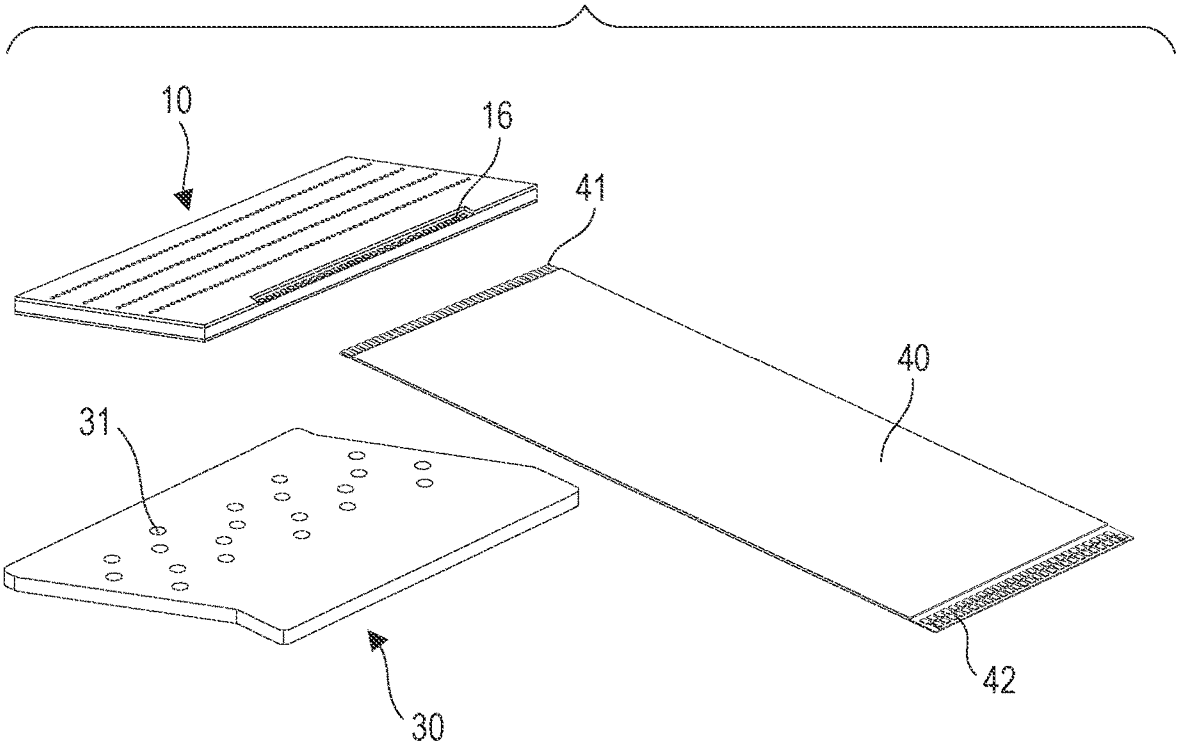

FIG. 9A illustrates a perspective view of one discharge module 200, and FIG. 9B illustrates a disassembled view thereof. The method of manufacturing the discharge module 200 is as follows. First, a recording element board 10 and flexible printed circuit board 40 are adhered to a support member 30 in which communication ports 31 have been formed beforehand. Subsequently, terminals 16 on the recording element board 10 are electrically connected to terminals 41 on the flexible printed circuit board 40 by wire bonding, following which the wire-bonded portion (electric connection portion) is covered and sealed by a sealant 110. Terminals 42 at the other end of the flexible printed circuit board 40 from the recording element board 10 are electrically connected to connection terminals 93 (FIG. 5) of the electric wiring board 90. The support member 30 is a support member that supports the recording element board 10, and also is a channel member communicating between the recording element board 10 and the channel member 210 by fluid connection. Accordingly, the support member 30 should have a high degree of flatness, and also should be able to be joined to the recording element board 10 with a high degree of reliability. Examples of suitable materials include alumina and resin materials.

Description of Structure of Recording Element Board

Figure 10A:
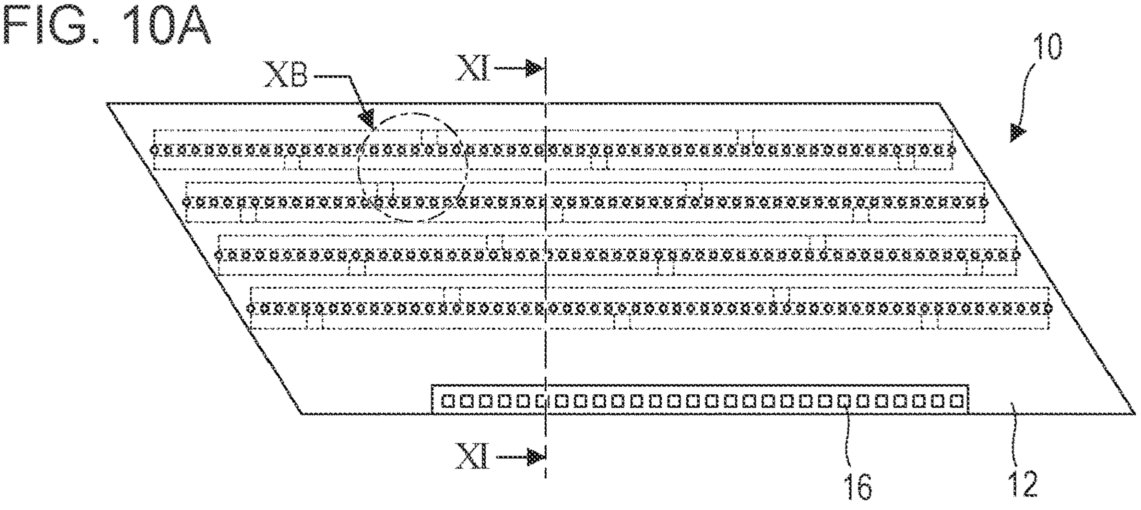
FIGS. 10A through 10C are diagrams illustrating the configuration of a recording element board.
Figure 10B:
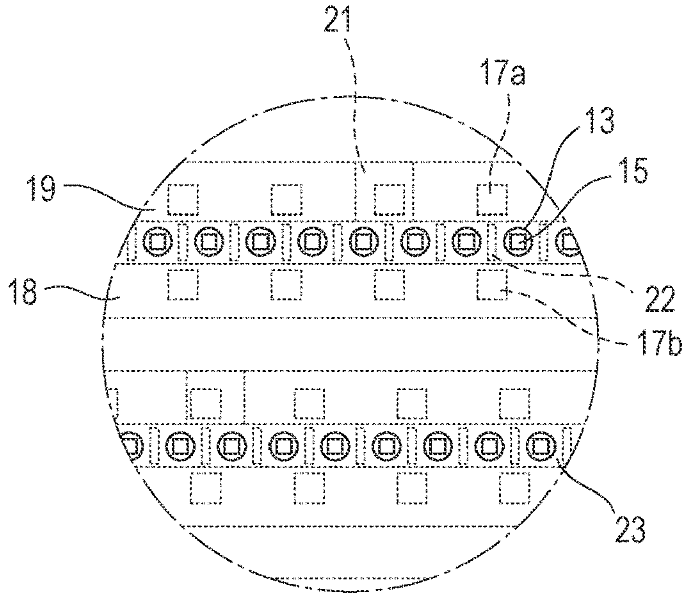
Figure 10C:
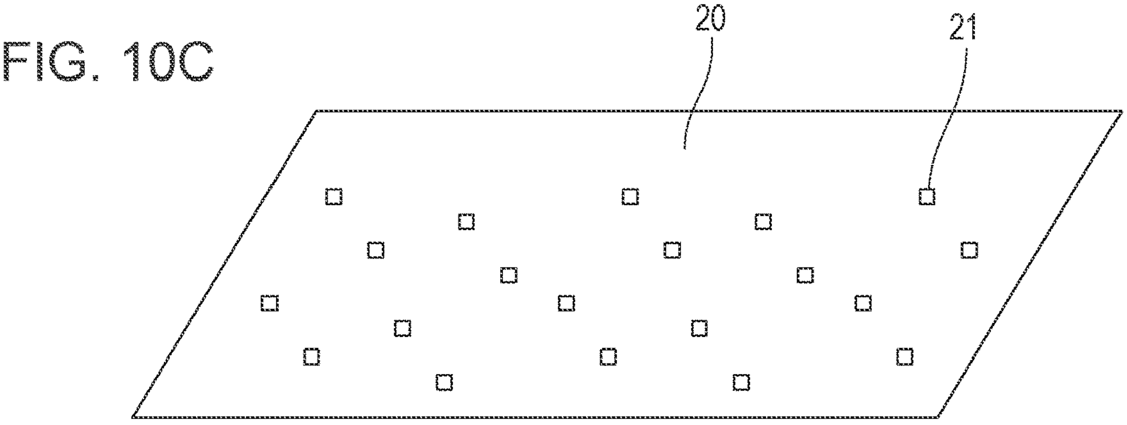

The configuration of the recording element board 10 according to the present application example will be described. FIG. 10A is a plan view of the side of the recording element board 10 on which discharge orifices 13 have been formed, FIG. 10B is an enlarged view of the portion indicated by XB in FIG. 10A, and FIG. 10C is a plan view of the rear face of the recording element board 10 from that in FIG. 10A. The recording element board 10 has a discharge orifice forming member 12, where four discharge orifice rows corresponding to the ink colors are formed, as illustrated in FIG. 10A. Note that hereinafter, the direction in which the discharge orifice rows, where multiple discharge orifices 13 are arrayed, extend, will be referred to as "discharge orifice row" direction.

The recording elements 15, which are heating elements to cause bubbling of the ink due to thermal energy, are disposed at positions corresponding to the discharge orifices 13, as illustrated in FIG. 10B. Pressure chambers 23 that contain the recording elements 15 are sectioned off by partitions 22. The recording elements 15 are electrically connected to the terminals 16 in FIG. 10A by electric wiring (omitted from illustration) provided to the recording element board 10. The recording elements 15 generate heat to cause the ink to boil, based on pulse signals input from a control circuit of the recording apparatus 1000, via the electric wiring board 90 (FIG. 5) and flexible printed circuit board 40 (FIG. 9B). The force of bubbling due to this boiling discharges ink from the discharge orifices 13. A liquid supply channel 18 extends along one side of each discharge orifice row, and a liquid recovery channel 19 along the other, as illustrated in FIG. 10B. The liquid supply channels 18 and liquid recovery channels 19 are channels extending in the direction of the discharge orifice rows provided on the recording element board 10, and communicate with the discharge orifices 13 via supply channels **17*a* and recovery channels 17*b*, respectively. The supply channels 17*a* and recovery channels 17*b* extend in a direction intersecting the plane (main face) of a substrate 11 that has the recording elements 15**.

Figure 11:
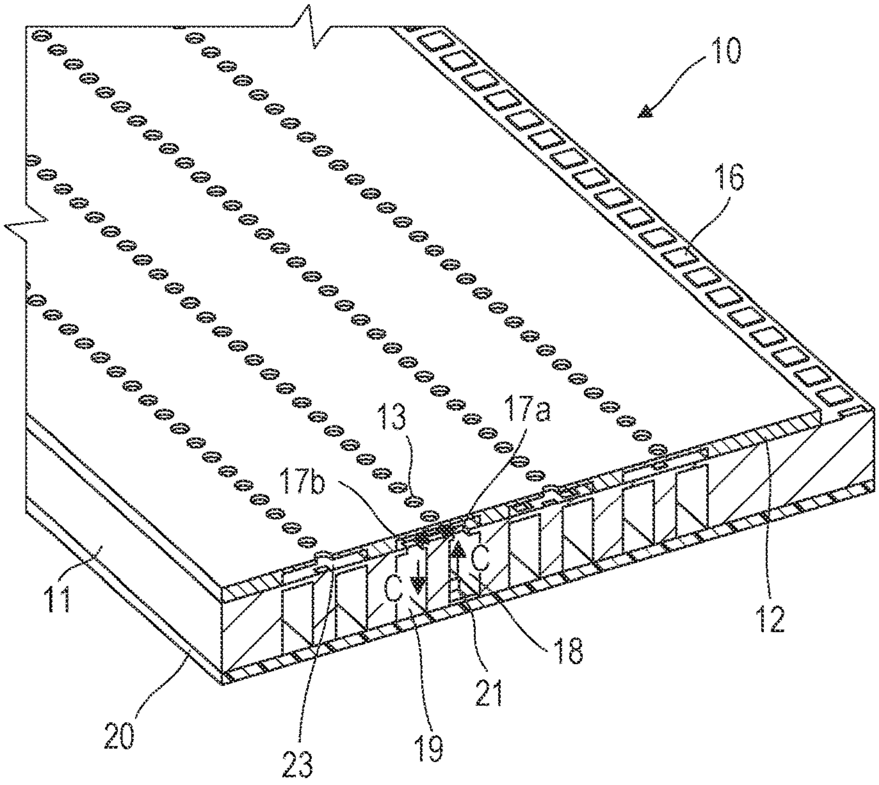
FIG. 11 is a perspective view illustrating the configuration of the recording element board including cross-section XI-XI in FIG. 10A and a cover.

A sheet-shaped cover 20 is laminated on the rear face from the face of the recording element board 10 on which the discharge orifices 13 are formed, the cover 20 having multiple openings 21 communicating with the liquid supply channel 18 and liquid recovery channel 19 which will be described later, as illustrated in FIGS. 10C and 11. In the present application example, three openings 21 are provided in the cover 20 for each liquid supply channel 18, and two openings 21 are provided for each liquid recovery channel 19. The openings 21 of the cover 20 communicate with the multiple communication ports 51 illustrated in FIG. 6A, as illustrated in FIG. 10B. The cover 20 functions as a lid that makes up part of the sides of the liquid supply channel 18 and liquid recovery channel 19 formed in the substrate 11 of the recording element board 10, as illustrated in FIG. 11. The cover 20 preferably is sufficiently corrosion-resistant as to the ink, and has to have a high degree of precision regarding the opening shapes of the openings 21 and the positions thereof from the perspective of color mixture prevention. Accordingly, a photosensitive resin material or silicon plate is preferably used as the material for the cover 20, with the openings 21 being formed by photolithography process. The cover 20 thus is for converting the pitch of channels by the openings 21. The cover 20 preferably is thin, taking into consideration pressure drop, and preferably is formed of a film-shaped resin material.

Next, the flow of ink within the recording element board 10 will be described. FIG. 11 is a perspective view, illustrating a cross-section of the recording element board 10 and cover 20 taken along plane XI-XI in FIG. 10A. The recording element board 10 is formed by laminating the substrate 11 formed of silicon (Si) and the discharge orifice forming member 12 formed of a photosensitive resin, with the cover 20 joined on the rear face of the substrate 11. The recording elements 15 are formed on the other face side of the substrate 11 (FIG. 10B) with the grooves making up the liquid supply channels 18 and liquid recovery channels 19 extending along the discharge orifice rows being formed at the reverse side thereof. The liquid supply channels 18 and liquid recovery channels 19 formed by the substrate 11 and cover 20 are respectively connected to the common supply channels 211 and common recovery channels 212 within the channel member 210, and there is differential pressure between the liquid supply channels 18 and liquid recovery channels 19. When ink is being discharged from multiple discharge orifices 13 of the liquid discharge head 3 and recording is being performed, the following flow is generated at discharge orifices 13 not performing discharge operations. That is to say, ink in the liquid supply channels 18 provided in the substrate 11 flows from the liquid supply channel 18 to the liquid recovery channel 19 via the supply channel 17*a*, pressure chamber 23, and recovery channel 17*b* (The flow indicated by arrows C in FIG. 11) due to this differential pressure. This flow enables ink that has thickened due to evaporation from the discharge orifices 13, bubbles, foreign substance, and so forth, to be recovered to the liquid recovery channel 19 from the discharge orifices 13 and pressure chambers 23 where recording is not being performed. This also enables thickening of ink at the discharge orifices 13 and pressure chambers 23 to be suppressed. Ink recovered to the liquid recovery channels 19 is recovered in the order of the communication ports 51 in the channel member 210, the individual recovery channels 214, and the common recovery channel 212, via the openings 21 of the cover 20 and the liquid communication ports 31 of the support member 30 (see FIG. 9B). This ink is ultimately recovered to the supply path of the recording apparatus 1000.

That is to say, ink supplied from the recording apparatus main unit to the liquid discharge head 3 is supplied and recovered by flowing in the order described below. First, the ink flows from the liquid connection portions 111 of the liquid supply unit 220 into the liquid discharge head 3. The ink is next supplied to the joint rubber members 100, communication ports 72 and common channel grooves 71 provided to the third channel member 70, common channel grooves 62 and communication ports 61 provided to the second channel member 60, and individual channel grooves 52 and communication ports 51 provided to the first channel member 50. Thereafter, the ink is supplied to the pressure chambers 23 in the order of the liquid communication ports 31 provided to the support member 30, the openings 21 provided to the cover 20, and the liquid supply channels 18 and supply ports 17*a* provided to the substrate 11. Ink that has been supplied to the pressure chambers 23 but not discharged from the discharge orifices 13 flows in the order of the recovery channels 17*b* and liquid recovery channels 19 provided to the substrate 11, the openings 21 provided to the cover 20, and the liquid communication ports 31 provided to the support member 30. Thereafter, the ink flows in the order of the communication ports 51 and individual channel grooves 52 provided to the first channel member 50, the communication ports 61 and common channel grooves 62 provided to the second channel member 60, the common channel grooves 71 and communication ports 72 provided to the third channel member 70, and the joint rubber members 100. The ink further flows outside of the liquid discharge head 3 from the liquid connection portions 111 provided to the liquid supply unit. In the first circulation path illustrated in FIG. 2, ink that has flowed in from the liquid connection portions 111 passes through the negative pressure control unit 230 and then is supplied to the joint rubber members 100. In the second circulation path illustrated in FIG. 3, ink recovered from the pressure chambers 23 passes through the joint rubber members 100, and then flows out of the liquid discharge head 3 from the liquid connection portions 111 via the negative pressure control unit 230.

Also, not all ink flowing in from one end of the common supply channel 211 of the liquid discharge unit 300 is supplied to the pressure chamber 23 via the individual supply channels 213*a*, as illustrated in FIGS. 2 and 3. There is ink that flows from the other end of the common supply channel 211 and through the liquid supply unit 220 without ever entering the individual supply channels 213*a*. Thus, providing channels where ink flows without going through the recording element board 10 enables backflow in the circulatory flow of ink to be suppressed, even in a case where the recording element board 10 has fine channels where the flow resistance is great, as in the case of the present application example. Accordingly, the liquid discharge head according to the present application example is capable of suppressing thickening of ink in pressure chambers and nearby the discharge orifices, thereby suppressing defective discharge direction and non-discharge of ink, so high image quality recording can be performed as a result.

Description of Positional Relationship Among Recording Element Boards

Figure 12:
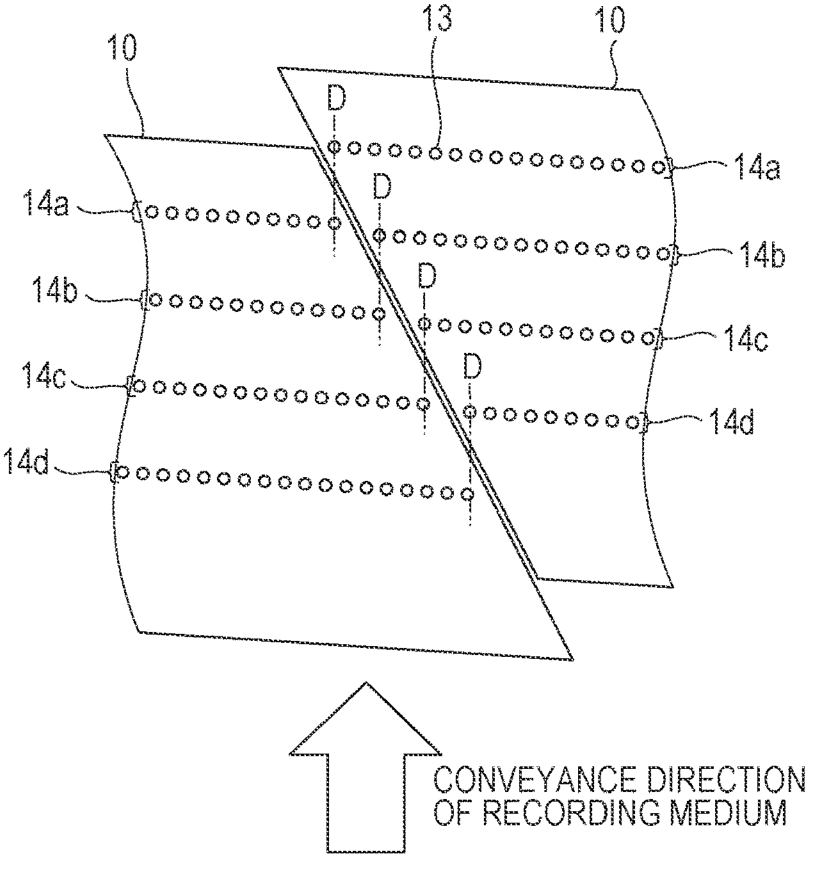
FIG. 12 is a plan view showing a partially enlarged illustration of adjacent portions of recording element boards in two adjacent discharge modules.

FIG. 12 is a plan view illustrating a partial enlargement of adjacent portions of recording element boards 10 for two adjacent discharge modules. The recording element boards 10 according to the present application example are shaped as parallelograms, as illustrated in FIGS. 10A through 10C. The discharge orifice rows (14*a* through 14*d*) where discharge orifices 13 are arrayed on the recording element boards 10 are dispose inclined to the conveyance direction of the recording medium by a certain angle, as illustrated in FIG. 12. At least one discharge orifice of discharge orifice rows at adjacent portions of the recording element board 10 is made to overlap in the conveyance direction of the recording medium thereby. In FIG. 12, two discharge orifices on the lines D are in a mutually overlapping relationship. This layout enables black streaks and blank portions in the recorded image to be made less conspicuous by driving control of the overlapping discharge orifices, even in a case where the positions of the recording element board 10 are somewhat deviated from the predetermined position. The multiple recording element boards 10 may be laid out in a straight line (inline) instead of in a staggered arrangement. In this case as well, black streaks and blank portions at connecting portions between the recording element boards 10 can be handled while suppressing increased length of the liquid discharge head 3 in the conveyance direction of the recording medium, due to a configuration such as illustrated in FIG. 12. Although the shape of the primary face of the recording element board 10 according to the present embodiment is a parallelogram, this is not restrictive. The configuration of the present invention can be suitably applied even in cases where the shape is a rectangle, a trapezoid, or another shape.

Description of Modification of Liquid Discharge Head Configuration

Figure 27:
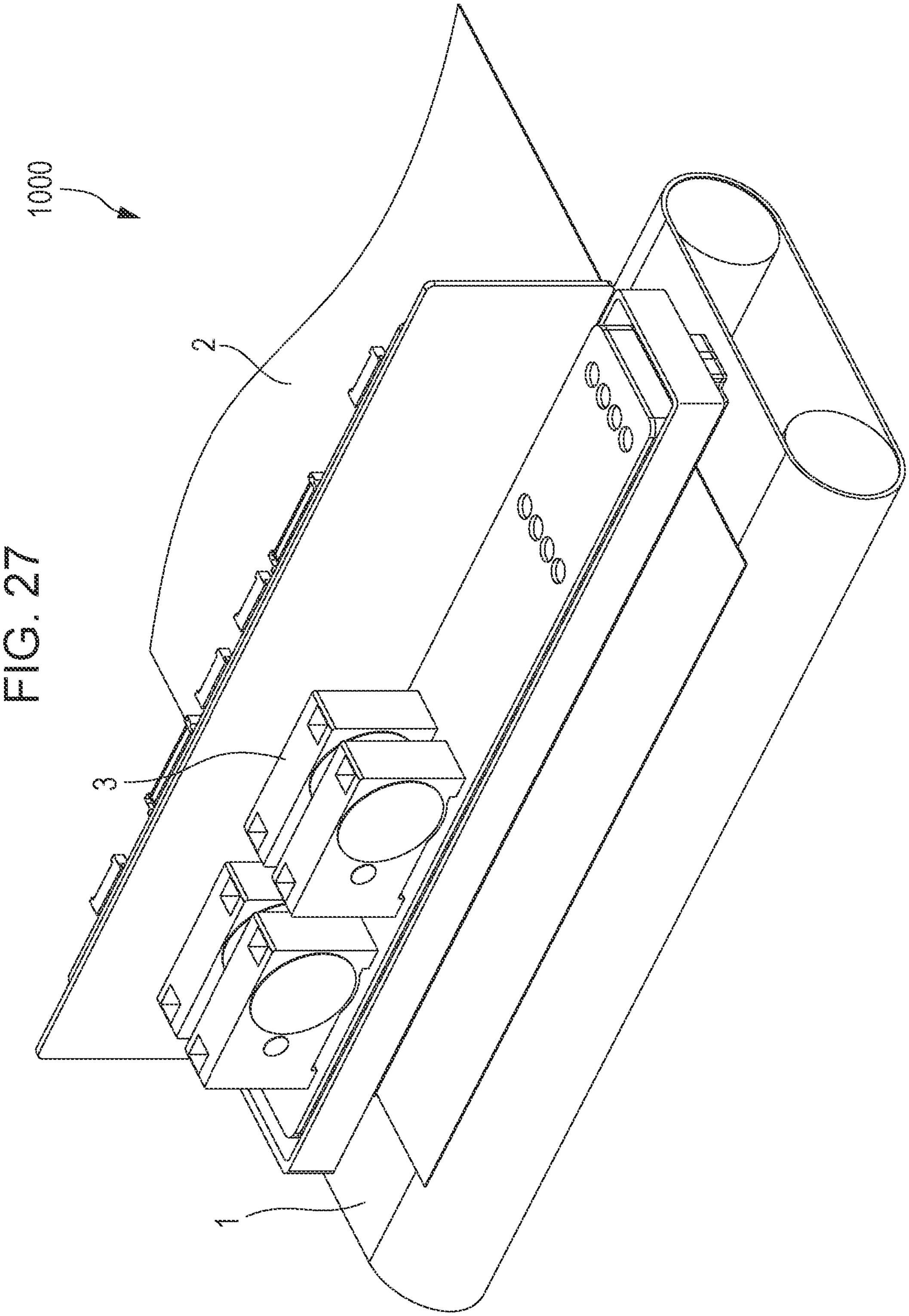
FIG. 27 is a diagram illustrating a modification of the liquid discharge head according to the present invention.
Figure 29A:
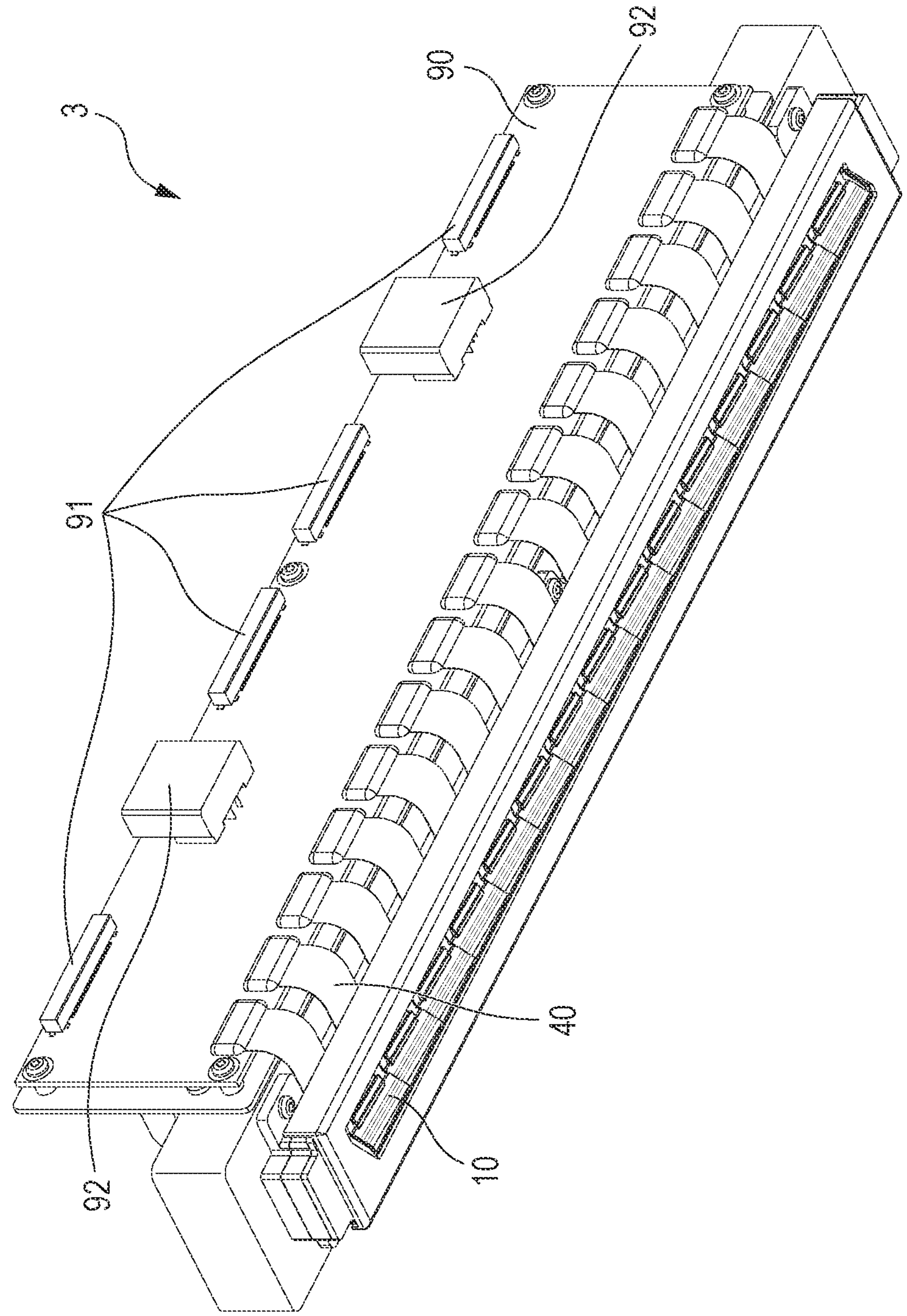
FIGS. 29A and 29B are diagrams illustrating a modification of the liquid discharge head according to the present invention.
Figure 29B:
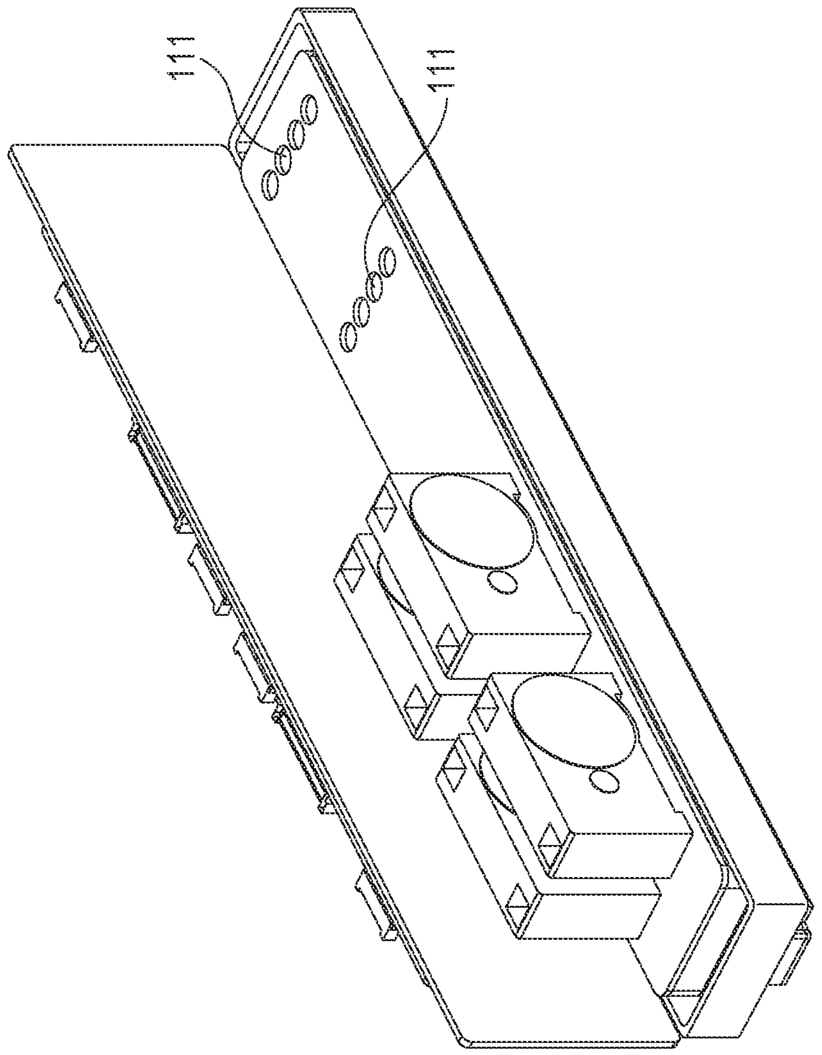
Figure 30:
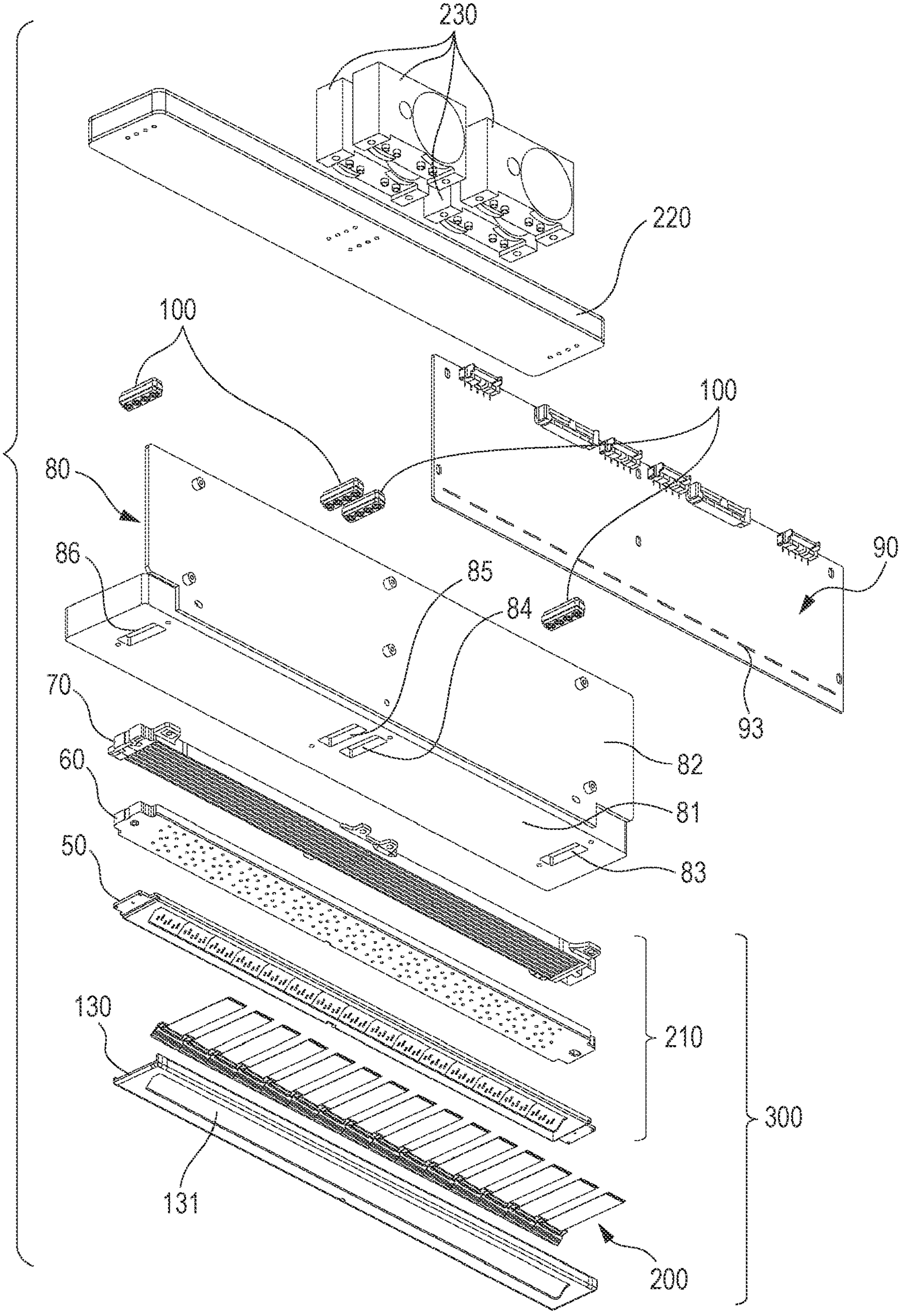
FIG. 30 is a diagram illustrating a modification of the liquid discharge head according to the present invention.

A modification of the above-described liquid discharge head configuration will be described with reference to FIGS. 27 through 32. Configurations and functions that are the same as the above-described example will be omitted from description, and points of difference will primarily be described. In this modification, the multiple liquid connection portions 111 that are connection portions between the outside of the liquid discharge head 3 and the liquid are disposed in a consolidated manner at one end side of the liquid discharge head 3 in the longitudinal direction, as illustrated in FIGS. 27 through 29. Multiple negative pressure control units 230 are disposed in a consolidated manner at the other end side of the liquid discharge head 3 (FIG. 30). The liquid supply unit 220 included in the liquid discharge head 3 is configured as a long and slender unit corresponding to the length of the liquid discharge head 3, and has channels and filters 221 corresponding to the liquid of the four colors being supplied. The positions of the openings 83 through 86 provided on the liquid discharge unit support member 81 also are at different positions from the liquid discharge head 3 described above, as illustrated in FIG. 30.

Figure 31:
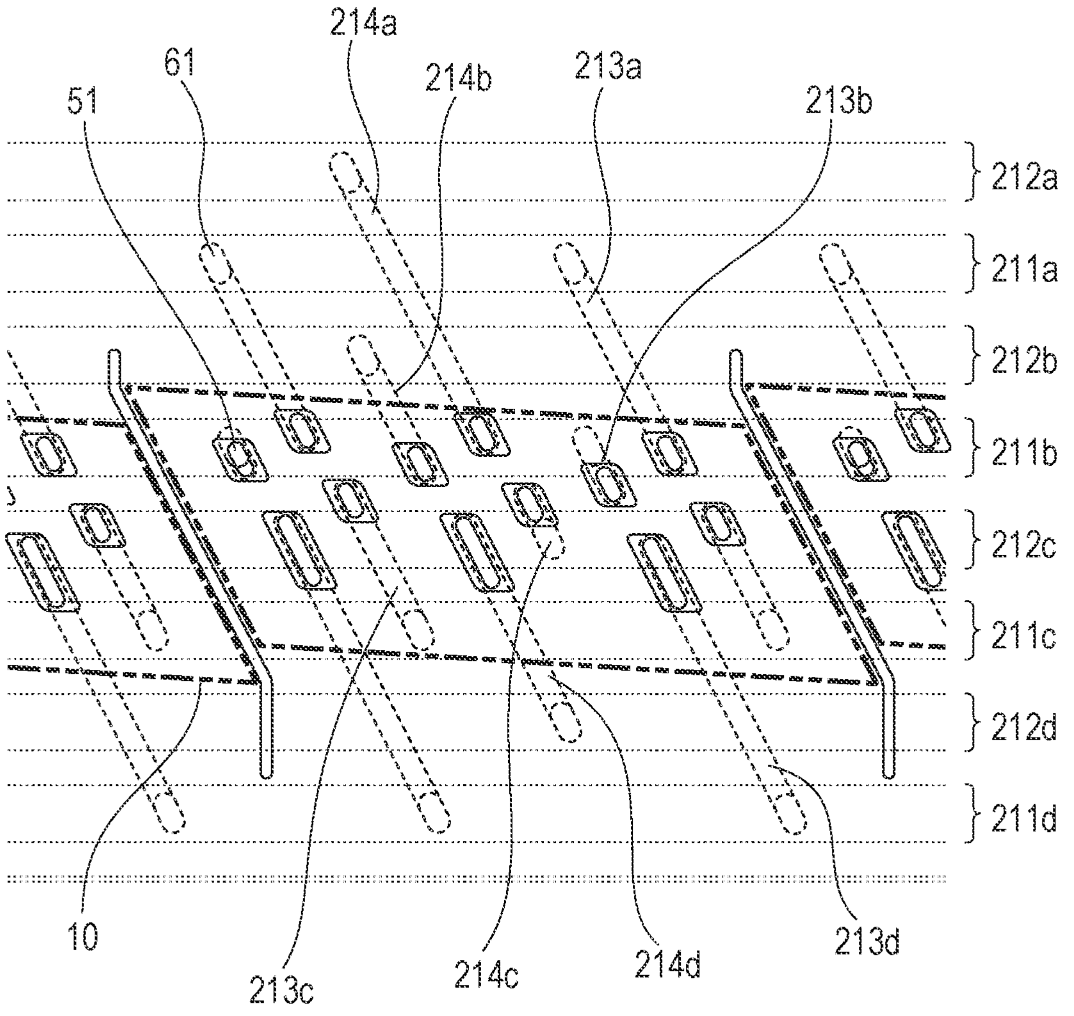
FIG. 31 is a diagram illustrating a modification of the liquid discharge head according to the present invention.
Figure 32:
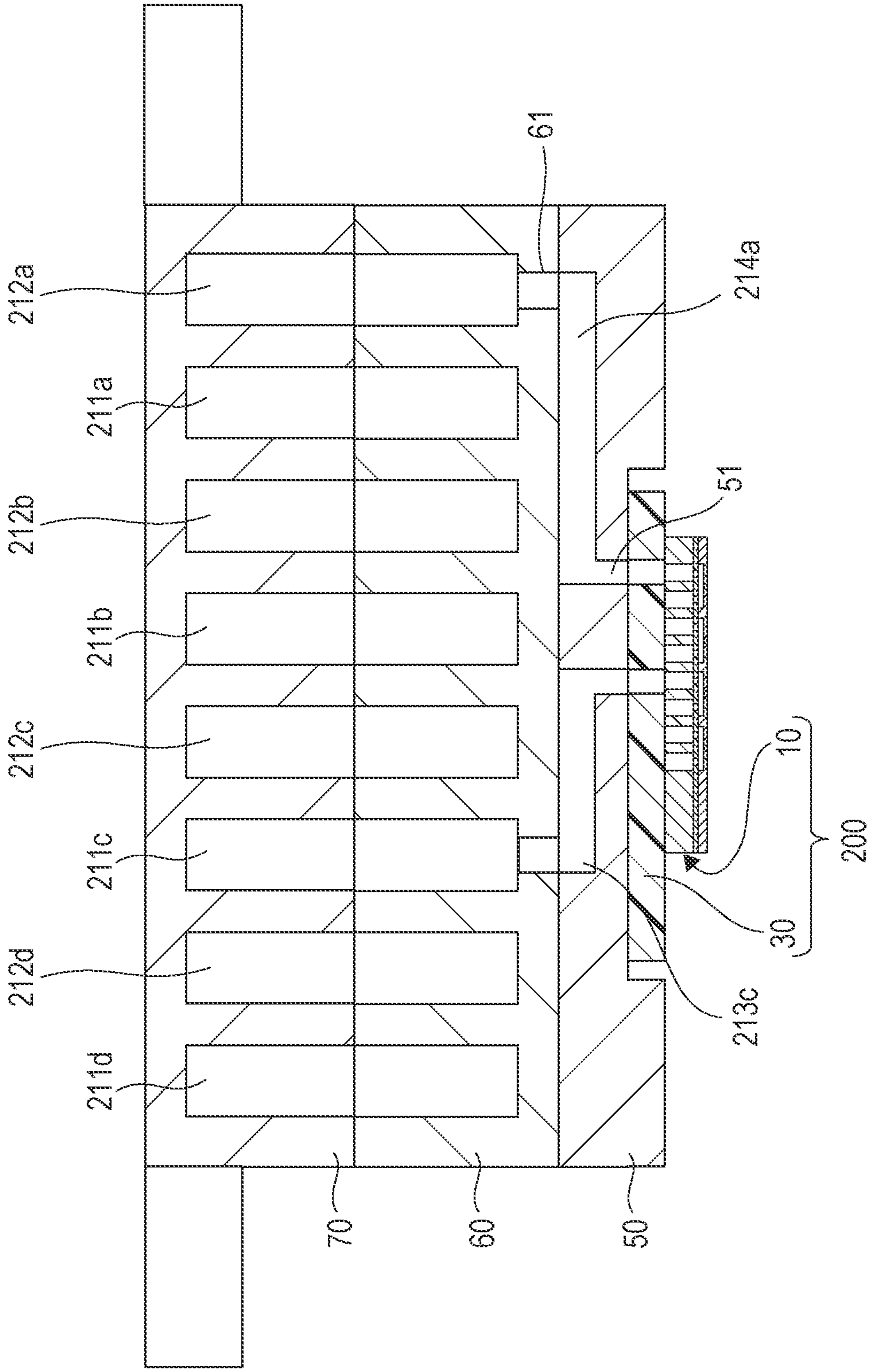
FIG. 32 is a diagram illustrating a modification of the liquid discharge head according to the present invention.

FIG. 31 illustrates the laminated states of the channel members 50, 60, and 70. Multiple recording element boards 10 are arrayed in a straight line on the upper face of the first channel member 50 that is the highest layer of the multiple channel members 50, 60, and 70. There are two individual supply channels 213 and one individual recovery channel 214 for each liquid color, as channels communicating with the openings 21 (FIG. 20C) formed on the rear side of each recording element board 10. Corresponding to this, there also are two supply openings 21 and one recovery opening 21 for each liquid color, with regard to the openings 21 formed on the cover 20 provided to the rear face of the recording element boards 10. The common supply channels 211 and common recovery channels 212 extending in the longitudinal direction of the liquid discharge head 3 are arrayed alternatingly, as illustrated in FIG. 32.

Second Application Example

The configuration of an inkjet recording apparatus 1000 and liquid discharge head 3 according to a second application example to which the present invention can be applied will be described. Note that portions that differ from the first application example will primarily be described, and portions that are the same as the first application example will be omitted from description.

Description of Inkjet Recording Apparatus

Figure 13:
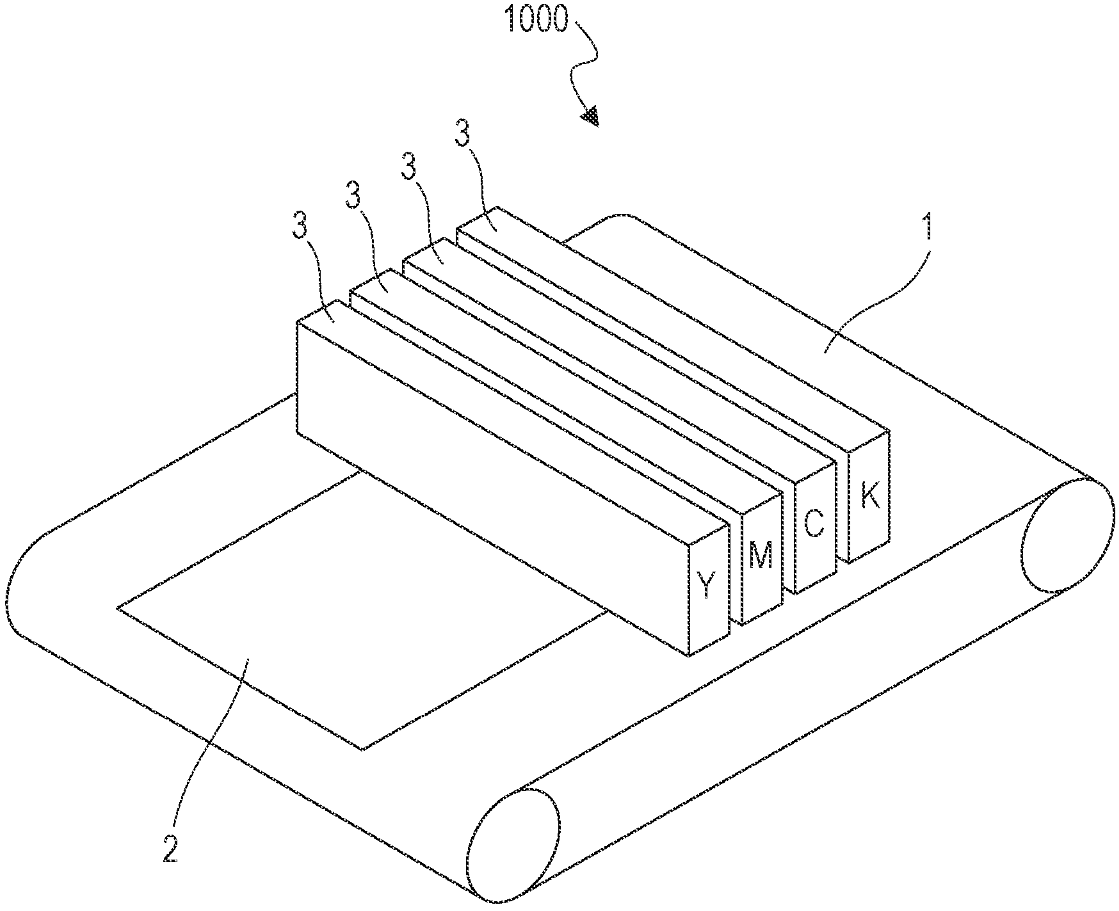
FIG. 13 is a diagram illustrating the schematic configuration of the recording apparatus according to a second application example to which the present invention is applicable.
Figure 19A:
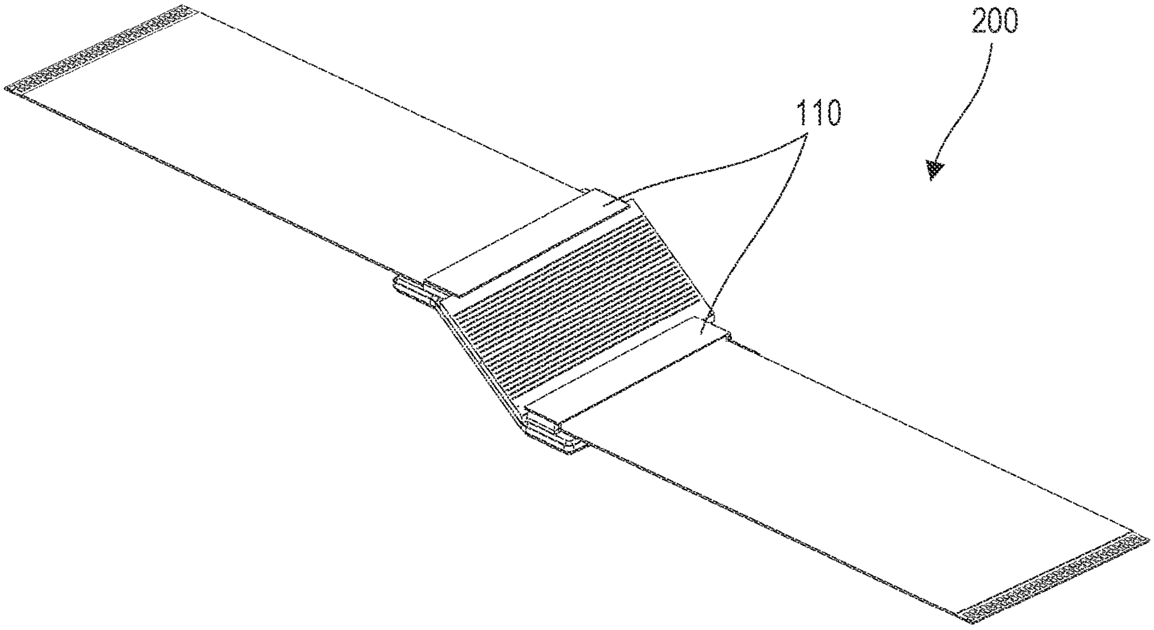
FIGS. 19A and 19B are diagrams illustrating a discharge module, FIG. 19A being a perspective view and FIG. 19B a disassembled view.

FIG. 13 illustrates an inkjet recording apparatus according to the second application example of the present invention. The recording apparatus 1000 according to the second application example differs from the first application example with regard to the point that full-color recording is performed on the recording medium by arraying four monochrome liquid discharge heads 3, each corresponding to one of CMYK ink. Although the number of discharge orifice rows usable per color in the first application example was one row, the number of discharge orifice rows usable per color in the second application example is 20 rows (FIG. 19A). This enables extremely high-speed recording to be performed, by allocating recording data to multiple discharge orifice rows. Even if there are discharge orifices that exhibit ink non-discharge, reliability is improved by a discharge orifice at a corresponding position in the conveyance direction of the recording medium in another row performing discharge in a complementary manner, and accordingly the arrangement is suitable for industrial printing. The supply system of the recording apparatus 1000, the buffer tank 1003, and the main tank 1006 (FIG. 2) are connected to the liquid discharge heads 3 by fluid connection, in the same way as in the first application example. Each liquid discharge head 3 is also electrically connected to an electric control unit that transmits electric power and discharge control signals to the liquid discharge head 3.

Description of Circulation Paths

The first and second circulation paths illustrated in FIGS. 2 and 3 can be used as the liquid circulation paths between the recording apparatus 1000 and the liquid discharge heads 3, in the same way as in the first application example.

Description of Structure of Liquid Discharge Head

Figure 14A:
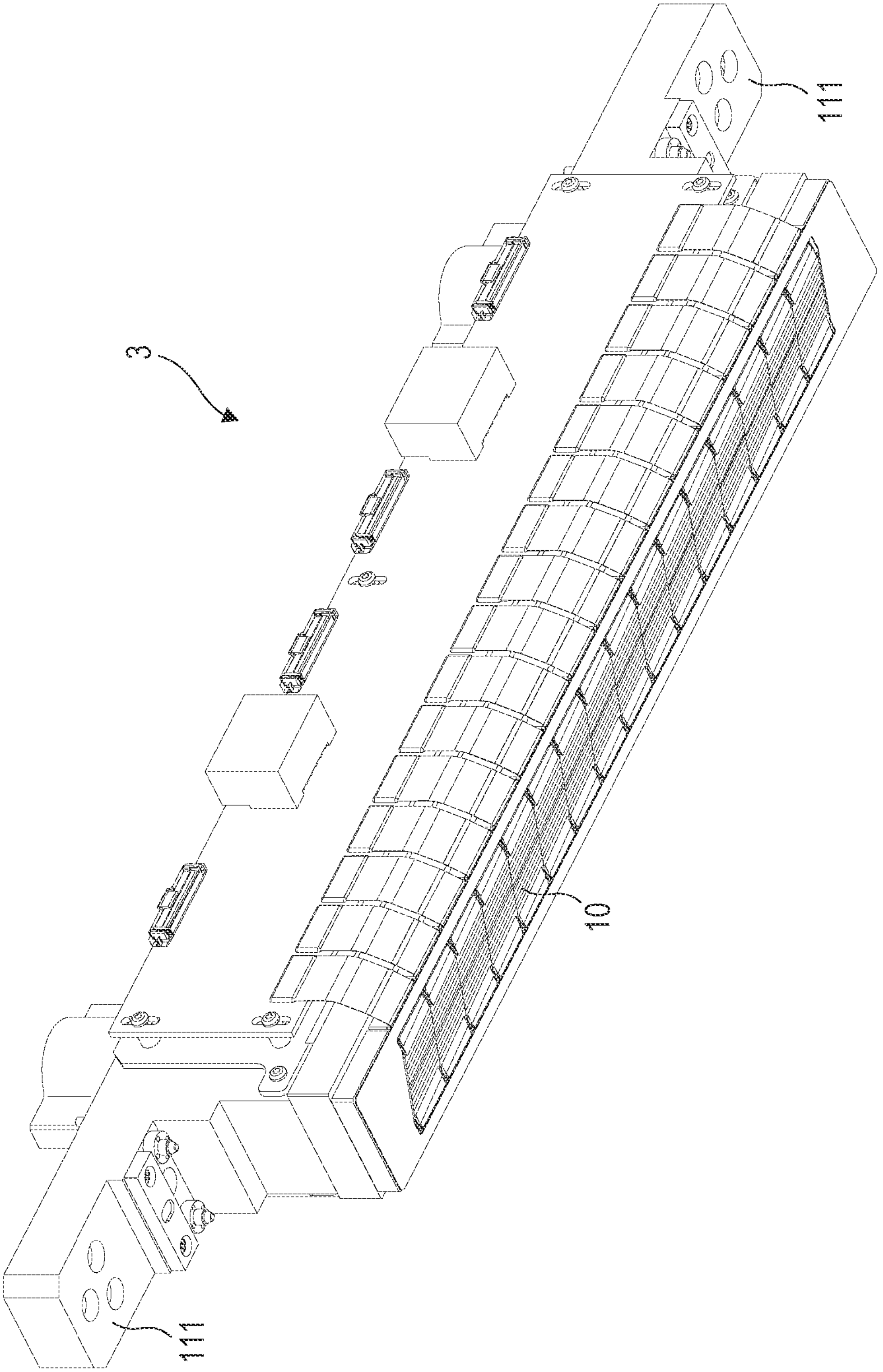
FIGS. 14A and 14B are perspective views of the liquid discharge head according to the second application example.
Figure 14B:
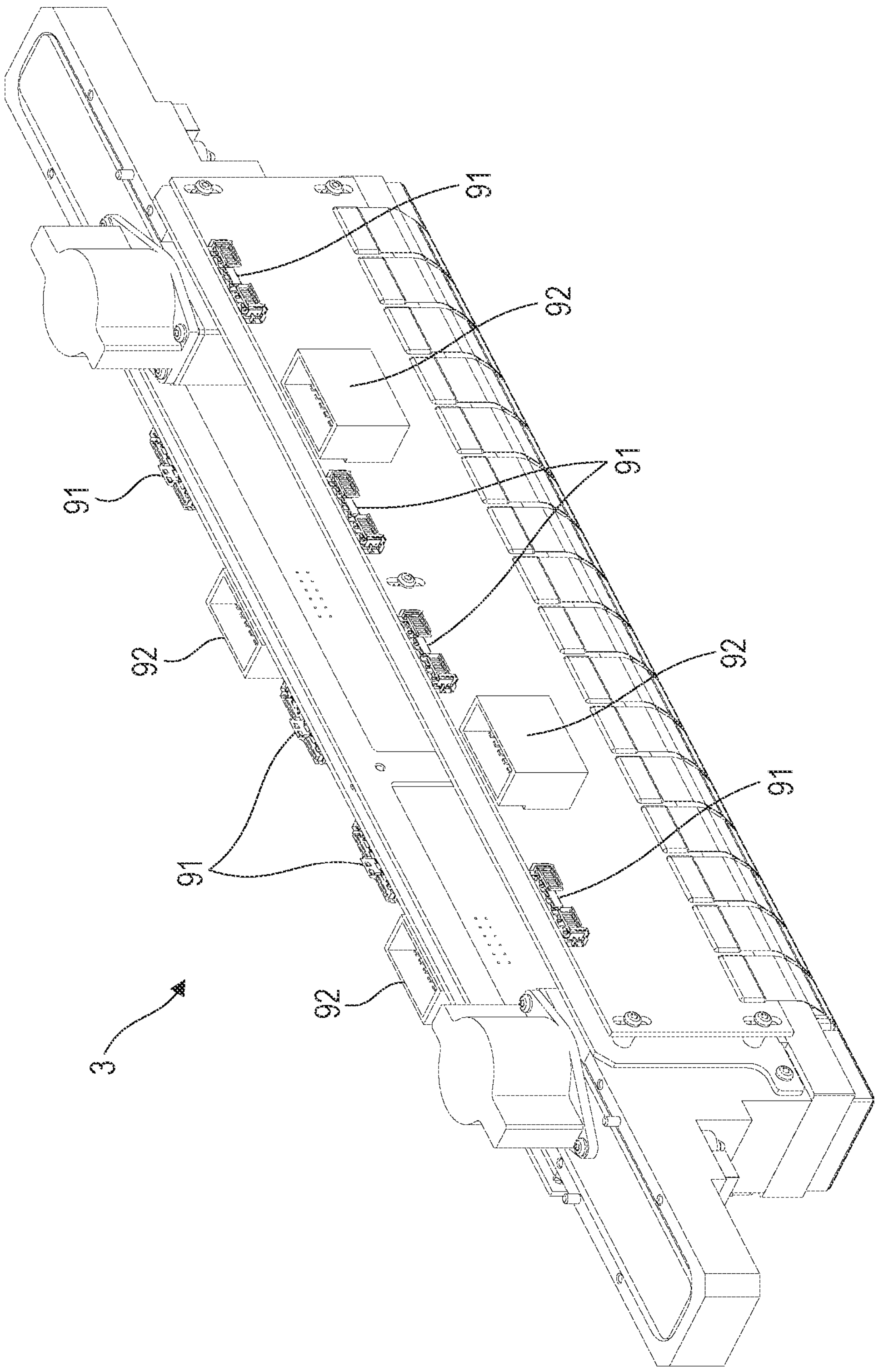

Description will be made regarding the structure of the liquid discharge head 3 according to the second application example of the present invention. FIGS. 14A and 14B are perspective diagrams of the liquid discharge head 3 according to the present application example. The liquid discharge head 3 has 16 recording element boards 10 arrayed in a straight line in the longitudinal direction of the liquid discharge head 3, and is an inkjet line recording head that can record with ink of one color. The liquid discharge head 3 has the liquid connection portions 111, signal input terminals 91, and power supply terminals 92 in the same way as the first application example. The liquid discharge head 3 according to the application example differs from the first application example in that the input terminals 91 and power supply terminals 92 are disposed on both sides of the liquid discharge head 3, since the number of discharge orifice rows is greater. This is to reduce voltage drop and signal transmission delay that occurs at wiring portions provided to the recording element boards 10.

Figure 15:
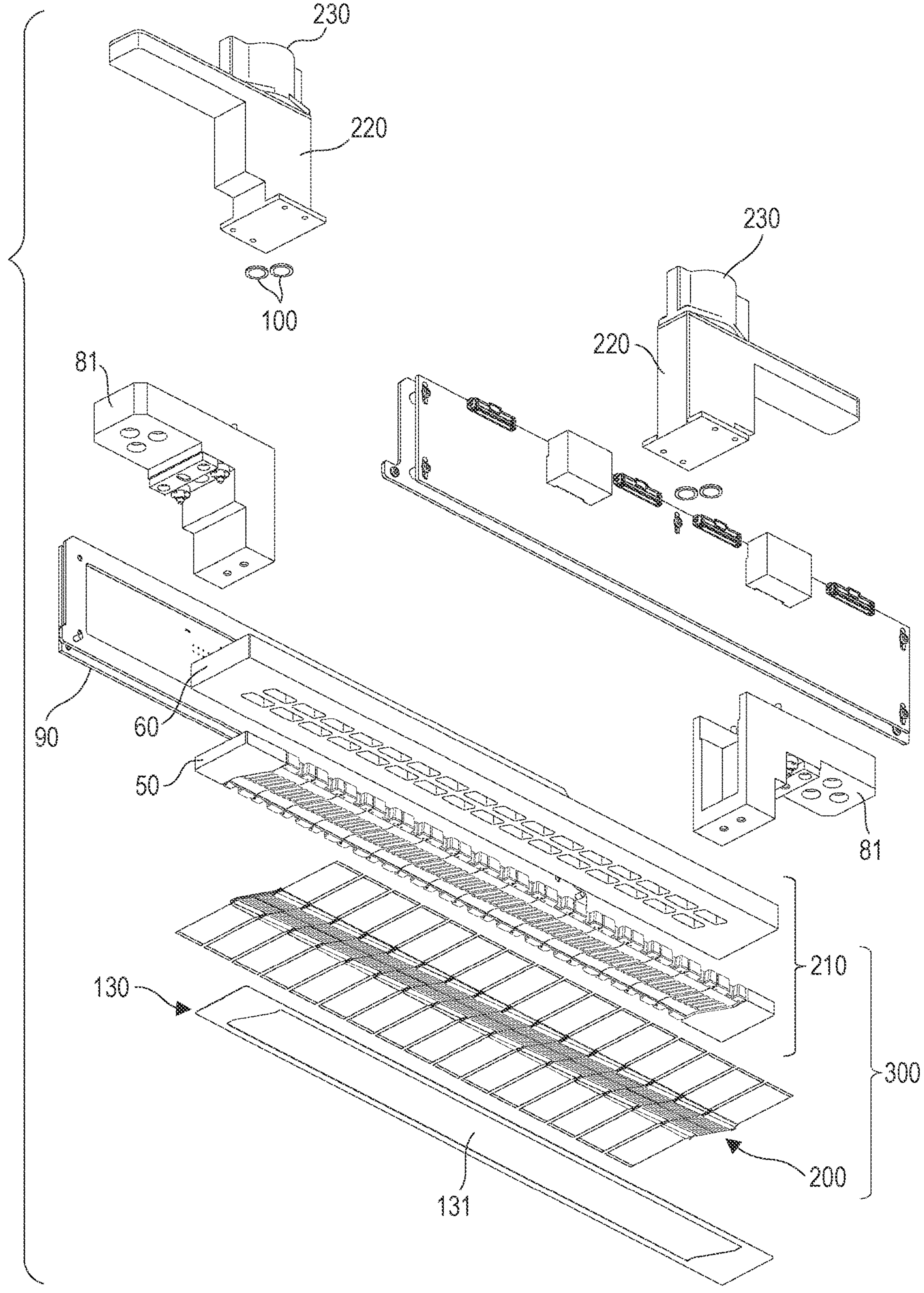
FIG. 15 is a disassembled perspective view of the liquid discharge head in FIGS. 14A and 14B.

FIG. 15 is a disassembled perspective view of the liquid discharge head 3, illustrating each part or unit making up the liquid discharge head 3 disassembled according to function. The roles of the units and members, and the order of liquid flow through the liquid discharge head, are basically the same as in the first application example, but the function by which the rigidity of the liquid discharge head is guaranteed is different. The rigidity of the liquid discharge head was primarily guaranteed in the first application example by the liquid discharge unit support member 81, but the rigidity of the liquid discharge head is guaranteed in the second application example by the second channel member 60 included in the liquid discharge unit 300. There are liquid discharge unit support members 81 connected to both ends of the second channel member 60 in the present application example. This liquid discharge unit 300 is mechanically enjoined to a carriage of the recording apparatus 1000, whereby the liquid discharge head 3 is positioned. Liquid supply units 220 having negative pressure control units 230, and the electric wiring board 90, are joined to the liquid discharge unit support members 81. Filters (omitted from illustration) are built into the two liquid supply units 220. The two negative pressure control units 230 are set to control pressure by high and low negative pressure that relatively differ from each other. When the high-pressure side and low-pressure side negative pressure control units 230 are disposed on the ends of the liquid discharge head 3 as illustrated in FIGS. 14A through 15, the flow of ink on the common supply channel 211 and the common recovery channel 212 that extend in the longitudinal direction of the liquid discharge head 3 are mutually opposite. This promotes heat exchange between the common supply channel 211 and common recovery channel 212, so that the temperature difference between the two common channels can be reduced. This is advantageous in that temperature difference does not readily occur among the multiple recording element boards 10 disposed along the common channels, and accordingly unevenness in recording due to temperature difference does not readily occur.

The channel member 210 of the liquid discharge unit 300 will be described in detail next. The channel member 210 is the first channel member 50 and second channel member 60 that have been laminated as illustrated in FIG. 15, and distributes ink supplied from the liquid supply unit 220 to the discharge modules 200. The channel member 210 also serves as a channel member for returning ink recirculating from the discharge modules 200 to the liquid supply unit 220. The second channel member 60 of the channel member 210 is a channel member in which the common supply channel 211 and common recovery channel 212 have been formed, and also primary undertakes the rigidity of the liquid discharge head 3. Accordingly, the material of the second channel member 60 preferably is sufficiently corrosion-resistant as to the ink and has high mechanical strength. Examples of suitably-used materials include stainless steel, titanium (Ti), alumina, or the like.

Figure 16A:
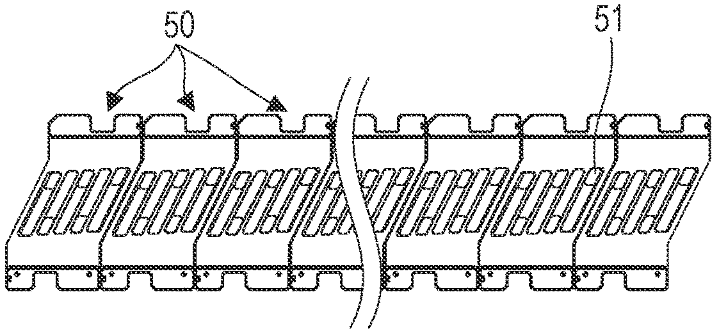
FIGS. 16A through 16E are diagrams illustrating the configuration of first and second flow channel members making up the channel member that the liquid discharge head in FIGS. 14A and 14B has.
Figure 16B:
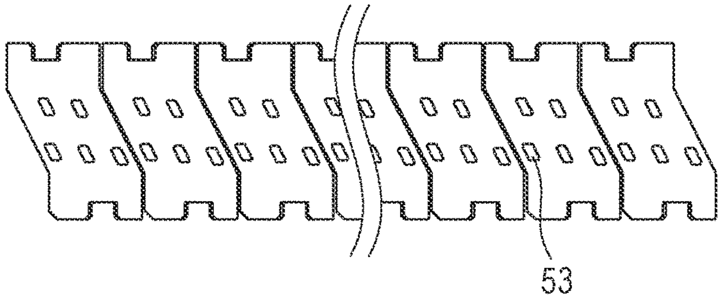
Figure 16C:
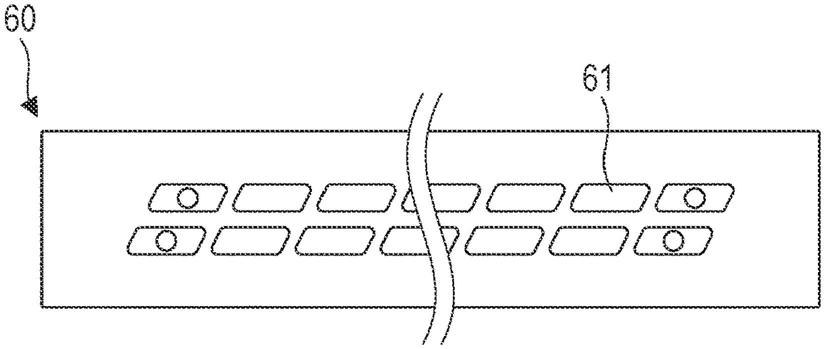
Figure 16D:
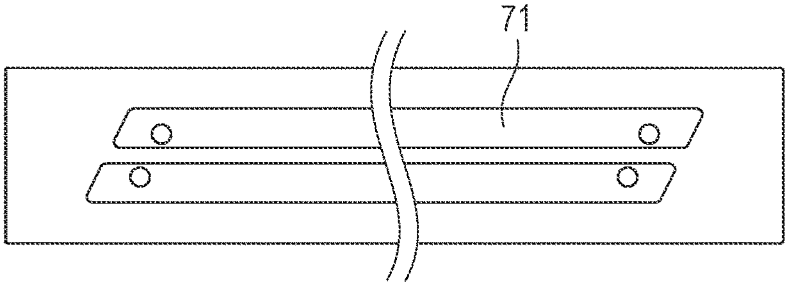
Figure 16E:
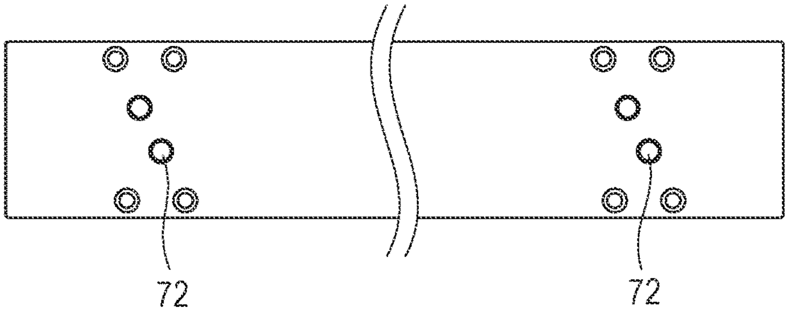

FIG. 16A illustrates the face of the first channel member 50 on the side where the discharge modules 200 are mounted, and FIG. 16B is a diagram illustrating the reverse face therefrom, that comes into contact with the second channel member 60. Unlike the case in the first application example, the first channel member 50 according to the second application example is an arrangement where multiple members corresponding to the discharge modules 200 are arrayed adjacently. Using this divided structure enables a length corresponding to the length of the liquid discharge head to be realized by arraying multiple modules, and accordingly can particularly be suitably used in relatively long-scale liquid discharge heads corresponding to sheets of B2 size and even larger, for example. The communication ports 51 of the first channel member 50 communicate with the discharge modules 200 by fluid connection as illustrated in FIG. 16A, and individual communication ports 53 of the first channel member 50 communicate with the communication ports 61 of the second channel member 60 by fluid connection, as illustrated in FIG. 16B. FIG. 16C illustrates the face of the second channel member 60 that comes in contact with the first channel member 50, FIG. 16D illustrates a cross-section of the middle portion of the second channel member 60 taken in the thickness direction, and FIG. 16E is a diagram illustrating the face of the second channel member 60 that comes into contact with the liquid supply unit 220. The functions of the channels and communication ports of the second channel member 60 are the same as in with one color worth in the first application example. One of the common channel grooves 71 of the second channel member 60 is the common supply channel 211 illustrated in FIG. 17, and the other is the common recovery channel 212. Both have ink supplied from one end side toward the other end side following the longitudinal direction of the liquid discharge head 3. Unlike the case in the first application example, the flow directions of ink for the common supply channel 211 and common recovery channel 212 are mutually opposite directions.

Figure 17:
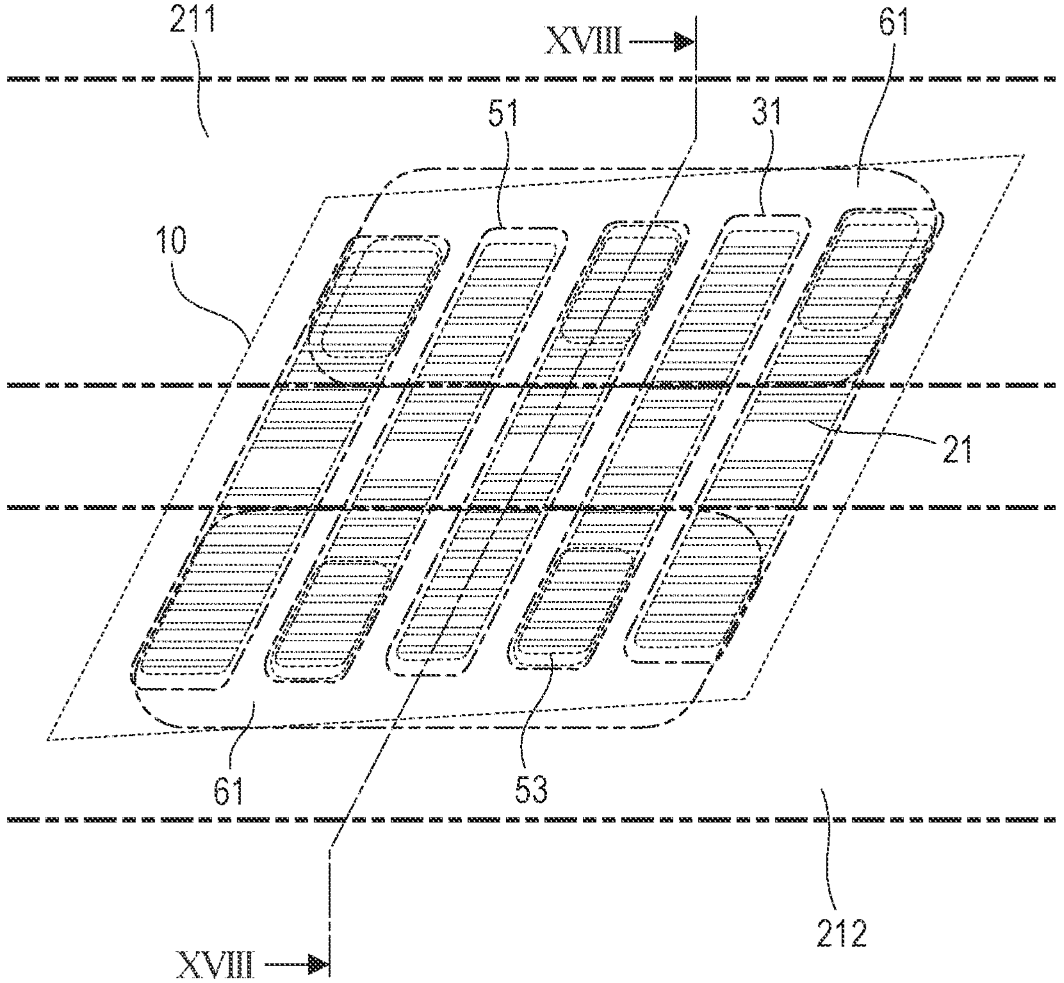
FIG. 17 is a diagram for describing connection relationships of liquid in the recording element board and channel member.

FIG. 17 is a transparent view illustrating the connection relationship regarding ink between the recording element boards 10 and the channel member 210. The set of the common supply channel 211 and common recovery channel 212 extending in the longitudinal direction of the liquid discharge head 3 is provided within the channel member 210, as illustrated in FIG. 17. The communication ports 61 of the second channel member 60 are each positioned with and connected to the individual communication ports 53 of the first channel member 50, thereby forming a liquid supply path from the communication ports 72 of the second channel member 60 to the communication ports 51 of the first channel member 50 via the common supply channel 211. In the same way, a liquid supply path from the communication ports 72 of the second channel member 60 to the communication ports 51 of the first channel member 50 via the common recovery channel 212 is also formed.

Figure 18:
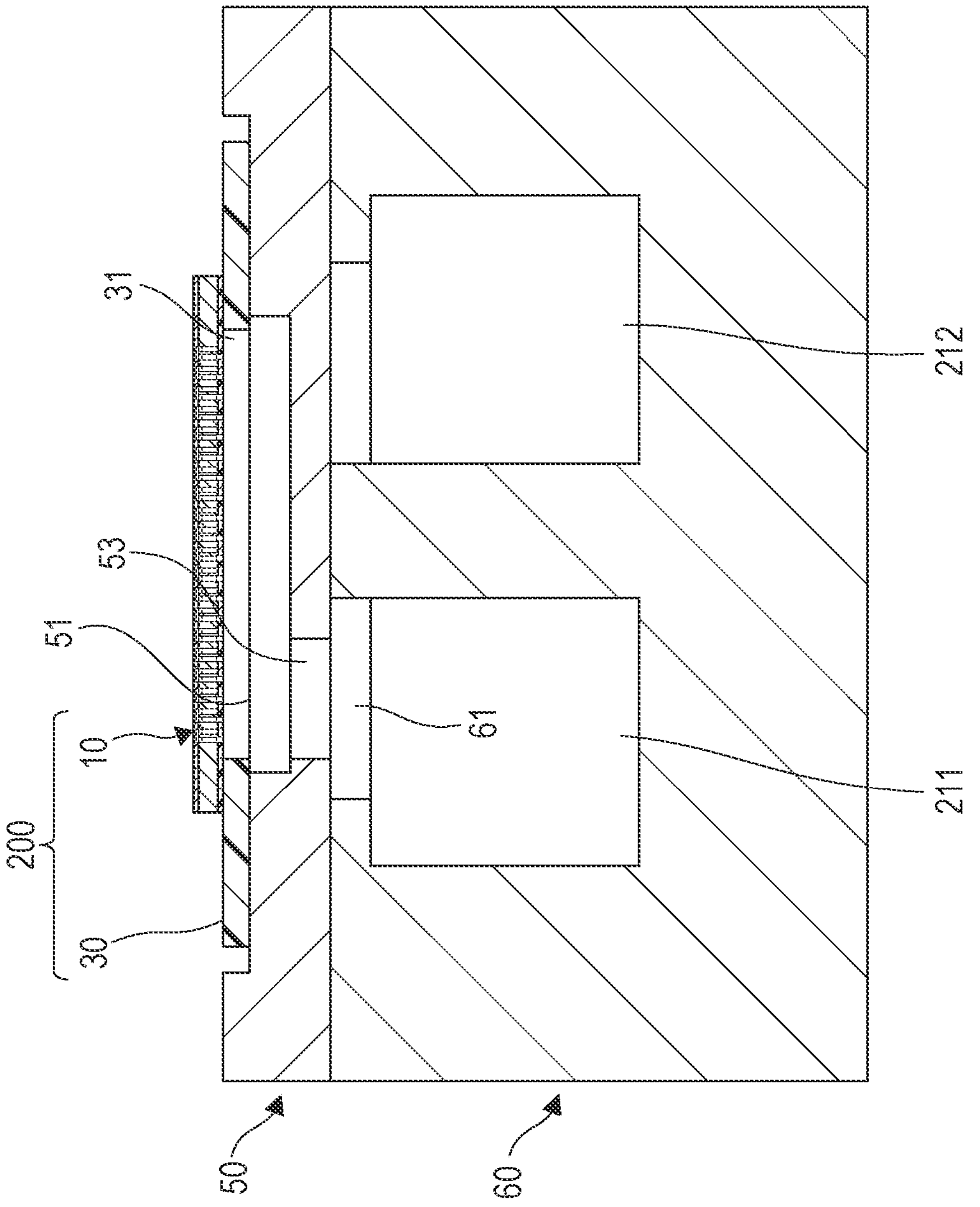
FIG. 18 is a cross-sectional view taken along line XVIII-XVIII in FIG. 17.

FIG. 18 is a diagram illustrating a cross-section taken along XVIII-XVIII in FIG. 17. FIG. 18 shows how the common supply channel 211 connects to the discharge module 200 through the communication port 61, individual communication port 53, and communication port 51. Although omitted from illustration in FIG. 18, it can be clearly seen from FIG. 17 that another cross-section would show an individual recovery channel 214 connected to the discharge module 200 through a similar path. Channels are formed on the discharge modules 200 and recording element boards 10 to communicate with the discharge orifices 13, and part or all of the supplied ink recirculates through the discharge orifices 13 (pressure chambers 23) that are not performing discharging operations, in the same way as in the first application example. The common supply channel 211 is connected to the negative pressure control unit 230 (high-pressure side), and the common recovery channel 212 to the negative pressure control unit 230 (low-pressure side), via the liquid supply unit 220, in the same way as in the first application example. Accordingly, a flow is generated by the differential pressure thereof, that flows from the common supply channel 211 through the discharge orifices 13 (pressure chambers 23) of the recording element board 10 to the common recovery channel 212.

Description of Discharge Module

Figure 19B:
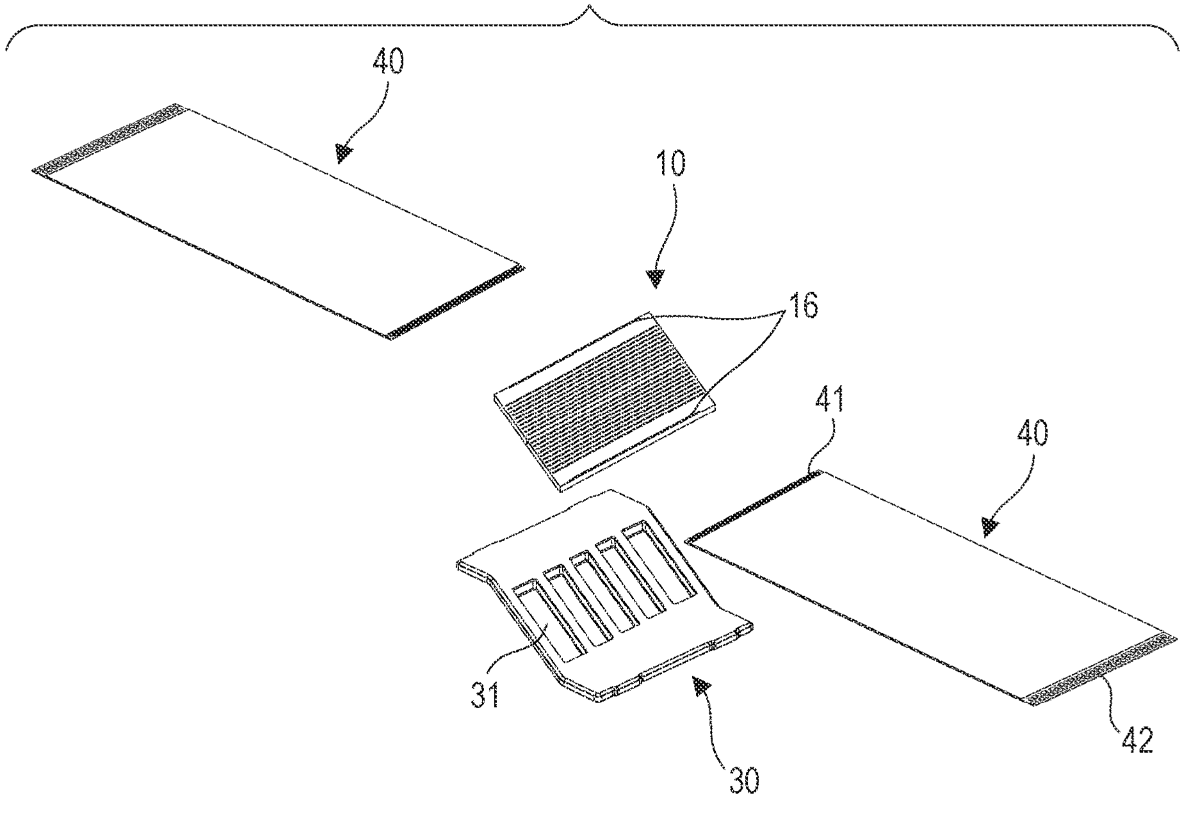

FIG. 19A is a perspective view of one discharge module 200, and FIG. 19B is a disassembled view thereof. Unlike the first application example, multiple terminals 16 are disposed arrayed on both sides (the long side portions of the recording element board 10) following the direction of the multiple discharge orifice rows of the recording element board 10, and two flexible printed circuit boards 40 are provided to one recording element board 10 and are electrically connected to the terminals 16. The reason is that the number of discharge orifice rows provided on the recording element board 10 is 20 rows, which is a great increase over the eight rows in the first application example. The object thereof is to keep the maximum distance from the terminals 16 to the recording elements 15 provided corresponding to the discharge orifice row short, hereby reducing voltage drop and signal transmission delay that occurs at wiring portions provided to the recording element board 10. Liquid communication ports 31 of the support member 30 are provided to the recording element board 10, and are opened so as to span all discharge orifice rows. Other points are the same as in the first application example.

Description of Structure of Recording Element Board

Figure 20A:
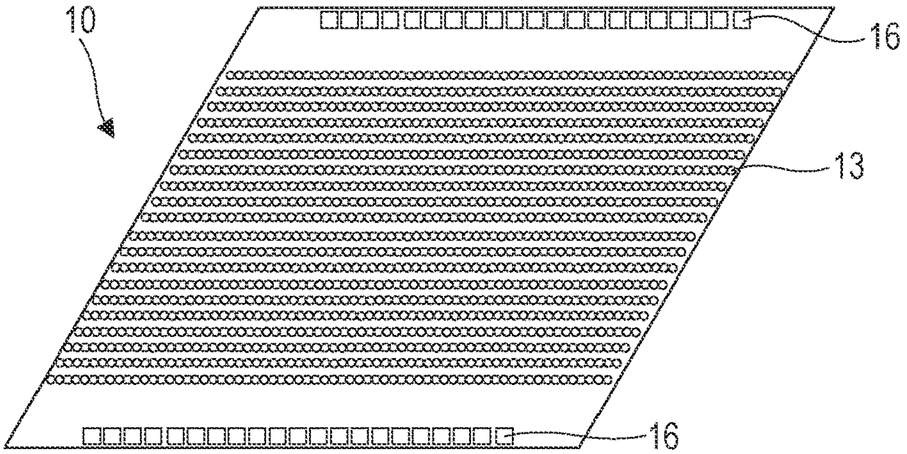
FIGS. 20A through 20C are diagrams illustrating the configuration of the recording element board.
Figure 20B:
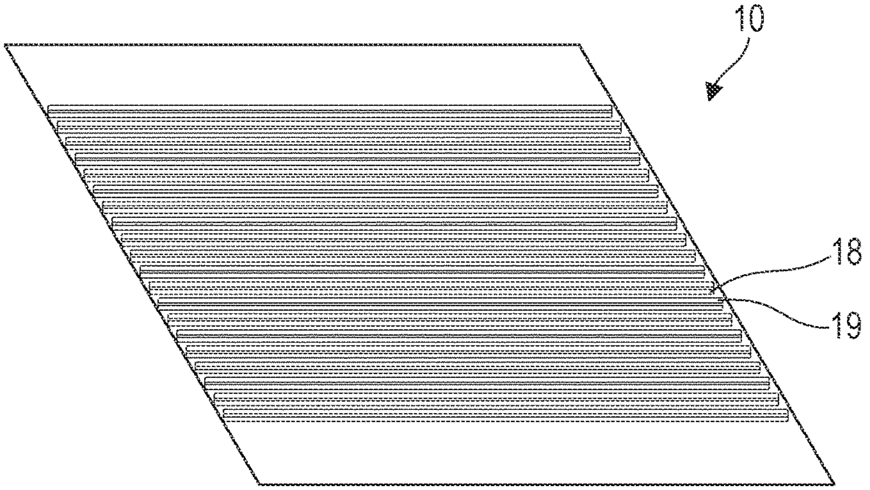
Figure 20C:
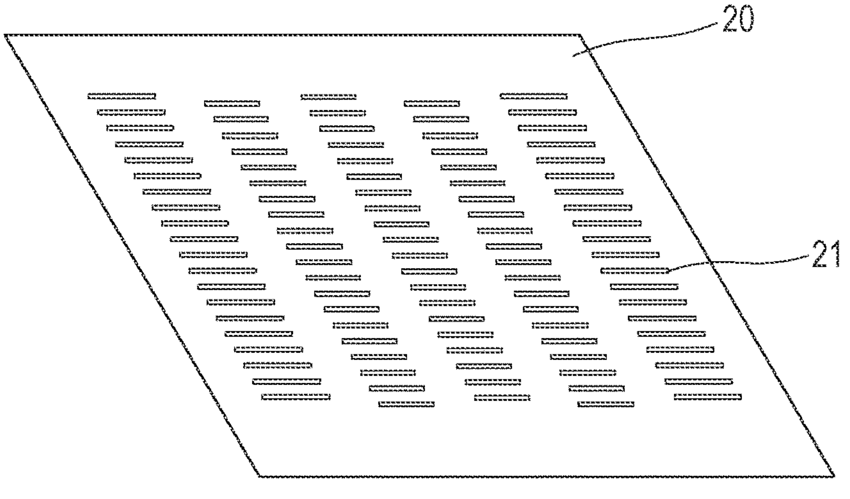

FIG. 20A is a schematic diagram illustrating the face of the recording element board 10 on the side where the discharge orifices 13 are disposed, and FIG. 20C is a schematic diagram illustrating the reverse face of that illustrated in FIG. 20A. FIG. 20B is a schematic diagram illustrating the face of the recording element board 10 in a case where the cover 20 provided on the rear face side of the recording element board 10 is removed in FIG. 20C. Liquid supply channels 18 and liquid recovery channels 19 are alternately provided on the rear face of the recording element board 10 following the discharge orifice row direction, as illustrated in FIG. 20B. Despite the number of discharge orifice rows being much greater than that in the first application example, a substantial difference from the first application example is that the terminals 16 are disposed on both side portions of the recording element board 10 following the discharge orifice row direction, as described above. The basic configuration is the same as that in the first application example, such as one set of a liquid supply channel 18 and liquid recovery channel 19 being provided for each discharge orifice row, openings 21 that communicate with the liquid communication ports 31 of the support member 30 being provided to the cover 20, and so forth.

Third Application Example

The configuration of an inkjet recording apparatus 1000 and liquid discharge head 3 according to a third application example will be described. The liquid discharge head 3 according to the third application example is a page-wide head that records a B2 size recording medium sheet with a single scan. The third application example is similar to the second application example with regard to many points, so points of difference as to the second application example will primarily be described below, and portions that are the same as the second application example will be omitted from description.

Description of Inkjet Recording Apparatus

Figure 33:
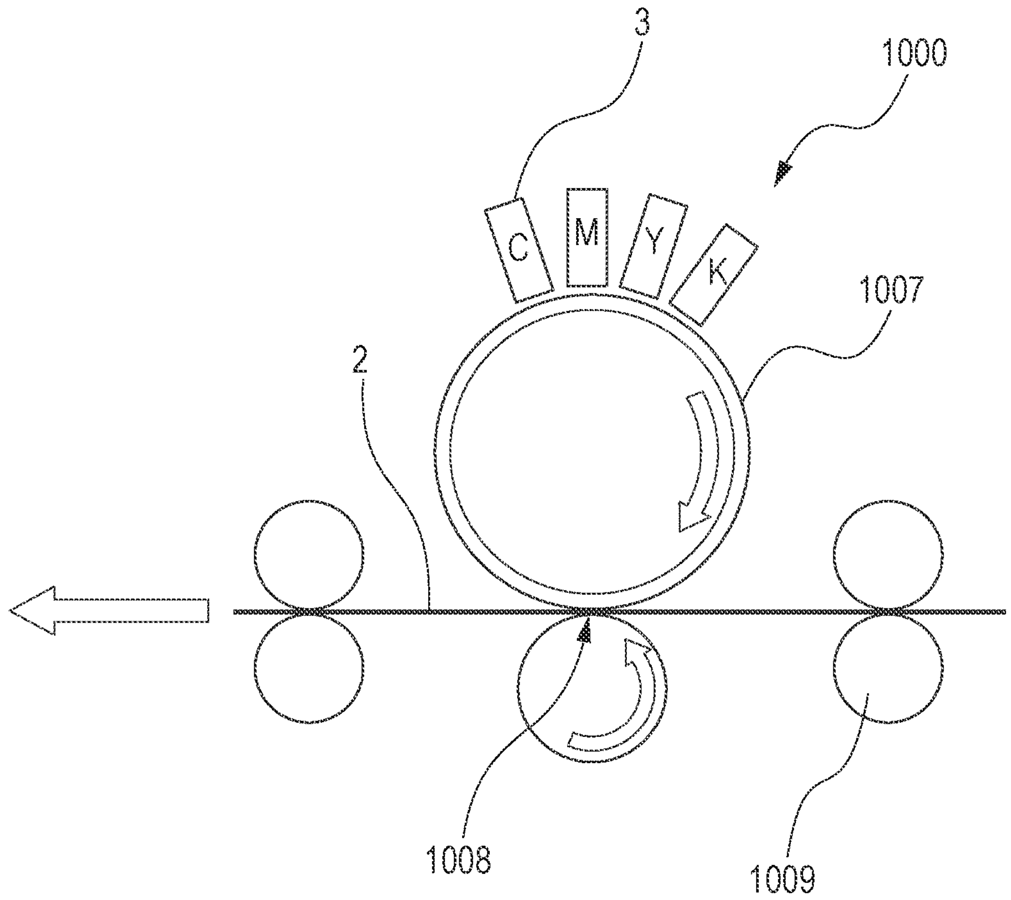
FIG. 33 is a diagram illustrating a schematic configuration of a recording apparatus according to a third application example according to the present invention.

FIG. 33 is a schematic diagram of an inkjet recording apparatus according to the present application example. The recording apparatus 1000 is of a configuration that does not directly record on the recording medium from the liquid discharge head 3, but rather discharges liquid on an intermediate transfer member (intermediate transfer drum 1007) and forms an image on the intermediate transfer member, following which the image is transferred onto the recording medium 2. The recording apparatus 1000 has four monochrome liquid discharge heads 3 corresponding to the four types of ink of CMYK, disposed in an arc following the intermediate transfer drum 1007. Thus, full-color recording is performed on the intermediate transfer member, the recorded image is dried to a suitable state on the intermediate transfer member, and then transferred by a transfer unit 1008 onto the recording medium 2 conveyed by a sheet conveyance roller 1009. Whereas the sheet conveyance system in the second application example was horizontal conveyance with the intent of primarily conveying cut sheets, the present application example is capable of handling continuous sheets supplied from a main roll (omitted from illustration). This sort of drum conveyance system can easily convey sheets with a certain tension applied, so there is less conveyance jamming when performing high-speed recording. Thus, the reliability of the apparatus improves, and is suitable for application to business printing and the like. The supply system of the recording apparatus 1000, the buffer tank 1003, and the main tank 1006 are connected to the liquid discharge heads 3 by fluid connection, in the same way as in the first and second application examples. Each liquid discharge head 3 is also electrically connected to an electric control unit that transmits electric power and discharge control signals to the liquid discharge head 3.

Description of Circulation Path

Figure 34:
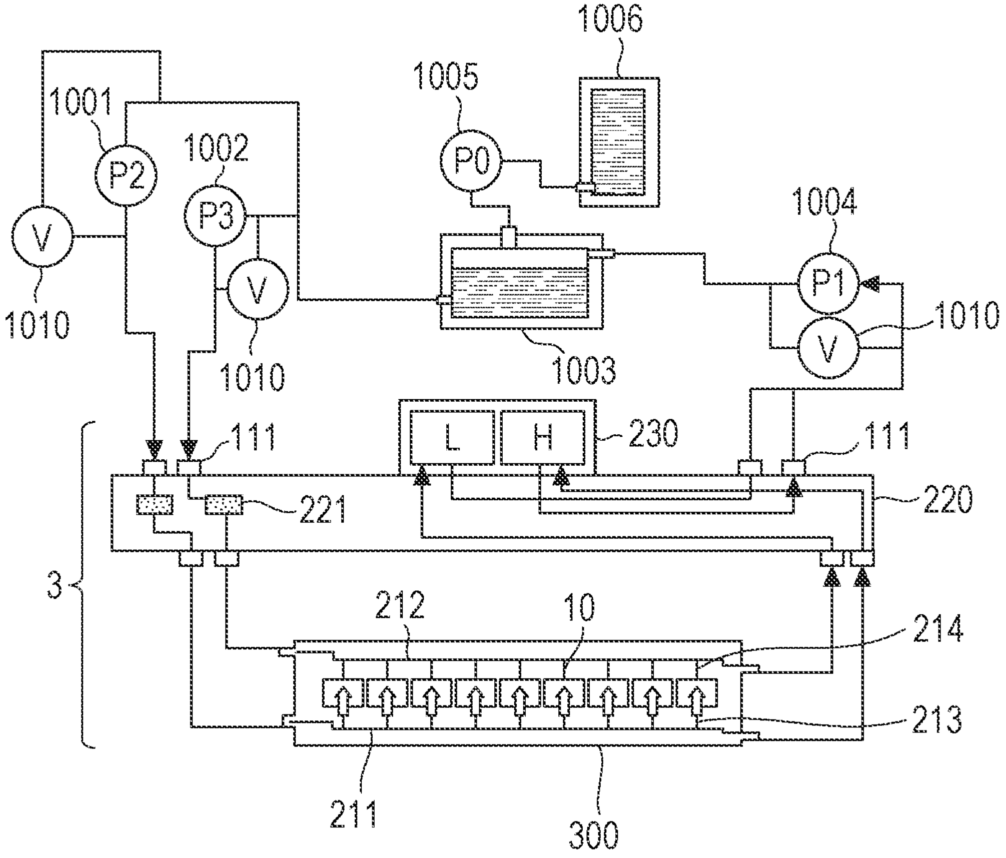
FIG. 34 is a diagram illustrating a circulation path according to the third application example of the present invention.

Although the first and second circulation paths illustrated in FIGS. 2 and 3 are applicable as circulation paths in the third application example that performs the above-described transfer recording, a circulation path illustrated in FIG. 34 is suitable. A primary difference as to the second circulation path in FIG. 3 is that bypass valves 1010 are added that communicate with channels of each of the first circulation pumps 1001 and 1002 and the second circulation pump 1004. The bypass valves 1010 function to lower pressure at the upstream side of the bypass valve 1010 (first function), due to the valve opening when pressure exceeds a preset pressure. The bypass valves 1010 also function to open and close valves at a predetermined timing by signals from a control board at the recording apparatus main unit (second function).

According to the first function, excessively large or excessively small pressure can be kept from being applied to the channel at the downstream side of the first circulation pumps 1001 and 1002 and the upstream side of the second circulation pump 1004. For example, in a case where the functions of the first circulation pumps 1001 and 1002 malfunction, excessive flow rate or pressure may be applied to the liquid discharge head 3. This may cause liquid to leak from the discharge orifices 13 of the liquid discharge head 3, or joined portions within the liquid discharge head 3 to be damaged. However, in a case where bypass vales are added to the first circulation pumps 1001 and 1002 as in the present application example, opening the bypass valves 1010 releases the liquid path to the upstream side of the circulation pumps, so trouble such as that described above can be suppressed, even if excessive pressure occurs.

Also, due to the second function, when stopping circulation operations, all bypass valves 1010 are quickly opened after the first circulation pumps 1001 and 1002 and second circulation pump 1004 stop, based on control signals from the main unit side. This allows the high negative pressure (e.g., several kPa to several tens of kPa) at the downstream portion of the liquid discharge head 3 (between the negative pressure control unit 230 and the second circulation pump 1004) to be released in a short time. In a case of using a positive-displacement pump such as a diaphragm pump as the circulation pump, a check valve usually is built into the pump. However, opening the bypass valves 1010 enables pressure release at the downstream side of the liquid discharge head 3 to be performed from the downstream buffer tank 1003 side as well. Although pressure release of the downstream side of the liquid discharge head 3 can be performed just from the upstream side as well, there is pressure drop in the channels at the upstream side of the liquid discharge head 3 and the channels within the liquid discharge head 3, so pressure discharge takes time. Accordingly, there is the concern that the pressure within the common channel within the liquid discharge head 3 may temporarily drop too far, and the meniscus at the discharge orifices may be destroyed. Opening the bypass valves 1010 at the downstream side of the liquid discharge head 3 promotes pressure discharge at the downstream side of the liquid discharge head 3, so the risk of destruction of the meniscus at the discharge orifices is reduced.

Description of Structure of Liquid Discharge Head

Figure 35A:
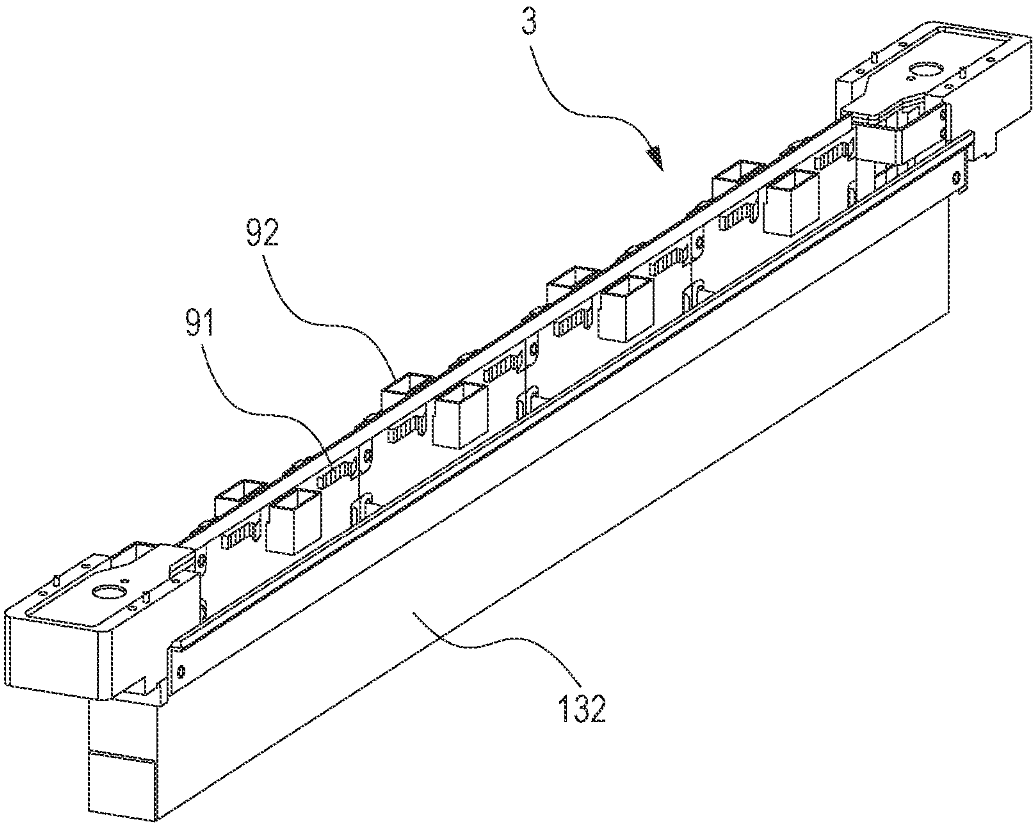
FIGS. 35A and 35B are diagrams illustrating a schematic configuration of the liquid discharge head according to the third application example of the present invention.
Figure 35B:
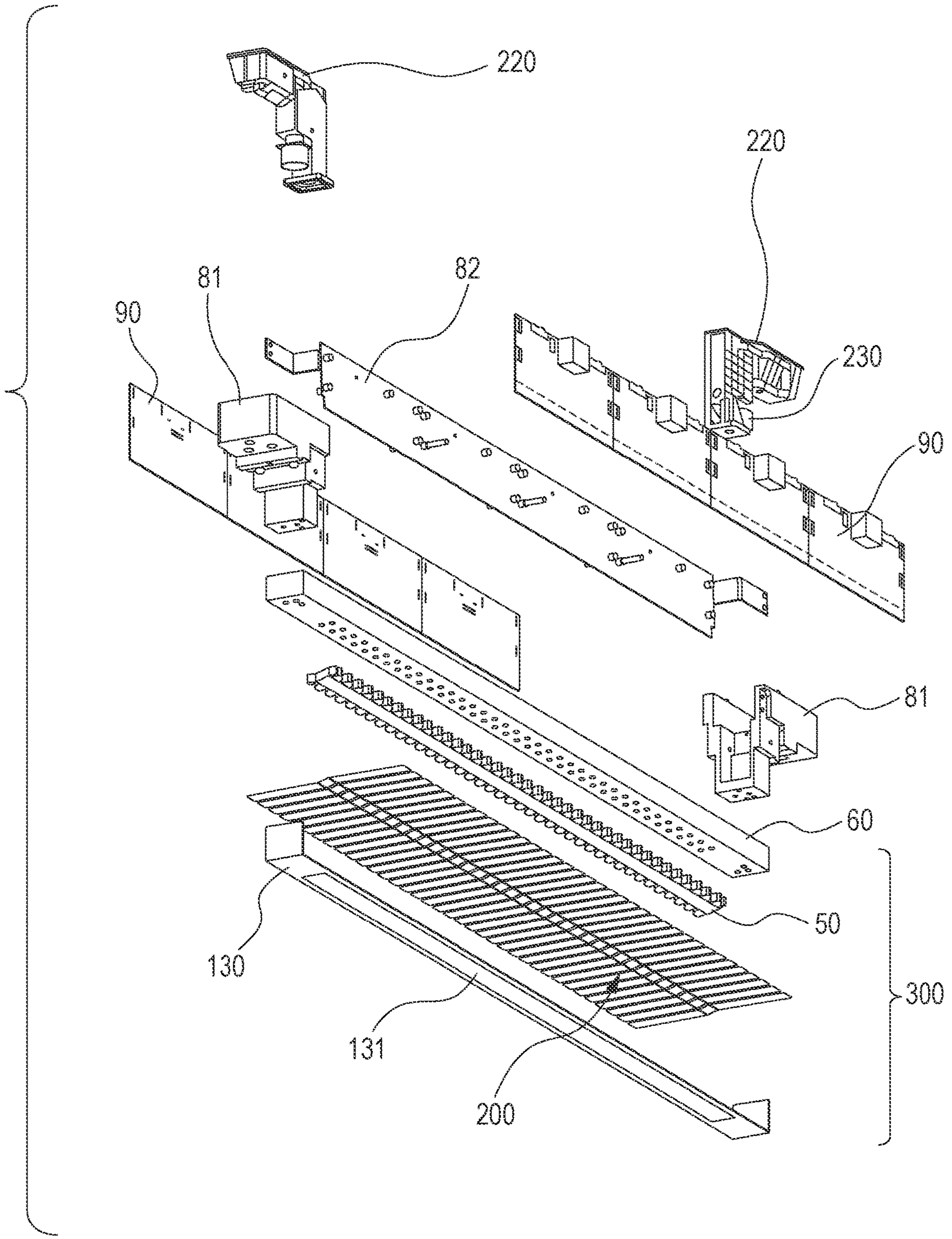

The structure of the liquid discharge head 3 according to the third application example of the present invention will be described. FIG. 35A is a perspective view of the liquid discharge head 3 according to the present application example, and FIG. 35B is a disassembled perspective view thereof. The liquid discharge head 3 has 36 recording element boards 10 arrayed in a straight line (inline) in the longitudinal direction of the liquid discharge head 3, and is a line type (page-wide) inkjet recording head that records using a single-color liquid. The liquid discharge head 3 has the signal input terminals 91 and power supply terminals 92 in the same way as in the second application example, and also is provided with a shield plate 132 to protect the longitudinal side face of the head.

FIG. 35B is a disassembled perspective view of the liquid discharge head 3, illustrating each part or unit making up the liquid discharge head 3 disassembled according to function (the shield plate 132 is omitted from illustration). The roles of the units and members, and the order of liquid flow through the liquid discharge head 3, are basically the same as in the second application example. The third application example differs from the second application example primarily with regard to the points of the electric wiring board 90 being divided into a plurality and disposed, the position of the negative pressure control units 230, and the shape of the first channel member 50. In the case of a liquid discharge head 3 having a length corresponding to a B2 size recording medium for example, as in the case of the present application example, eight electric wiring boards 90 are provided since the amount of electric power the liquid discharge head 3 uses is great. Four each of the electric wiring boards 90 are attached to both sides of the slender electric wiring board support member 82 attached to the liquid discharge unit support member 81.

Figure 36A:
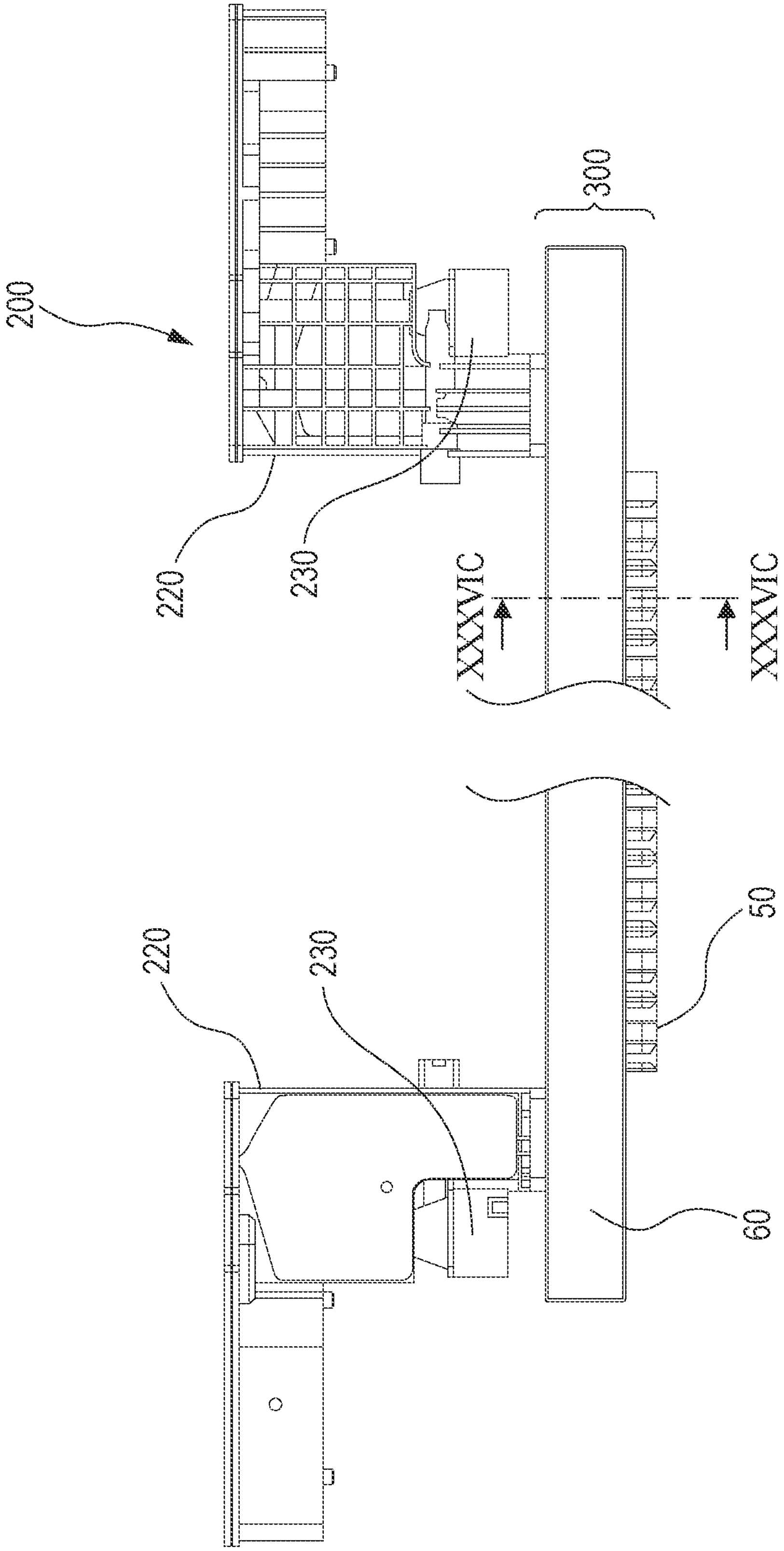
FIGS. 36A through 36C are diagrams illustrating schematic configurations of the liquid discharge head according to the third application example of the present invention.
Figure 36B:
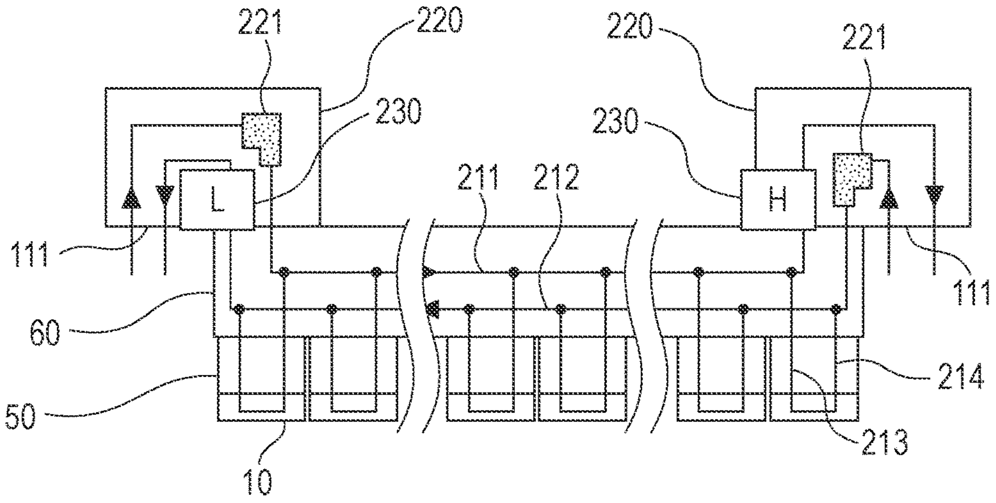
Figure 36C:
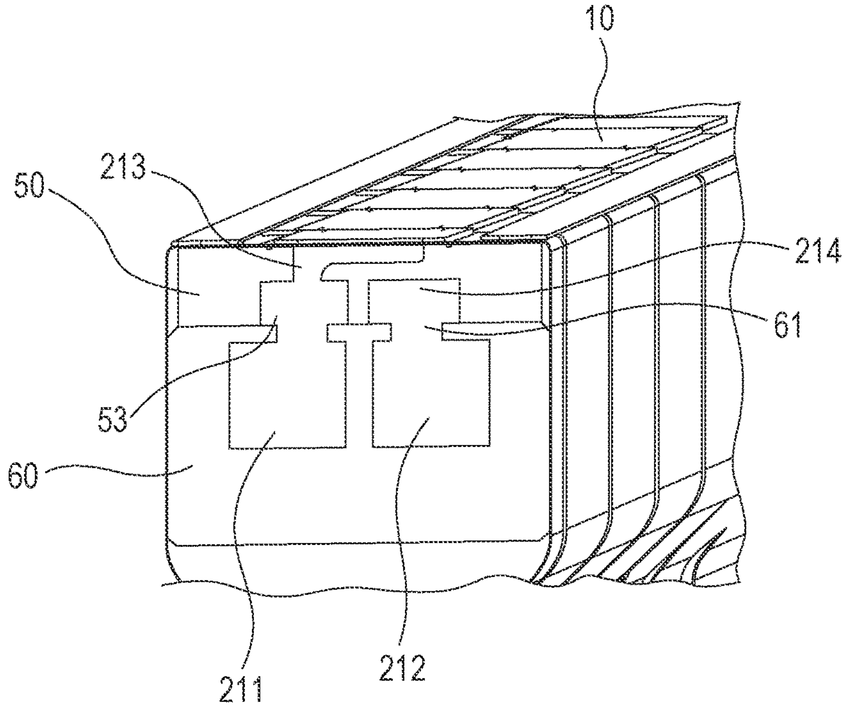

FIG. 36A is a side view of the liquid discharge head 3 that has the liquid discharge unit 300, liquid supply units 220, and negative pressure control units 230, FIG. 36B is a schematic diagram illustrating the flow of liquid, and FIG. 36C is a perspective view illustrating a cross-section taken along line XXXVIC-XXXVIC in FIG. 36A. Parts of the configuration have been simplified to facilitate understanding.

The liquid connection portions 111 and filters 221 are provided within the liquid supply units 220, with the negative pressure control units 230 being integrally formed beneath the liquid supply units 220. This enables the distance in the height direction between the negative pressure control units 230 and the recording element boards 10 to be reduced as compared to the second application example. This configuration reduces the number of channel connection portions within the liquid supply units 220, and is advantageous not only regarding improved reliability regarding leakage of recording liquid, but also in that the number of parts and assembly processes can be reduced.

Also, the water head difference between the negative pressure control units 230 and the face where the discharge orifices are formed is relatively smaller, and accordingly can be suitably applied to a recording apparatus where the inclination angle of the liquid discharge head 3 differs for each liquid discharge head 3, such as illustrated in FIG. 33. The reason is that the reduced water head difference enables the negative pressure difference applied to the discharge orifices of the respective recording element boards 10 can be reduced even if each of the multiple liquid discharge heads 3 is used at a different inclination angle. Reducing the distance from the negative pressure control units 230 to the recording element boards 10 also reduces the pressure drop difference due to fluctuation in flow of the liquid, since the flow resistance is reduced, and is preferable from the point that more stable negative pressure control can be performed.

FIG. 36B is a schematic diagram illustrating the flow of the recording liquid within the liquid discharge head 3. The circuitry is the same as the circulation path illustrated in FIG. 34, but FIG. 36B illustrates the flow of liquid at each component within the actual liquid discharge head 3. A set of the common supply channel 211 and common recovery channel 212 is provided within the slender second channel member 60, extending in the longitudinal direction of the liquid discharge head 3. The common supply channel 211 and common recovery channel 212 are configured so that the liquid flows in mutually opposite directions, with filters 221 disposed at the upstream side of these channels to trap foreign substances intruding from the connection portions 111 or the like. This arrangement where the liquid flows in mutually opposite directions in the common supply channel 211 and common recovery channel 212 is preferable from the point that the temperature gradient in the longitudinal direction within the liquid discharge head 3 is reduced. The flow direction of the common supply channel 211 and common recovery channel 212 is shown as being in the same direction in FIG. 34 to simplify explanation.

A negative pressure control unit 230 is disposed at the downstream side of each of the common supply channel 211 and common recovery channel 212. The common supply channel 211 has branching portions to multiple individual supply channels 213 along the way, and the common recovery channel 212 has branching portions to multiple individual recovery channels 214 along the way. The individual supply channels 213 and individual recovery channels 214 are formed within multiple first channel members 50. Each of the individual channels communicates with openings 21 (see FIG. 20C) of the cover 20 provided to the reverse face of the recording element boards 10.

The negative pressure control units 230 indicated by H and L in FIG. 36B are high-pressure side (H) and low-pressure side (L) units. The respective negative pressure control units 230 are back-pressure type pressure adjustment mechanisms, set to control the pressure upstream of the negative pressure control units 230 to relatively high (H) and low (L) negative pressures. The common supply channel 211 is connected to the negative pressure control unit 230 (high-pressure side), and the common recovery channel 212 is connected to the negative pressure control unit 230 (low-pressure side). This generates differential pressure between the common supply channel 211 and common recovery channel 212. This differential pressure causes the liquid to flow from the common supply channel 211, through the individual supply channels 213, discharge orifices 13 (pressure chambers 23) within the recording element boards 10, and the individual recovery channels 214 in that order, and to the common recovery channel 212.

FIG. 36C is a perspective view illustrating a cross-section taken along line XXXVIC-XXXVIC in FIG. 36A. Each discharge module 200 in the present application example is configured including a first channel member 50, recording element boards 10, and flexible printed circuit boards 40. The present application example does not have the support member 30 (FIG. 18) described in the second application example, with the recording element boards 10 having the cover 20 being directly joined to the first channel member 50. The common supply channel 211 provided to the second channel member 60 supplies liquid from the communication ports 61 provided on the upper face thereof to the individual supply channels 213, via the individual communication ports 53 formed on the lower face of the first channel member 50. Thereafter, the liquid passes through the pressure chambers 23, and is recovered to the common recovery channel 212 via the individual recovery channels 214, individual communication ports 53, and communication ports 61, in that order.

Unlike the arrangement illustrated in the second application example illustrated in FIGS. 16A and 16B, the individual communication ports 53 on the lower face of the first channel member 50 (the face toward the second channel member 60) are openings of a sufficient size with regard to the communication ports 61 formed on the upper face of the second channel member 60. According to this structure, even in a case where there is positional deviation at the time of mounting the discharge module 200 to the second channel member 60, fluid communication can be realized in a sure manner between the first channel member 50 and the second channel member 60, so yield will improve when manufacturing the head, thereby reducing costs.

First Embodiment

Figure 21A:
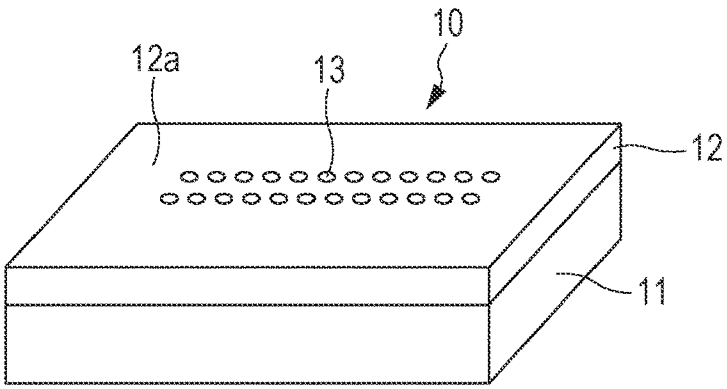
FIGS. 21A through 21C are diagrams illustrating a recording element board of a liquid discharge head according to a first embodiment of the present invention.
Figure 21B:
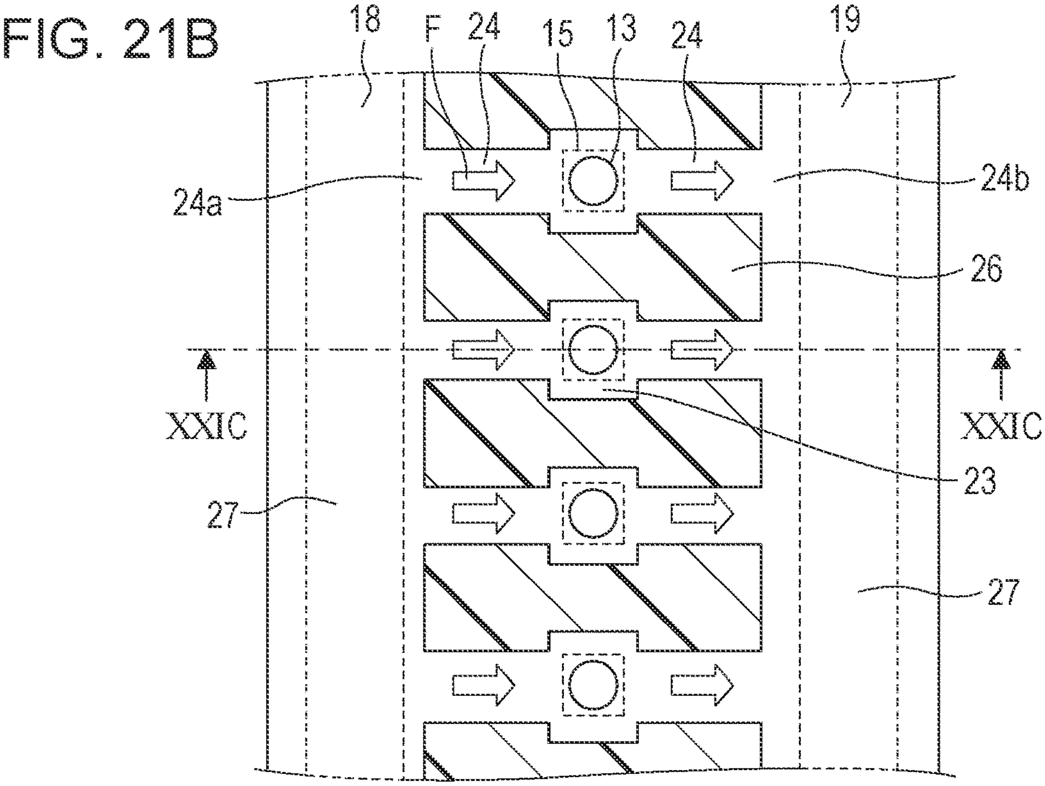
Figure 21C:
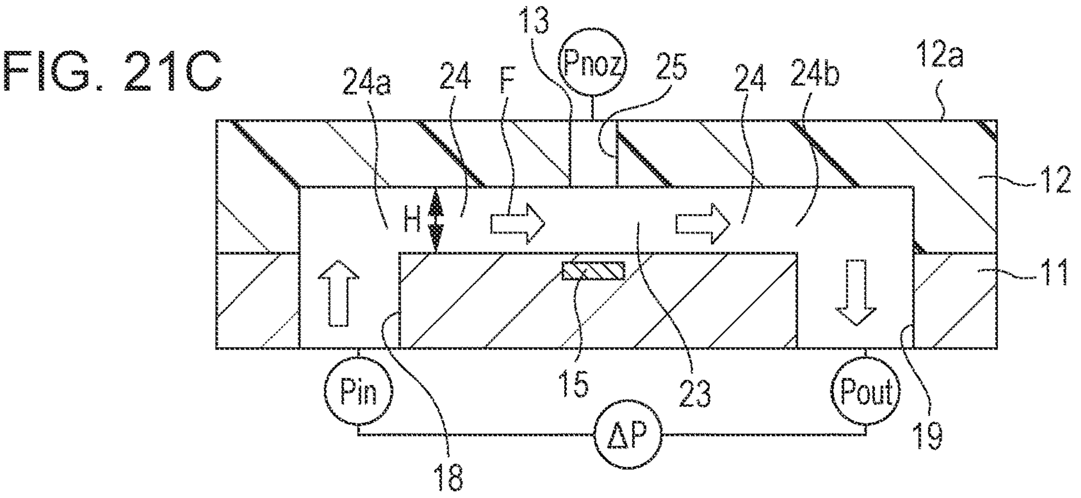

FIG. 21A is a perspective view of a recording element board 10 of the liquid discharge head 3, FIG. 21B is a plan view illustrating liquid channels within the recording element board 10, and FIG. 21C is a cross-sectional view taken along line XXIC-XXIC in FIG. 21B. The recording element board 10 includes a substrate 11 and a discharge orifice forming member 12 joined to the substrate 11 facing the substrate 11. Recording elements (energy generating elements) 15 that generate thermal energy used for discharging ink are provided on the substrate 11. Discharge portions 25 (nozzles) pass through the discharge orifice forming member 12, with the openings at the side thereof facing the recording medium being the discharge orifices 13 that discharge ink. Note that the face of the discharge orifice forming member 12 on which the discharge orifices 13 are opened (the face facing the recording medium) may be referred to as discharge orifice forming face 12*a*. Multiple discharge orifices 13 are formed, with the multiple discharge orifices 13 being arrayed in a straight line so as to form a discharge orifice row. Liquid channels 24 facing the recording elements 15 and discharge orifices 13 are defined between the substrate 11 and the discharge orifice forming member 12. The parts of the liquid channel 24 where the recording elements 15 and discharge orifices 13 are provided are pressure chambers 23. Adjacent liquid channels 24 are separated by walls 26.

In a thermal type liquid discharge head that discharges droplets by recording elements generating thermal energy as in the present embodiment, the height H of the liquid channel 24 is preferably 25 μm or lower. The height H of the liquid channel 24 preferably is 7 μm or lower to suppress satellites accompanying discharge droplets. From another perspective, the distance between the recording elements 15 and the discharge orifice forming face 12*a* preferably is 12 μm or lower. The height H of the liquid channel 24 is determined by the spacing between the substrate 11 and the discharge orifice forming member 12 measured in a direction perpendicular to the face of the substrate 11 on which the recording elements 15 are provided. In a case of a high-density liquid discharge head where the array density of the discharge orifices 13 is 600 dpi or higher, for example, the height H of the liquid channel 24 preferably is 3 μm or higher when taking into consideration increase pressure drop due to flow of liquid. The reason is to secure a certain level of height taking into consideration refill properties and circulation properties, since the channel width is restricted in the case of high density.

The liquid supply channel 18 and liquid recovery channel 19 pass through the substrate 11 from the front face to the rear face. The liquid supply channel 18 is connected to an inlet end portion 24*a* of the liquid channel 24, so as to supply ink to the liquid channel (first liquid channel) 24. The ink supplied to the first liquid channel 24 is supplied to the pressure chamber 23, and ink that is not discharged is supplied to a second liquid channel 24. The liquid recovery channel 19 is connected to an outlet end portion 24*b* of the liquid channel 24, with ink not discharged from the discharge orifice 13 being recovered from the second liquid channel 24. Partway along the liquid channel 24, preferably equidistantly from the inlet end portion 24*a* and outlet end portion 24*b* of the liquid channel 24, are formed the recording element 15 and discharge orifice 13. A pressure difference ΔP is formed between the inlet pressure Pin of the liquid supply channel 18 and the outlet pressure Pout of the liquid recovery channel 19. The pressure difference ΔP is set so that the inlet pressure Pin is larger than the outlet pressure Pout. This generates a circulatory flow F where ink flows from the liquid supply channel 18 through the liquid channel 24 over the recording element 15 within the pressure chamber 23, and further through the liquid channel 24 to the liquid recovery channel 19. The inlet pressure Pin and outlet pressure Pout may be either positive pressure or negative pressure in the present embodiment, as long as the inlet pressure Pin is larger than the outlet pressure Pout.

Problems Regarding Circulation Flow Velocity

Figure 22A:
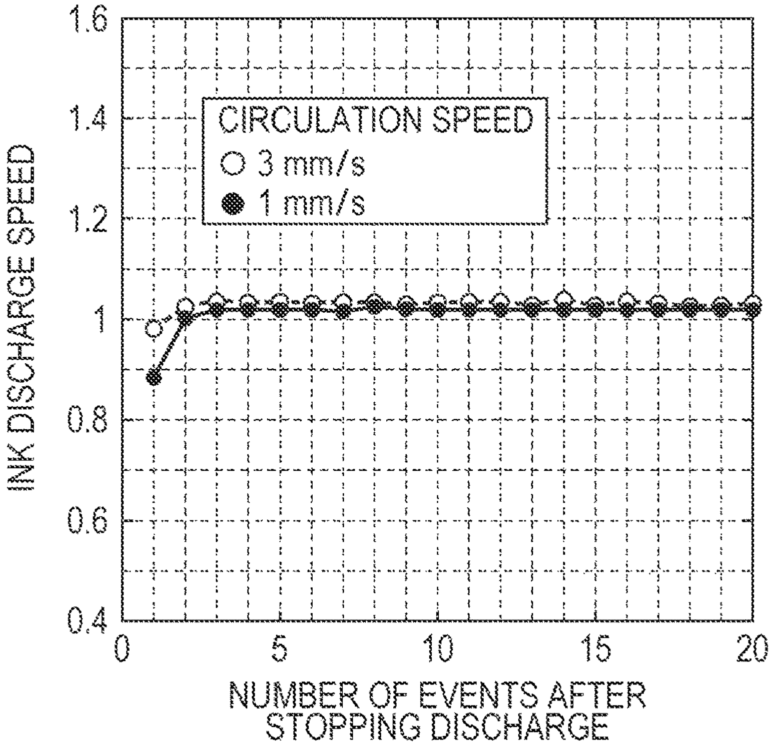
FIGS. 22A through 22C are diagrams illustrating the relationship between change in the discharge speed of ink and circulatory flow velocity.
Figure 22B:
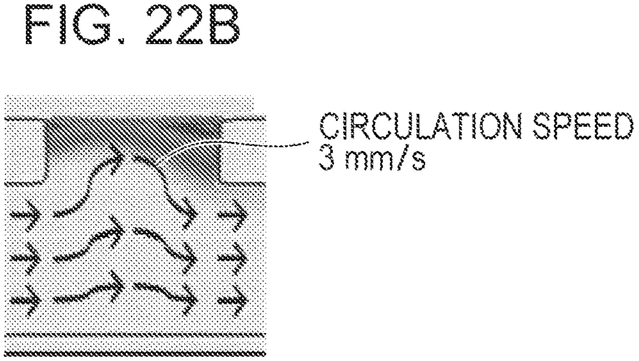
Figure 22C:
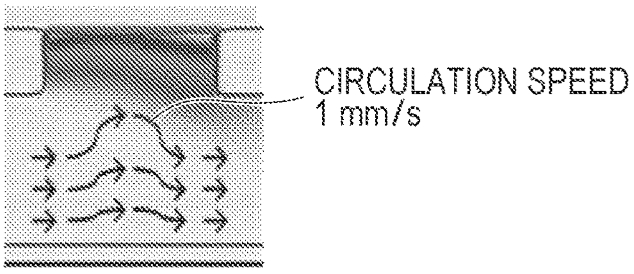

Droplets were discharged at head temperature 40° C. while a circulation flow flowed through the pressure chamber 23, stopped for one second, and then 20 droplets were continuously discharged. The diameter of the discharge orifice 13 was 16 μm. FIG. 22A illustrates the normalized discharge speed of the first through 20th droplets regarding a case where the circulation flow F was 1 mm/s and a case of 3 mm/s. FIG. 22B illustrates the degree of concentration of ink within the pressure chamber 23 in the case where circulation flow F was 3 mm/s, and FIG. 22C illustrates the case where circulation flow F was 1 mm/s. These drawings illustrate that the darker the color, the more concentrated the ink is, and the viscosity is higher. The circulation flow velocity shown here is the circulation flow velocity of the liquid in the pressure chamber 23.

Figure 23:
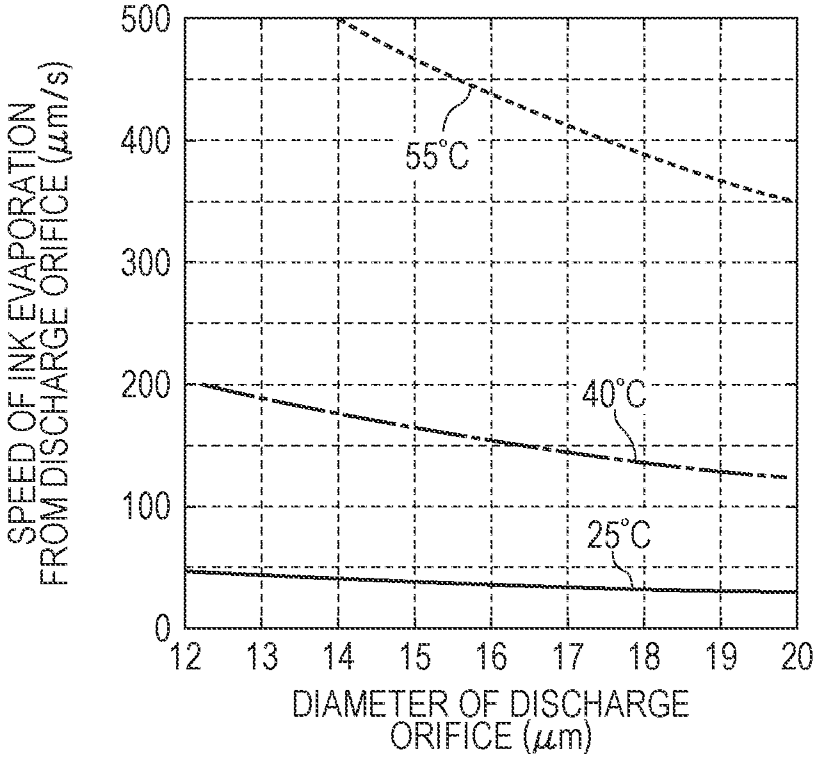
FIG. 23 is a diagram illustrating the relationship between discharge orifice diameter and average evaporation rate from the discharge orifices.

FIG. 23 illustrates the relationship between the diameter of the discharge orifice 13 and the average rate of evaporation from the discharge orifice 13 at various head temperatures. The rate of evaporation is how fast the ink evaporates from the discharge orifice 13, and is defined as a thickness of an ink layer evaporating per unit of time. More specifically, the rate of evaporation is equal to the thickness of the liquid within the discharge portion 25 passing through the discharge orifice forming member 12, that evaporates per unit of time. In a case where the circulation flow F is slow (the circulation flow velocity is 1 mm/s) (FIG. 22C), the effects of the rate of evaporation from the discharge orifice 13 are great, so stagnation near the discharge orifice 13 of ink that has become concentrated due to evaporation is not readily prevented by the circulation flow F. As a result, the thickened ink tends to stagnate near the discharge orifice 13 after stopping discharging, so the discharge speed of the first ink discharge is lower (FIG. 22A). On the other hand, in a case where the circulation flow F is fast (the circulation flow velocity is 3 mm/s) (FIG. 22B), the effects of the rate of evaporation from the discharge orifice 13 are relatively weakened, so stagnation near the discharge orifice 13 of ink that has become concentrated due to evaporation does not readily occur. As a result, slowing of the discharge speed of the first ink discharge is suppressed (FIG. 22A). Accordingly, the flow velocity of the circulation flow F preferably is faster than the rate of evaporation from the discharge orifice 13. In a case where the head temperature is high, the rate of evaporation at the discharge orifice 13 will be extremely high.

Further referencing FIG. 23 shows that in a case where the diameter of the discharge orifice 13 is 16 μm and the head temperature is 40° C., the rate of evaporation is approximately 150 μm/s. Accordingly, by setting the flow velocity (flow velocity of circulation flow F) in the liquid channel 24 to 3 mm/s or faster, or 27 times or more the rate of evaporation at the discharge orifice 13, stagnation of thickened ink near the discharge orifice 13 due to evaporation from the discharge orifice 13 can be suppressed. Also, in order for asymmetry of the bubble generated on the recording element 15 to be suppressed, the flow velocity of the liquid preferably is set to 140 mm/s or slower, or 1260 times the rate of evaporation at the discharge orifice 13 or less. Note that the density of solids of the liquid that the liquid supply channel 18 of the liquid discharge head 3 is provided with is preferably 6 to 25 percent by weight, taking into consideration suppression of the effects of ink thickening and the suitability of discharge properties of the thermal inkjet system.

On the other hand, in a case where the flow velocity of the circulation flow F is fast, a problem occurs where the bubble generated on the recording element 15 is asymmetric. FIGS. 24A through 24D illustrate the bubble B on the recording element 15 in cases where the circulation flow velocity was changed by changing the pressure difference ΔP as follows.

Figure 24A:
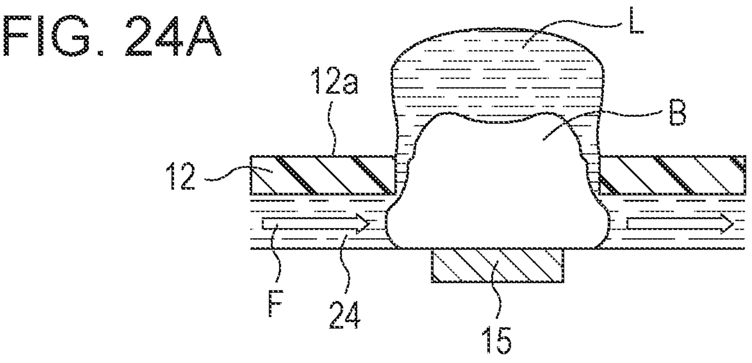
FIGS. 24A through 24D are diagrams illustrating shapes of bubbles when a circulatory flow is formed.

FIG. 24A: circulation flow velocity=140 mm/s (pressure difference ΔP=1400 mmAq)

Figure 24B:
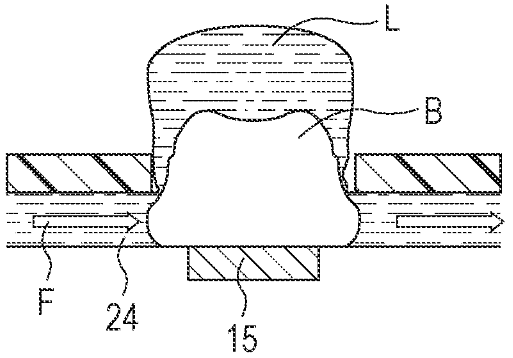

FIG. 24B: circulation flow velocity=500 mm/s (pressure difference ΔP=5000 mmAq)

Figure 24C:
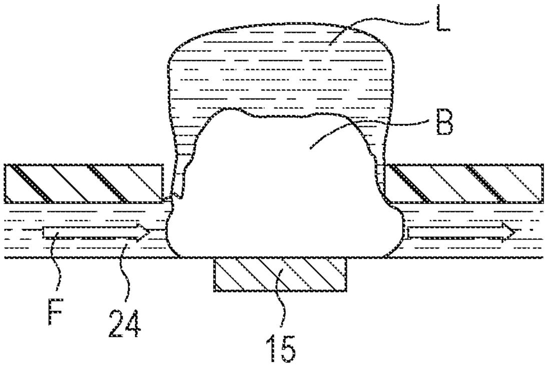

FIG. 24C: circulation flow velocity=1000 mm/s (pressure difference ΔP=10,000 mmAq)

Figure 24D:
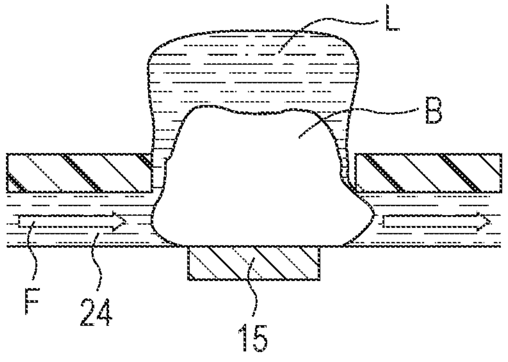

FIG. 24D: circulation flow velocity=1500 mm/s (pressure difference ΔP=15,000 mmAq)

It can be seen from FIGS. 24B through 24D that the faster the circulation flow velocity is, the more asymmetric the bubble B over the recording element 15 is, and the more the droplet L discharged by the bubble B is inclined as to a direction perpendicular to the discharge orifice forming face 12*a* of the discharge orifice forming member 12. On the other hand, in a case where the circulation flow velocity is slow as in FIG. 24A, the bubble B maintains symmetry, and the droplet L does not readily incline as to a direction perpendicular to the discharge orifice forming face 12*a*.

In the present embodiment, the flow velocity of the circulation flow F in the liquid channel 24 is set to 140 mm/s or slower, or the inlet pressure of the liquid supply channel 18 is set to be higher than the outlet pressure of the liquid recovery channel 19 by a pressure differential pressure of 1400 mmAq or less. Accordingly, inclination of the droplet L in the discharge direction as to the direction perpendicular to the discharge orifice forming face 12*a* can be reduced.

Thus, by setting the circulation flow velocity at 3 to 140 mm/s (pressure difference ΔP at 30 to 1400 mmAq), asymmetry of the bubble and resultant inclination of the discharge direction of the bubble can be suppressed while reducing thickening of the ink due to evaporation of the ink from the discharge orifice 13.

Second Embodiment

The configuration of the recording element board 10 according to a second embodiment is the same as that illustrated in FIGS. 21A through 21C, but the inlet pressure Pin of the liquid supply channel 18 and the outlet pressure Pout of the liquid recovery channel 19 both are negative pressure, lower than the atmospheric pressure. A differential pressure ΔP is created between Pin and Pout here as well, thereby forming the circulation flow F. Both Pin and Pout are negative pressure, so pressure Pnoz of the liquid channel 24 at the position facing the discharge orifice 13 (pressure chamber 23) also is negative pressure. Accordingly, even in a case where the pressure of the liquid supply channel 18 or liquid recovery channel 19 changes due to bubbles or the like occurring, Pnoz is constantly maintained at a negative pressure. Accordingly, the present embodiment has an advantage that ink leakage from the discharge orifices 13 is suppressed.

Third Embodiment

The configuration of the recording element board 10 according to a third embodiment is the same as that illustrated in FIGS. 21A through 21C, but the relationship of $$Pnoz=(Pin+Pout)/2 \geq -4\times\gamma/\Phi \quad \text{(Expression 1)}$$

holds, where γ represents the surface tension of the ink, and Φ represents the effective diameter of the discharge orifice.

Description has already been made that Pin is the inlet pressure of the liquid supply channel 18, Pout is the outlet pressure of the liquid recovery channel 19, and Pnoz is the pressure of the liquid channel 24 at the position facing the discharge orifice 13. The relationship between Pin, Pout, and Pnoz, is generally as follows, in a case where the dimensions to the inlet end portion 24*a* and the outlet end portion 24*b* of the liquid channel 24 are approximately equal.

$$Pnoz=(Pin+Pout)/2 \quad \text{(Expression 2)}$$

Figure 25A:
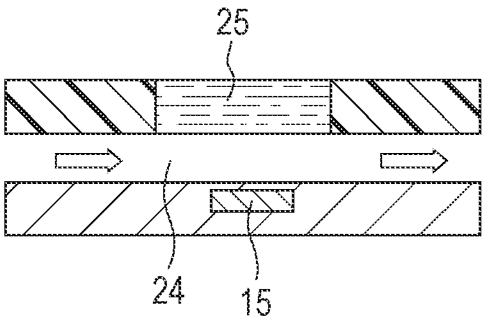
FIGS. 25A through 25C are diagrams illustrating the relationship between discharge orifice diameter and the largest negative pressure that a meniscus interface can maintain.
Figure 25B:
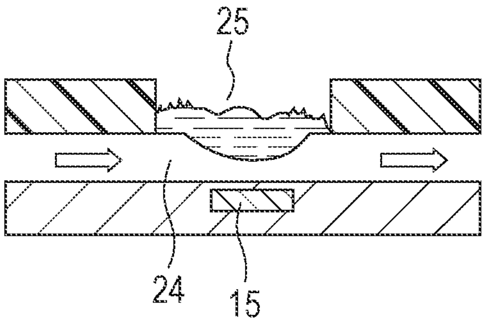

In a case where Pnoz is negative pressure, the meniscus interface of ink within the discharge portion 25 sinks, as illustrated in FIG. 25A. When the negative pressure becomes even greater, the meniscus interface collapses as illustrated in FIG. 25B, resulting in a state where there is not sufficient ink above the recording elements 15 or no ink at all, so normal discharge becomes difficult.

Figure 25C:
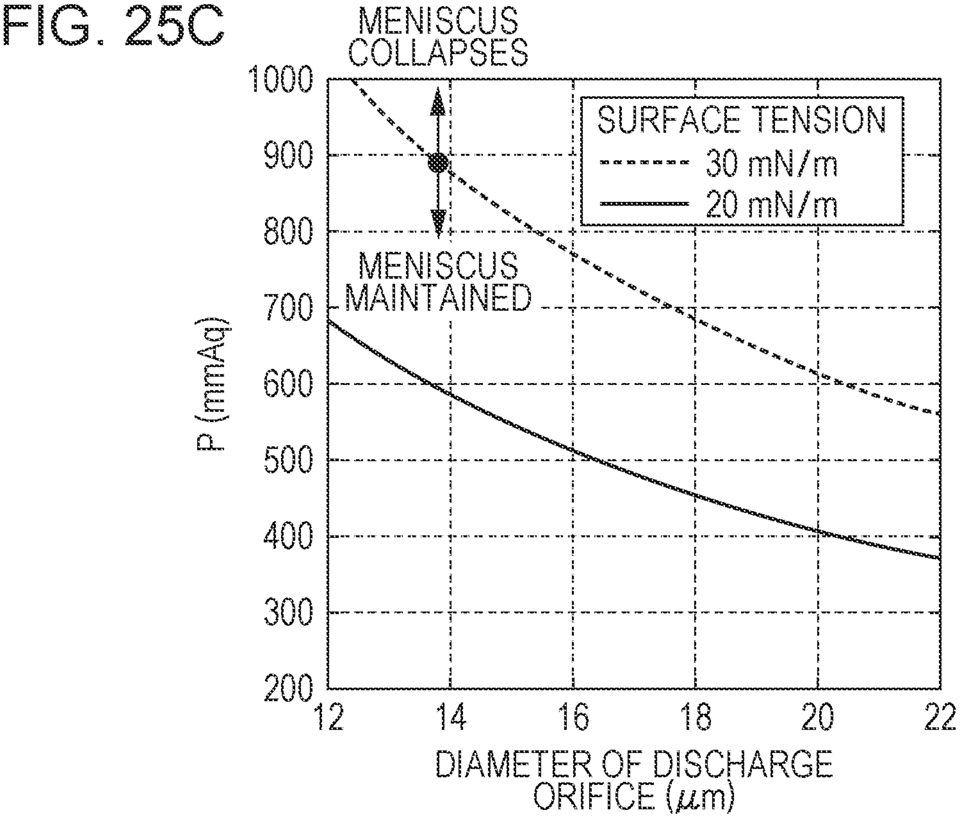

FIG. 25C is a diagram illustrating the relationship of 4×γ/Φ in (Expression 1). The horizontal axis represents the diameter of the discharge orifice 13, and the vertical axis represents negative pressure at which the meniscus interface does not collapse. Generally, the meniscus of ink within a liquid discharge orifice is dependent on the diameter Φ of the discharge orifice and the surface tension γ. Illustrated are the results at surface tension of 30 mN/m and 20 mN/m. Above the curves of 30 mN/m and 20 mN/m is a region where the meniscus will collapse, and below is a region where the meniscus is maintained. The larger the diameter of the discharge orifice is, the smaller the critical negative pressure is (the easier the meniscus interface collapses), and the smaller the surface tension is, the smaller the critical negative pressure is (the easier the meniscus interface collapses). It can thus be seen that in a case where the discharge orifice diameter Φ is 12 μm and the surface tension γ is 20 mN/m, Pnoz must be maintained to at least −700 mmAq or more, or the possibility that the interface will collapse rises. Accordingly, setting the pressure Pin of the liquid supply channel 18 and the pressure Pout of the liquid recovery channel 19 such that Pnoz is maintained at −700 mmAq or more can suppress collapse of the meniscus interface. It also can be seen that this value will change according to the surface tension and diameter of the discharge orifice.

Further, in a case of the Pin constantly maintaining negative pressure as in the second embodiment, $$Pin \leq -0,\ Pnoz \geq -4\times\gamma/\Phi,\ Pout \geq -8\times\gamma/\Phi \quad \text{(Expression 3)}$$

holds. In a case of the Pin maintaining negative pressure, the above relationship needs to be satisfied to prevent collapse of the meniscus interface. In a case where the discharge orifice diameter Φ is 12 μm and the surface tension γ is 20 mN/m, $$Pin \leq -0,\ Pnoz \geq -700\ \text{mmAq},$$

thus yielding Pout≥−1400 mmAq. Accordingly, in a case of the Pin maintaining negative pressure, setting a differential pressure ΔP exceeding 1400 mmAq is difficult from the point of preventing collapse of the meniscus interface. The above values will change depending on the surface tension and the diameter of the discharge orifice.

Fourth Embodiment

Figure 26A:
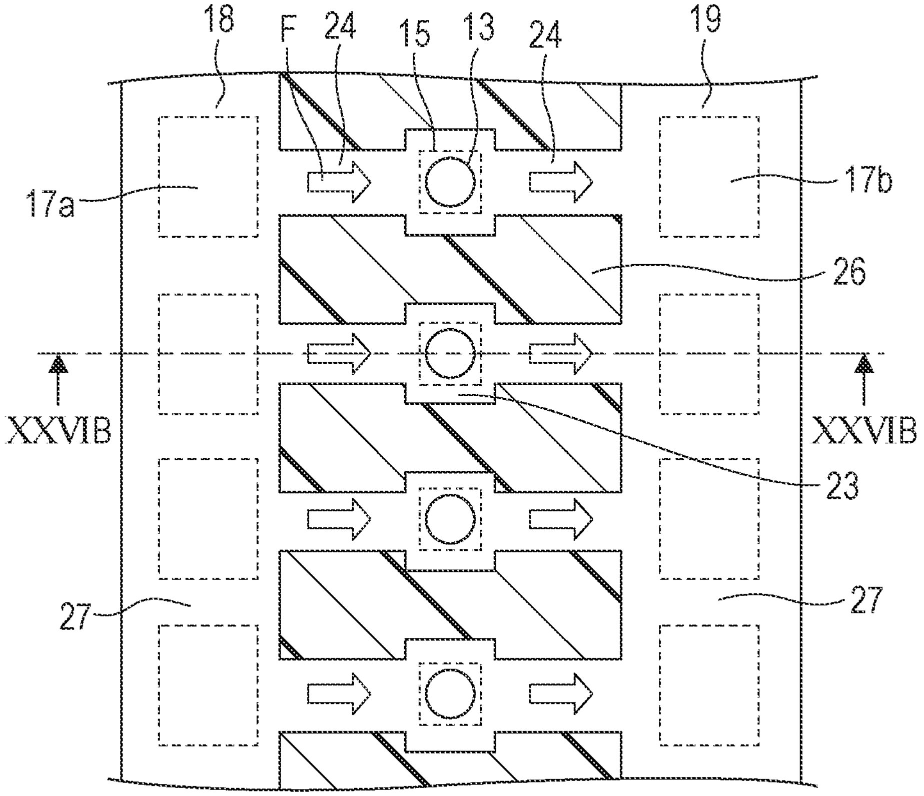
FIGS. 26A and 26B are diagrams of a recording element board of a liquid discharge head according to a fourth embodiment of the present invention.
Figure 26B:
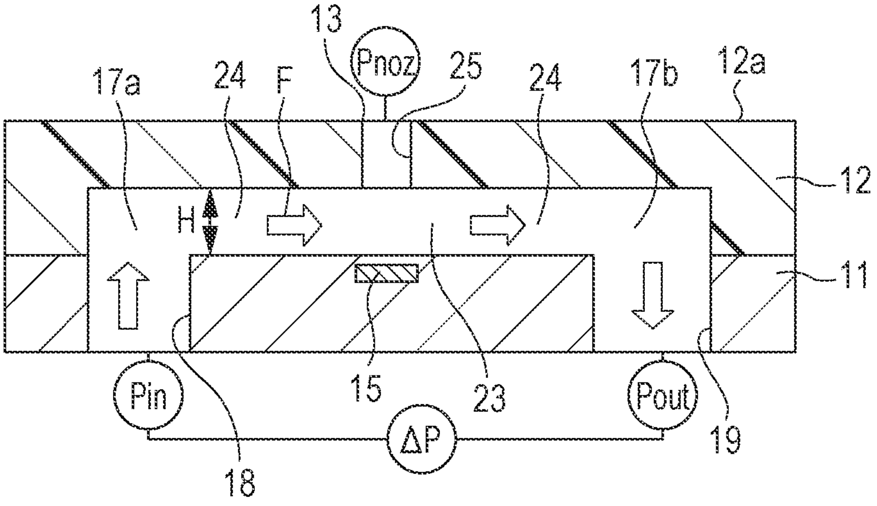

FIG. 26A is a plan view illustrating liquid channels within a recording element board, and FIG. 26B is a cross-sectional view taken along line XXVIB-XXVIB in FIG. 26A. Multiple supply ports 17*a* connecting the liquid supply channel 18 and the liquid channels 24, and multiple recovery port 17*b* connecting the liquid recovery channel 19 and the liquid channels 24, are provided. The supply ports 17*a* are partitioned from each other by walls 27, as are the recovery ports 17*b* from each other. Passing electric wiring connected to the recording elements 15 through the walls 27 enables wiring space for the electric wiring to be secured, as compared with a case where just one supply port or recovery port is provided. Note that a supply port 17*a* and recovery port 17*b* are provided corresponding to each recording element 15 in the present embodiment, but the number of supply ports 17*a* and recovery ports 17*b* is not restricted to this, and it is sufficient for at least one of the supply ports 17*a* and recovery ports 17*b* to be provided in a plurality.

According to the present invention, a liquid discharge head and liquid discharge method are provided in which the discharge direction of a droplet is not readily inclined as to the direction perpendicular to the discharge orifice forming face, and also thickening of liquid due to evaporation of liquid from the discharge orifices is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid discharge head comprising:

an orifice for discharging a liquid, a channel including a chamber having therein an energy generation element for generating energy for discharging the liquid through the orifice, wherein a liquid supply channel connected to the channel via an inlet portion for supplying liquid to the channel, and a liquid collect channel connected to the channel via an outlet portion, for collecting liquid from the channel, wherein both a pressure at the inlet portion and a pressure at the outlet portion are negative pressure and the pressure at the inlet portion is higher than the pressure at the outlet portion, and a flow velocity of liquid within the pressure chamber is 3 to 140 mm/s.

2. The liquid discharge head according to claim 1, wherein the channel, and the pressure chamber, are each provided between a substrate and an orifice forming member.

3. The liquid discharge head according to claim 1, wherein the height of the channel is 3 μm or higher but 25 μm or less.

4. The liquid discharge head according to claim 1, wherein $$Pnoz=(Pin+Pout)/2\geq-4\times\gamma/\Phi \quad \text{(Expression 1)}$$

holds, where Pin represents inlet portion pressure of the liquid supply channel, Pout represents outlet portion pressure of the liquid collect channel, Pnoz represents pressure at the chamber, γ(mN/m) represents surface tension of the ink, and Φ (μm) represents the effective diameter of the orifice.

5. The liquid discharge head according to claim 1, wherein the liquid discharge head has a supply port that is a connection portion between the liquid supply channel and the channel, and a recovery port that is a connection portion between the liquid collect channel and the channel, with a plurality being provided of at least one of the supply port and recovery port.

6. The liquid discharge head according to claim 5, wherein the supply port and recovery port extend in a direction orthogonal to the main face of the substrate.

7. The liquid discharge head according to claim 1, wherein the plurality of recording element boards are arrayed in a straight line.

8. The liquid discharge head according to claim 1, wherein a channel member includes a common supply channel configured to supply liquid to a plurality of recording element boards, and a common recovery channel configured to recover liquid from the plurality of recording element boards.

9. The liquid discharge head according to claim 8, further comprising:

a plurality of modules including the recording element boards, flexible printed circuit boards configured to be connected to the recording element boards, and a support member supporting the recording element boards.

10. The liquid discharge head according to claim 8, wherein the common supply channel and the common recovery channel extend in the direction in which the plurality of recording element boards extend, and wherein the liquid discharge head is a page-wide liquid discharge head.

11. The liquid discharge head according to claim 1, wherein a liquid of which the concentration of solids is 6 to 25 percent by weight is supplied from the liquid supply channel to the chamber via the channel.

* * * * *